United States Patent
Takenaka et al.

(10) Patent No.: US 8,577,516 B2
(45) Date of Patent: Nov. 5, 2013

(54) CONTROL DEVICE OF INVERTED PENDULUM TYPE VEHICLE

(75) Inventors: Toru Takenaka, Saitama (JP); Kazushi Akimoto, Saitama (JP); Shinichiro Kobashi, Saitama (JP); Hideo Murakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/394,875

(22) PCT Filed: Sep. 18, 2009

(86) PCT No.: PCT/JP2009/004768
§ 371 (c)(1),
(2), (4) Date: Mar. 8, 2012

(87) PCT Pub. No.: WO2011/033591
PCT Pub. Date: Mar. 24, 2011

(65) Prior Publication Data
US 2012/0173042 A1    Jul. 5, 2012

(51) Int. Cl.
*G01P 15/00*    (2006.01)

(52) U.S. Cl.
USPC ............... 701/1; 701/69; 73/514.36

(58) Field of Classification Search
USPC ..................... 701/1, 69; 73/514.36
See application file for complete search history.

(56) References Cited

U.S. PATENT DOCUMENTS

| 2005/0121238 A1* | 6/2005 | Ishii .............................. 180/65.1 |
| 2009/0107240 A1* | 4/2009 | Senba et al. ............... 73/514.36 |

FOREIGN PATENT DOCUMENTS

| JP | 4-201793 A | 7/1992 |
| JP | 2004-129435 A | 4/2004 |
| JP | 2005-271815 A | 10/2005 |
| JP | 2006-282160 A | 10/2006 |
| JP | 2007-045331 A | 2/2007 |
| WO | 2008/132778 A1 | 11/2008 |
| WO | 2008/132779 A1 | 11/2008 |
| WO | 2008/139740 A1 | 11/2008 |

\* cited by examiner

*Primary Examiner* — Mary Cheung
*Assistant Examiner* — Yuen Wong
(74) *Attorney, Agent, or Firm* — Carrier Blackman & Associates, P.C.; Joseph P. Carrier; Jeffrey T. Gedeon

(57) ABSTRACT

A control device of an inverted pendulum type vehicle capable of easily performing a circling movement of the vehicle, without requiring complex maneuvering operation. A control unit 50 of an inverted pendulum type vehicle 1 determines a desired tilt angle of a payload supporting part 3 according to a yaw rate measured value by a yaw rate sensor 53 equipped to the vehicle 1, and controls a traveling motion of a traveling motion unit 5 so as to bring an actual tilt angle close to the desired tilt angle.

6 Claims, 17 Drawing Sheets

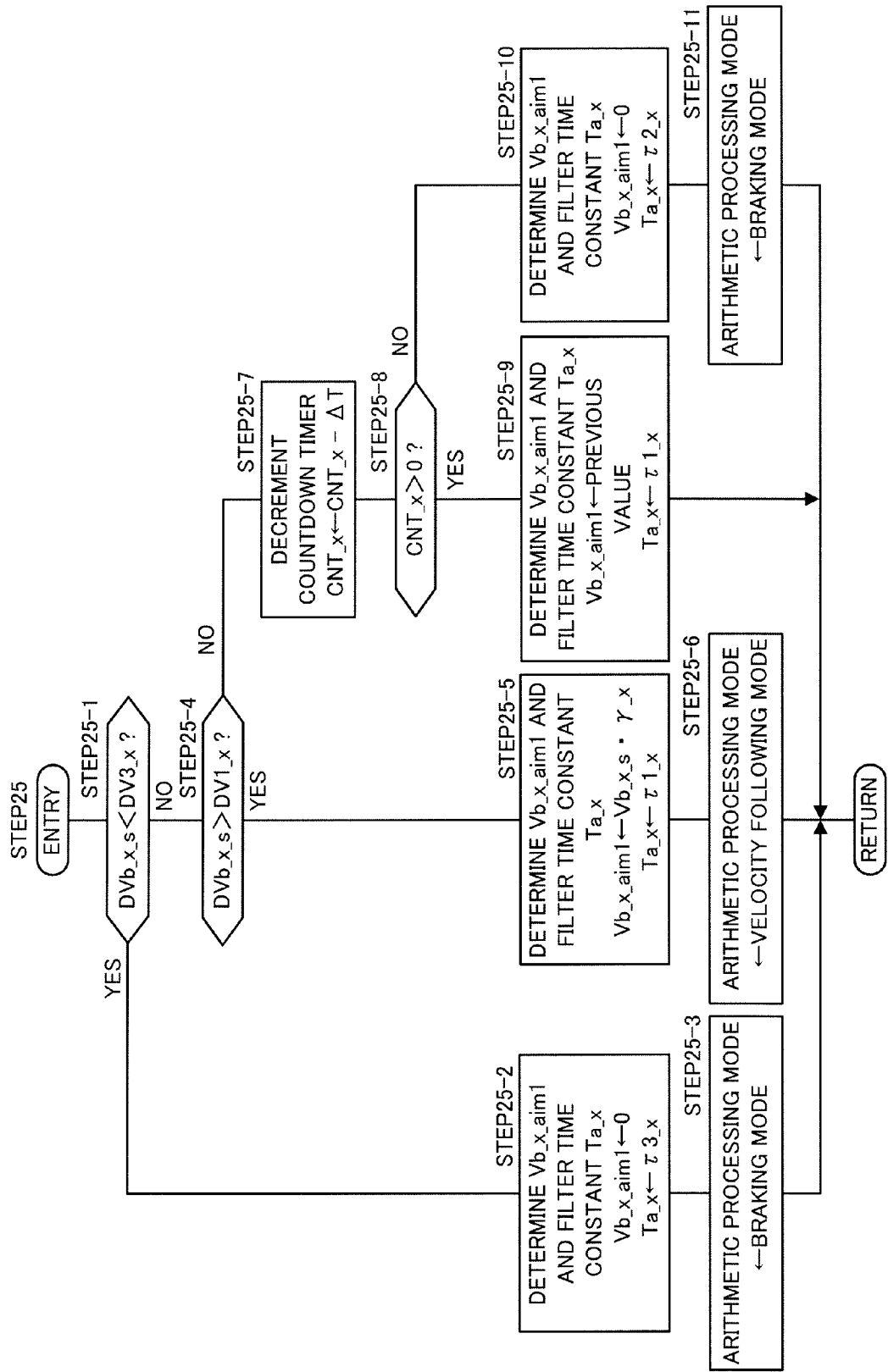

US 8,577,516 B2

CONTROL DEVICE OF INVERTED PENDULUM TYPE VEHICLE

TECHNICAL FIELD

The present invention relates to a control device of an inverted pendulum type vehicle capable of moving in all directions on a floor surface.

BACKGROUND ART

Conventionally, there is known an inverted pendulum type vehicle, in which a base body assembled with a traveling motion unit which travels on a floor surface and an actuator unit which drives the traveling motion unit, is also assembled with a payload supporting part of an occupant which is capable of freely tilting with respect to the perpendicular direction. Such inverted pendulum type vehicle is a vehicle with a necessity to move the traveling motion unit in a manner to move a fulcrum of the inverted pendulum, so as to maintain a tilt angle of the payload supporting part to a desired tilt angle (so as to prevent the payload supporting part from fall due to tilting).

Further, as a technology for controlling an inverted pendulum type vehicle equipped with a traveling motion unit capable of moving in all directions (two-dimensional all directions) on a floor surface, in which a payload supporting part of an occupant is tiltable about two axes, longitudinal direction and lateral direction, for example the one disclosed in Patent Document 1 has been proposed by the present applicant.

In the Patent Document 1, there is disclosed a control technology of an inverted pendulum type vehicle in which a base body of a vehicle assembled with a payload supporting part of an occupant is provided so as to be freely tiltable about two axes, specifically about one axis in a longitudinal direction and about the other axis in a lateral direction, with respect to the ball-shaped traveling motion unit. In this technology, a driving torque of a motor (a set of the driving torque of the motor for moving the traveling motion unit in longitudinal direction and the driving torque of the motor for moving the same in the lateral direction) is sequentially determined so as to make a difference between a measured value of a tilt angle of the base body (=tilt angle of the payload supporting part) and a desired tilt angle closer to 0, and also to make the difference between a measured value of a velocity of the motor as an actuator unit (and consequently a moving velocity of the traveling motion unit) and a desired velocity closer to 0. Thereafter, the traveling motion of the traveling motion unit is controlled via the motor, in accordance with the determined drive torque.

As a vehicle equipped with a traveling motion unit capable of moving in all directions on a floor surface, and which is capable of functioning as an inverted pendulum type vehicle, for example, the one disclosed in Patent Documents 2 and 3 have been proposed by the present applicant.

PRIOR ART REFERENCES

Patent Documents

Patent document 1: U.S. Pat. No. 3,070,015
Patent document 2: Published PCT International Application WO/2008/132778
Patent document 3: Published PCT International Application WO/2008/132779

SUMMARY OF THE INVENTION

Problems to be Solved by the Invention

In the technology disclosed in Patent document 1, it is possible to arbitrarily set the desired tilt angle of the base body by an operation of a joystick. However, it is generally extremely difficult for the occupant of the inverted pendulum type vehicle to precisely set in real-time the desired tilt angle of the base body suitable for the traveling mode of the vehicle, by the operation of the joystick. This is because high-level mastership or experience is necessary for the occupant to accurately recognize the relationship between the setting of the desired tilt angle and the behavior of the vehicle in various running mode of the inverted pendulum type vehicle, and also the variation in the operation mode or erroneous operation of the joystick is easily generated.

Therefore, for example in the case where vehicle is to make a circle, situations such that the desired tilt angle for tilting the base body to the opposite side to the circling direction is set, or the desired tilt angle for tilting the base body excessively to the same side of the circling direction is set, or the desired tilt angle is continuously maintained to the same angle as that in the straight traveling is likely to happen. In such case, the circling radius of the vehicle is easy to become too large or too small, so that the occupant must continuously move his/her upper body to adjust the actual tilt angle of the base body, and consequently, to adjust the behavior of the vehicle. Therefore, there is an inconvenience that the maneuvering operation of the vehicle for smoothly performing, especially, the circling of the vehicle, tends to be complicated.

The present invention had been made in view of such background, and aims to provide a control device capable of easily and smoothly performing especially the circling movement of an inverted pendulum type vehicle without requiring complicated maneuvering operation.

Means for Solving the Problems

In order to accomplish such object, a control device of an inverted pendulum type vehicle of the present invention is a control device of an inverted pendulum type vehicle having a traveling motion unit capable of moving on a floor surface in all directions including a first direction and a second direction which are orthogonal to each other, an actuator which drives the traveling motion unit, a base body on which the traveling motion unit and the actuator are mounted, and a payload supporting part of an occupant which is attached to the base body so as to be tillable with respect to vertical direction about two axes, about the axis in the first direction and about the axis in the second direction, comprising: a yaw rate measuring element which generates an output according to an actual yaw rate of a predetermined portion of the vehicle; a desired tilt angle determining element which determines a desired tilt angle of the payload supporting part at least according to the measured value of the yaw rate indicating the output of the yaw rate measuring element; and a traveling motion unit controlling element which controls a traveling motion of the traveling motion unit so as to bring at least a tilt error which is an error between an actual tilt angle of the payload supporting part and a desired tilt angle determined by the desired tilt angle determining element close to 0 (a first aspect of the invention).

In the present invention, the term "floor" will be used to include an outdoor ground surface or a road surface rather than meaning only a floor in an ordinary sense (e.g., an indoor floor).

According to the first aspect of the invention, the desired tilt angle of the payload supporting part is determined by the desired tilt angle determining element at least in accordance with the measured value of the yaw rate. Therefore, during circling movement of the vehicle, the desired tilt angle of the payload supporting part suitable for the actual yaw rate generated by the circling movement may be determined automatically.

For example, in the case where the actual tilt angle of the payload supporting part is made to coincide with the desired tilt angle, with respect to the magnitude of the moment generated about the tilt fulcrum of the portion capable of tilting with the payload supporting part among overall vehicle and occupant (hereinafter referred to as tilting system section) by the resultant force of the centrifugal force acting on the tilting system section during circling movement and the gravitational force acting on the tilting system section, the desired tilt angle may be determined so that the magnitude of the moment becomes 0 or a minute magnitude (at least become smaller than the magnitude of the moment generated about the tilt fulcrum by the centrifugal force) without the necessity of the occupant to move his/her posture with respect to the payload supporting part intentionally.

Then, the traveling motion unit controlling element controls the traveling motion of the traveling motion unit so as to bring the error between the actual tilt angle of the payload supporting part and the desired tilt angle determined at least according to the measured value of the yaw rate as explained above close to 0.

As a result, it becomes possible to easily and smoothly perform circling movement of the vehicle, without the necessity of a complex maneuvering operation of the vehicle (operation of the occupant intentionally moving his/her posture).

As the predetermined portion related to the measured value of the yaw rate, aforesaid base body or the payload supporting part or the like may be listed. Further, the tilting system portion may be the overall vehicle and occupant.

In the first aspect of the invention, preferably, a reference angle to be set as the desired tilt angle in the case where the measured value of the yaw rate is 0 is determined beforehand, and the desired tilt angle determining element determines the desired tilt angle so as to increase, at least the magnitude of an error component about an axis in a predetermined direction which is a component about an axis in the same direction as the actual traveling direction of a predetermined representative point of the vehicle, out of the error between the desired tilt angle and the reference angle, as the magnitude of the measured value of the yaw rate increases (a second aspect of the invention)

According to the second aspect of the invention, the desired tilt angle determined by the desired tilt angle determining element is determined so that at least the magnitude of the error component about the axis in the predetermined direction among of the error between the desired tilt angle and the reference angle increases as the magnitude of the measured value of the yaw rate increases.

The direction of the centrifugal force acting on the aforesaid tilting system section at the time of circling traveling of the vehicle is in a direction orthogonal to or approximately orthogonal to the actual traveling direction of the representative point (representative traveling direction as the traveling direction of the overall vehicle). And the magnitude of the centrifugal force increases as the magnitude of the yaw rate increases. Further, by determining the desired tilt angle as in the second aspect of the invention, the moving amount of the center-of-gravity point of the tilting system portion from the position of the center-of-gravity point at the reference angle (more specifically, the movement amount in the orientation opposite to the centrifugal force) may be increased as the magnitude of the yaw rate increases (and consequently as the magnitude of the centrifugal force increases).

Therefore, according to the second aspect of the invention, the magnitude of the moment component about the axis in the direction orthogonal to the centrifugal force among the moment generated about the tilt fulcrum of the tilting system portion by the gravitational force acting on the tilting system portion may be increased as the magnitude of the moment generated about the tilt fulcrum by the centrifugal force increases. As a result, it becomes possible to stabilize the posture of the occupant during circling movement, and consequently to restrain the change in behavior of the vehicle.

As the reference angle, for example, the tilt angle of the payload supporting part in the state where the center-of-gravity point of the tilting system portion is positioned immediately above or approximately immediately above the tilt fulcrum is preferably adopted.

Further, in the second aspect of the invention, the error between the desired tilt angle and the reference angle may be comprised of solely by the error component about the axis in the predetermined direction. However, it may also include error component other than the error component about the axis in the predetermined direction, that is, the error component about the axis in the direction intersecting the actual traveling direction of the representative point.

In the second aspect of the invention, preferably, the control device further comprises a representative point velocity measuring element which generates an output according to an actual traveling velocity of the representative point, and the desired tilt angle determining element determines the desired tilt angle so as to increase the magnitude of the error component about the axis in the predetermined direction, as the magnitude of the measured value of the yaw rate increases, and as the magnitude of a measured value of the traveling velocity of the representative point indicated by an output of the representative point velocity measuring element increases (a third aspect of the invention).

That is, the magnitude of the centrifugal force depends also on the traveling velocity of the vehicle, and basically, the magnitude of the centrifugal force increases as the magnitude of the traveling velocity of the representative point increases. And, by determining the desired tilt angle as is in the third aspect of the invention, the moving amount of the center-of-gravity point of the tilting system portion from the position of the center-of-gravity point at the reference angle (more specifically, the moving amount in the orientation opposite to the centrifugal force) may be increased as the magnitude of the traveling velocity of the representative point increases, in addition to increasing the same as the magnitude of the yaw rate increases.

Therefore, according to the third aspect of the invention, increase of the magnitude of the moment component about the axis in the direction orthogonal to the centrifugal force among the moment generated about the tilt fulcrum of the tilting system portion by the gravitational force acting on the tilting system portion, as the magnitude of the moment generated about the tilt fulcrum by the centrifugal force, may be performed more appropriately. As a result, it becomes possible to further stabilize the posture of the occupant during circling movement, and consequently, further restrict the change in behavior of the vehicle.

According to the third aspect of the invention, the desired tilt angle determining element determines the desired tilt angle so that a polarity of the error component about the axis in the predetermined direction to be the polarity defined according to a set of the orientation of the yaw rate represented by the measured value of the yaw rate, and the orientation of the traveling velocity represented by the measured value of the traveling velocity of the representative point (a fourth aspect of the invention).

That is, the orientation of the centrifugal force acting on the vehicle (including the tilting system portion) during circling movement of the vehicle, becomes the orientation depending on the set of the orientation of travel of the vehicle and the orientation of the yaw rate generated to the vehicle. Therefore, by determining the desired tilt angle as is explained above, it becomes possible to determine the desired tilt angle so as to tilt the payload supporting part and the occupant aboard in an appropriate orientation for smoothly carrying out the circling movement of the vehicle (an orientation so that the center-of-gravity point of the tilting system portion approaches the center of circulation than the position of the center-of-gravity point at the reference angle), regardless of the orientation of travel of the vehicle.

In the fourth aspect of the invention, it is preferable to determine the desired tilt angle, so that the desired tilt angle becomes an angle tilted from the reference angle in an orientation about the axis in the direction same as the direction of the traveling velocity indicated by the measured value of the traveling velocity of the representative point (stated otherwise, so that the error between the desired tilt angle and the reference angle includes only the error component about the axis in the predetermined direction).

In the second aspect of the invention, preferably, the desired tilt angle determining element determines the reference angle as the desired tilt angle, in the case where the magnitude of the measured value of the yaw rate is smaller than a predetermined first threshold value (a fifth aspect of the invention).

Similarly, in the third aspect of the invention or the fourth aspect of the invention, preferably, the desired tilt angle determining element determines the reference angle as the desired tilt angle, in the case where either one of a condition that the magnitude of the measured value of the yaw rate is smaller than a predetermined first threshold value, and a condition that the magnitude of the measured value of the traveling velocity of the representative point is smaller than a predetermined second threshold value, is satisfied (a sixth aspect of the invention).

According to the fifth aspect of the invention and the sixth aspect of the invention, the centrifugal force becomes sufficiently minimum. By determining the desired tilt angle to the reference angle in the state where the centrifugal force hardly affects the posture of the payload supporting part and the occupant aboard, it becomes easier for the occupant to keep the balance of his/her posture.

Supplementarily, in the present invention explained above, for example the following mode may be adopted as a more specific mode. That is, the vehicle is equipped with a tilt angle measuring element which generates output according to the actual tilt angle of the payload supporting part, and the representative point velocity measuring element. And, the traveling motion unit controlling element determines a manipulated variable for control which defines the driving force to be imparted to the traveling motion unit, according to the tilt error and the velocity error, so as to bring at least the tilt error which is the error between the measured value of the tilt angle of the payload supporting part indicated by the output of the tilt angle measuring element and the desired tilt angle, and the velocity error which is the error between the measured value of the traveling velocity of the representative point indicated by the output of the representative point velocity measuring element and a predetermined desired traveling velocity (for example, 0), close to 0, and controls the traveling motion of the traveling motion unit according to the manipulated variable for control via the actuator.

BRIEF DESCRIPTION OF THE DRAWINGS

FIG. 18 is a flowchart illustrating the subroutine processing in STEP25 of FIG. 15.

MODE FOR CARRYING OUT THE INVENTION

The following will describe a first embodiment of the present invention. First, referring to FIG. 1 to FIG. 6, the structure of an inverted pendulum type vehicle in the present embodiment will be described.

Figure 1:
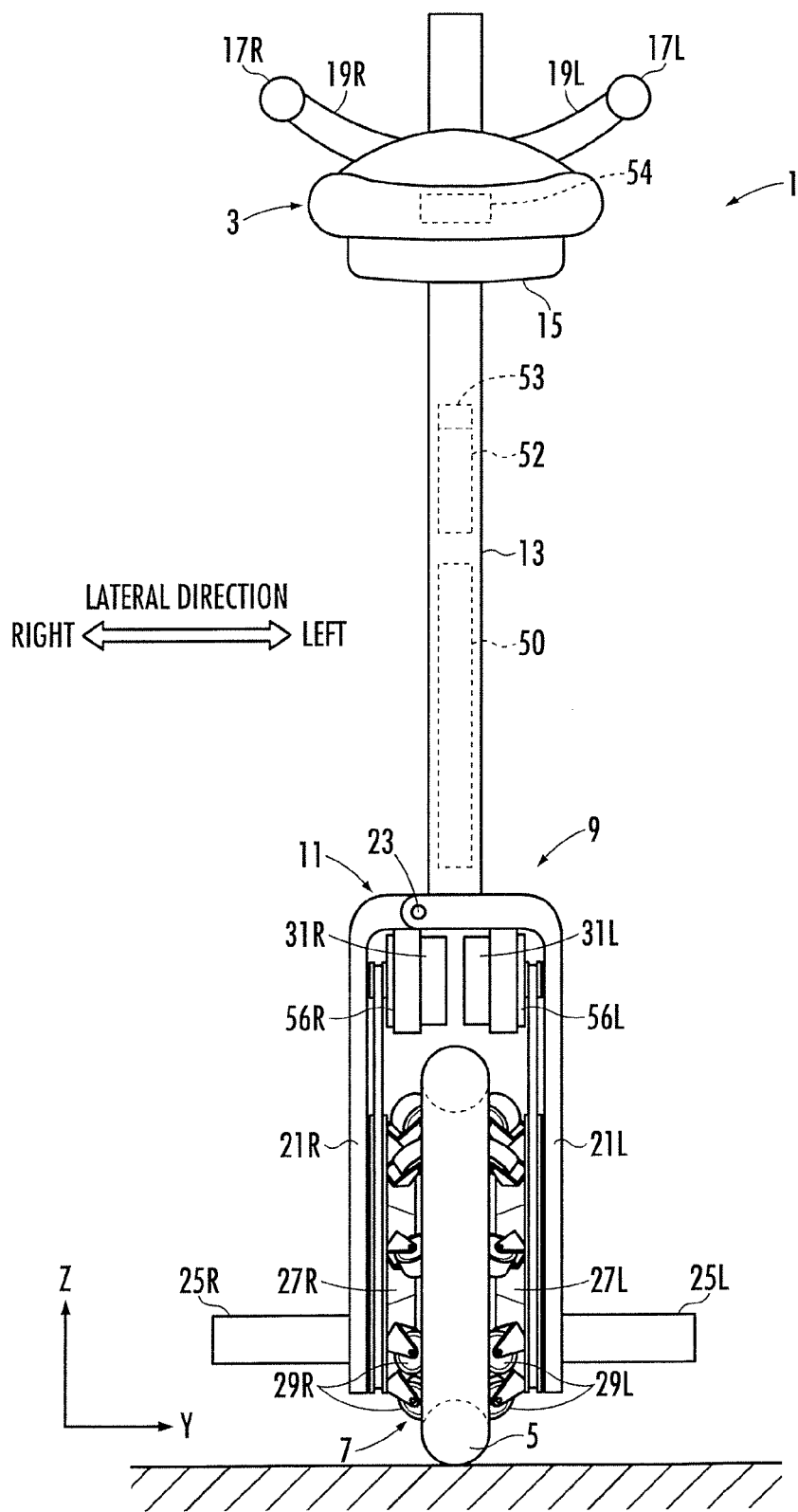
FIG. 1 is a front diagram of an omnidirectional vehicle according to an embodiment.
Figure 2:
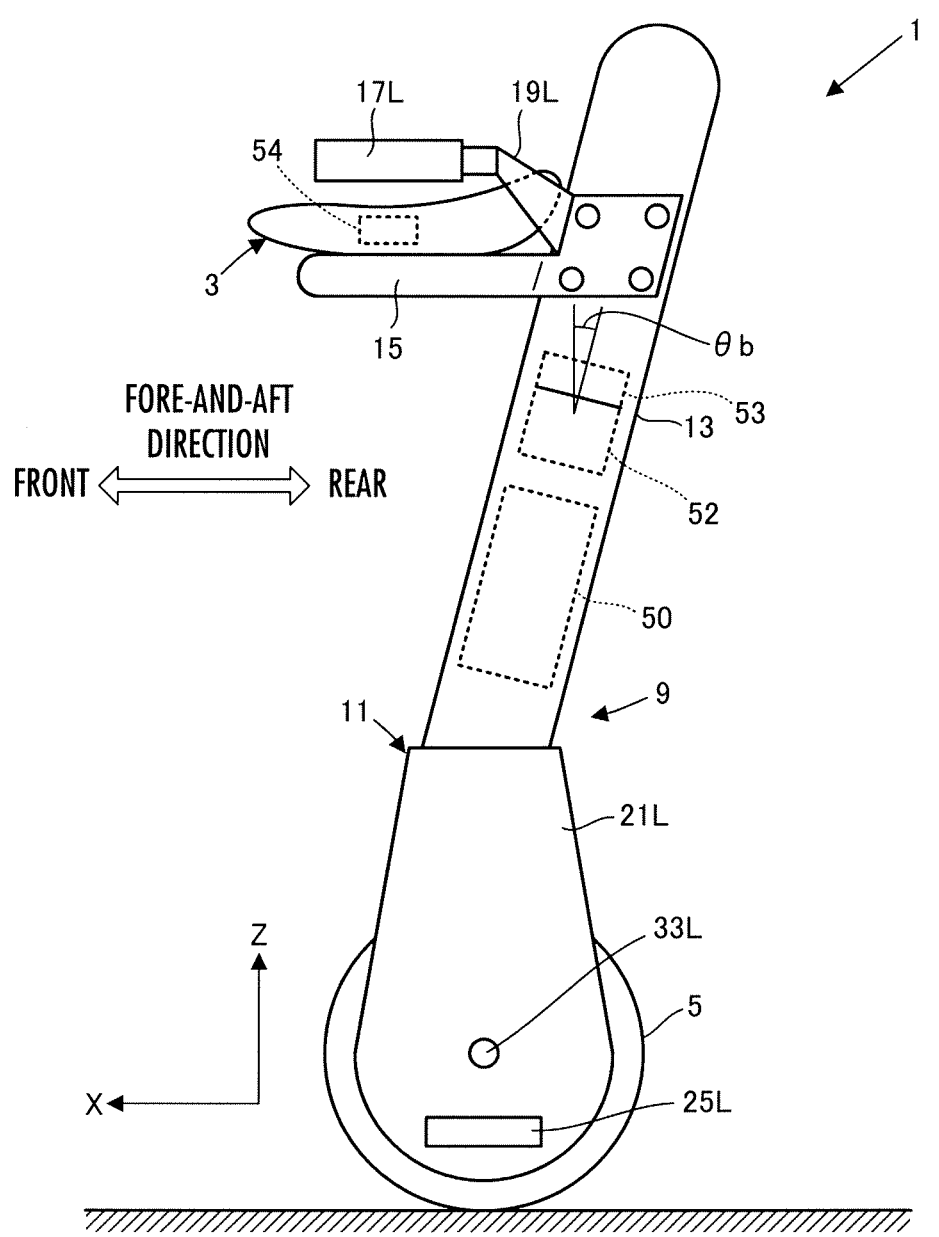
FIG. 2 is a side view of the omnidirectional vehicle according to the embodiment.

As illustrated in FIG. 1 and FIG. 2, an inverted pendulum type vehicle 1 in the present embodiment includes a payload supporting part 3 for an occupant (driver), a traveling motion unit 5 capable of traveling in all directions (two-dimensional all directions, including a fore-and-aft direction and a lateral direction) on a floor surface while being in contact with a floor surface, an actuator 7 which imparts, to the traveling motion unit 5, a motive power for driving the traveling motion unit 5, and a base body 9 on which the payload supporting part 3, the traveling motion unit 5, and the actuator 7 are mounted.

Here, in the description of the present embodiment, "the fore-and-aft direction" and "the lateral direction" mean the directions that coincide or substantially coincide with the fore-and-aft direction and the lateral direction, respectively, of the upper body of an occupant aboard the payload supporting part 3 in a normal posture. Incidentally, "the normal posture" is a posture envisaged in the design related to the payload supporting part 3, and it is a posture in which the trunk axis of the upper body of the occupant is oriented approximately in the vertical direction and the upper body is not twisted.

In this case, in FIG. 1, "the fore-and-aft direction" and "the lateral direction" are the direction perpendicular to the paper surface and the lateral direction of the paper surface, respectively. In FIG. 2, "the fore-and-aft direction" and "the lateral direction" are the lateral direction of the paper surface and the direction perpendicular to the paper surface, respectively. Further, in the description of the present embodiment, the suffixes "R" and "L" attached to reference numerals will be used to mean the correspondence to the right side and left side, respectively, of the vehicle 1.

The base body 9 is provided with a lower frame 11, to which the traveling motion unit 5 and the actuator 7 are installed, and a support frame 13 extendedly provided upward from the upper end of the lower frame 11.

A seat frame 15 extending toward the front from the support frame 13 is fixed to the top of the support frame 13. Further, the seat 3 on which an occupant sits is installed on the seat frame 15. In the present embodiment, the seat 3 serves as the payload supporting part for an occupant. Hence, the inverted pendulum type vehicle 1 in the present embodiment (hereinafter referred to simply as the vehicle 1) travels on a floor surface with an occupant seated on the seat 3.

Further, grips 17R and 17L to be grasped as necessary by the occupant seated on the seat 3 are disposed on the right and left of the seat 3. These grips 17R and 17L are secured to the distal portions of brackets 19R and 19L, respectively, which are provided extendedly from the support frame 13 (or the seat frame 15).

The lower frame 11 is provided with a pair of cover members 21R and 21L disposed to face each other in a forked shape with a gap therebetween in the lateral direction. The upper end portions (the forked portions) of these cover members 21R and 21L are connected through a hinge shaft 23 having a longitudinal axial center, so that one of the cover members 21R and 21L is relatively swingable about the hinge shaft 23 with respect to the other. In this case, the cover members 21R and 21L are biased by springs, which are not shown, in the direction in which the bottom end portions (the distal ends of the forked portions) of the cover members 21R and 21L narrow.

Further, a step 25R on which the occupant seated on the seat 3 rests his/her right foot and a step 25L on which the occupant rests his/her left foot are provided on the outer surfaces of the cover members 21R and 21L such that the steps extend out rightward and leftward, respectively.

The traveling motion unit 5 and the actuator 7 are disposed between the cover members 21R and 21L of the lower frame 11. The structures of the traveling motion unit 5 and the actuator 7 will be described with reference to FIG. 3 to FIG. 6.

The traveling motion unit 5 and the actuator 7 illustrated in the present embodiment have the same structures as those disclosed in, for example, FIG. 1 of patent document 2 mentioned above. Hence, in the description of the present embodiment, the aspects of the structures of the traveling motion unit 5 and the actuator 7 which are described in the aforesaid patent document 2 will be only briefly described.

In the present embodiment, the traveling motion unit 5 is a wheel assembly made of a rubber elastic material formed into an annular shape and has a substantially circular cross-sectional shape. This traveling motion unit 5 (hereinafter referred to as the wheel assembly 5) elastically deforms to be capable of rotating about a center C1 of the circular cross-section (more specifically, the circumferential line which passes the center C1 of the circular cross-section and which is concentric with the axial center of the wheel assembly 5), as indicated by an arrow Y1 in FIG. 5 and FIG. 6.

The wheel assembly 5 is disposed between the cover members 21R and 21L with an axial center C2 thereof (an axial center C2 orthogonal to the diametrical direction of the whole wheel assembly 5) oriented in the lateral direction, and comes in contact with a floor surface at the bottom end portion of the outer circumferential surface of the wheel assembly 5.

The wheel assembly 5 is capable of performing a motion of rotating about the axial center C2 of the wheel assembly 5 as indicated by an arrow Y2 in FIG. 5 (a motion of circumrotating on a floor surface) and a motion of rotating about the center C1 of the cross-section of the wheel assembly 5 by being driven by the actuator 7 (to be discussed in detail later). As a result, the wheel assembly 5 is capable of traveling in all directions on a floor surface by the motions combining the aforesaid rotating motions.

The actuator 7 is provided with a rotating member 27R and free rollers 29R interposed between the wheel assembly 5 and the right cover member 21R, a rotating member 27L and free rollers 29L interposed between the wheel assembly 5 and the left cover member 21L, an electric motor 31R serving as an actuator disposed above the rotating member 27R and the free rollers 29R, and an electric motor 31L serving as an actuator disposed above the rotating member 27L and the free rollers 29L.

The housings of the electric motors 31R and 31L are installed to the cover members 21R and 21L, respectively. Although not shown, the electric sources (batteries or capacitors) of the electric motors 31R and 31L are mounted on an appropriate place of the base body 9, such as the support frame 13 or the like.

The rotating member 27R is rotatively supported by the cover member 21R through the intermediary of a support axis 33R having a lateral axial center. Similarly, the rotating member 27L is rotatively supported by the cover member 21L through the intermediary of a support axis 33L having a lateral axial center. In this case, the rotational axial center of the rotating member 27R (the axial center of the support axis 33R) and the rotational axial center of the rotating member 27L (the axial center of the support axis 33L) are concentric with each other.

Figure 3:
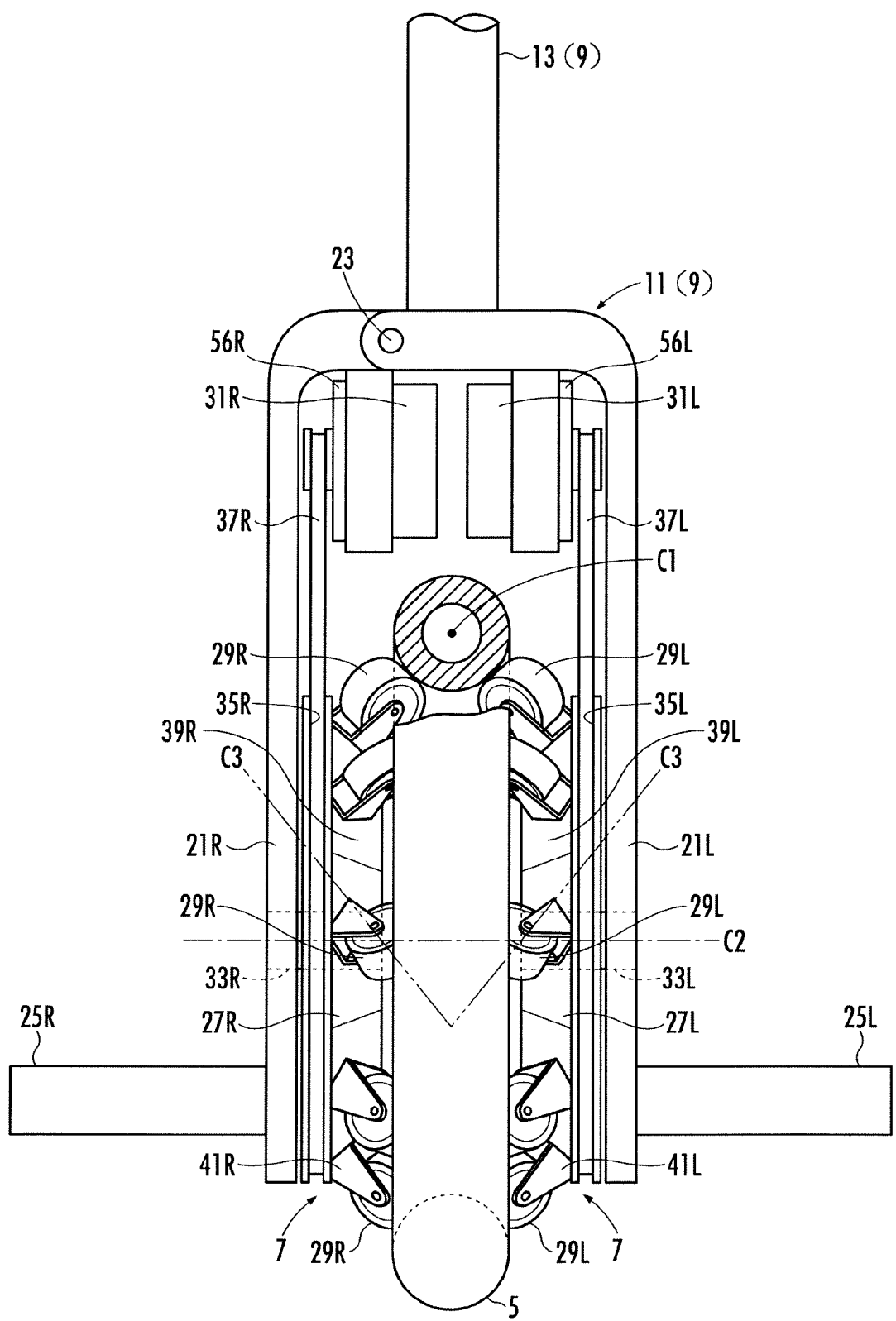
FIG. 3 is an enlarged view of a lower portion of the omnidirectional vehicle according to the embodiment.
Figure 4:
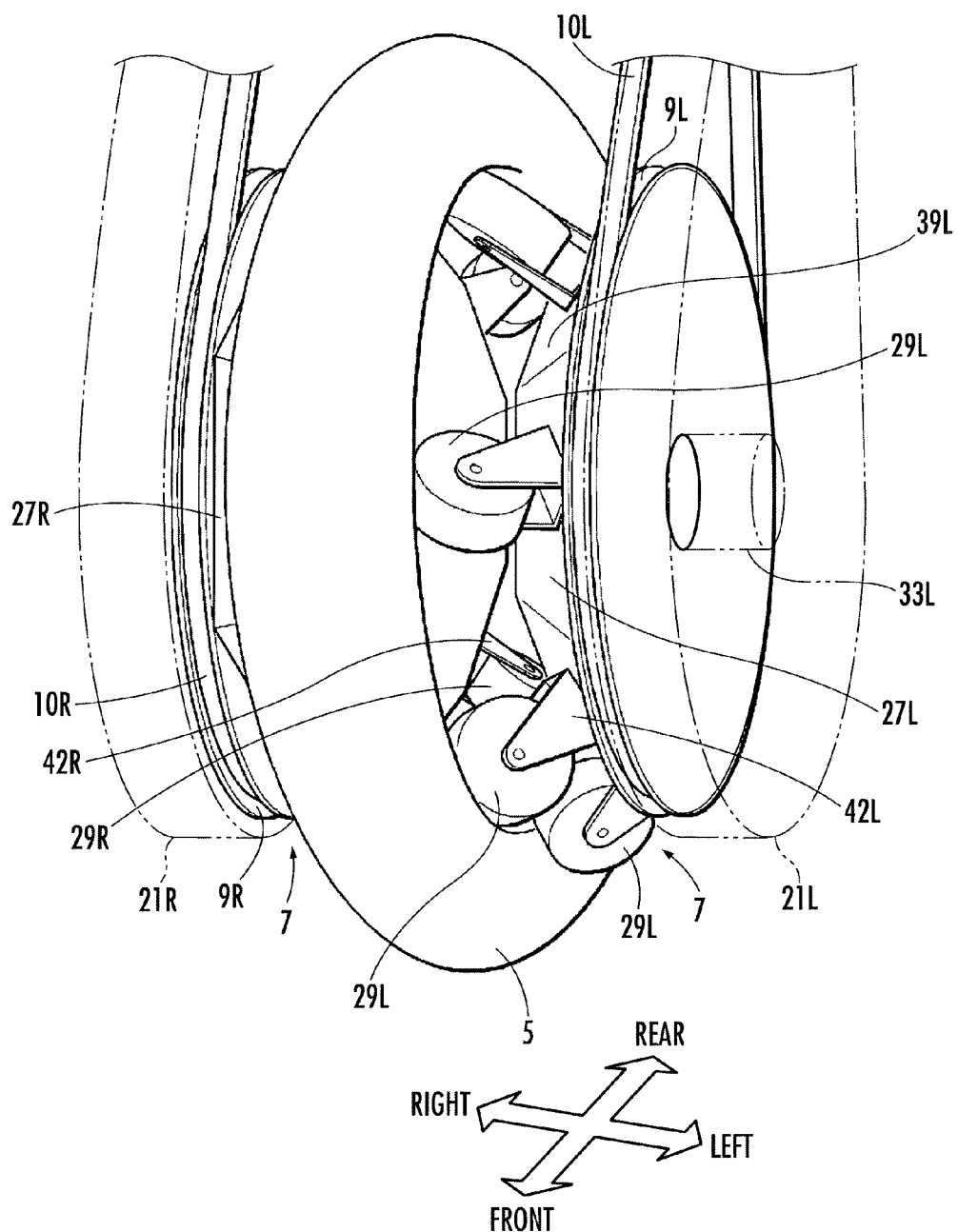
FIG. 4 is a perspective view of the lower portion of the omnidirectional vehicle according to the embodiment.

The rotating members 27R and 27L are connected to the output shafts of the electric motors 31R and 31L, respectively, through the intermediary of power transmission mechanisms, including functions as reducers, and rotatively driven by the motive power (torque) transmitted from the electric motors 31R and 31L, respectively. Each power transmission mechanisms are, for example, pulley and belt system. More specifically, as illustrated in FIG. 3, the rotating member 27R is connected to the output shaft of the electric motor 31R through the intermediary of a pulley 35R and a belt 37R. Similarly, the rotating member 27L is connected to the output shaft of the electric motor 31L through the intermediary of a pulley 35L and a belt 37L.

Incidentally, the aforesaid power transmission mechanism may be constructed of, for example, a sprocket and a link chain, or may be constructed of a plurality of gears. As another alternative, for example, the electric motors 31R and 31L may be constructed such that the output shafts thereof are arranged to oppose the rotating members 27R and 27L so as to arrange the output shafts to be concentric with the rotating members 27R and 27L, and the output shafts of the electric motors 31R and 31L may be connected to the rotating members 27R and 27L, respectively, through the intermediary of reducers (e.g., planetary gear devices).

The rotating members 27R and 27L are formed in the same shapes as circular truncated cones, the diameters of which reduce toward the wheel assembly 5, and the outer peripheral surfaces thereof form tapered outer peripheral surfaces 39R and 39L.

A plurality of the free rollers 29R are arrayed about the tapered outer peripheral surface 39R of the rotating member 27R such that the free rollers 29R are arranged at regular intervals on the circumference concentric with the rotating member 27R. Further, these free rollers 29R are installed to the tapered outer peripheral surface 39R through the intermediary of the brackets 41R and rotatively supported by the brackets 41R.

Similarly, a plurality of free rollers 29L (of the same quantity as that of the free rollers 29R) are arrayed about the tapered outer peripheral surface 39L of the rotary member 27L such that the free rollers 29L are arrayed at regular intervals on the circumference concentric with the rotating member 27L. Further, these free rollers 29L are installed to the tapered outer peripheral surface 39L through the intermediary of the brackets 41L and rotatively supported by the brackets 41L.

The wheel assembly 5 is disposed concentrically with the rotating members 27R and 27L, and held between the free rollers 29R adjacent to the rotating member 27R and the free rollers 29L adjacent to the rotating member 27L.

Figure 6:
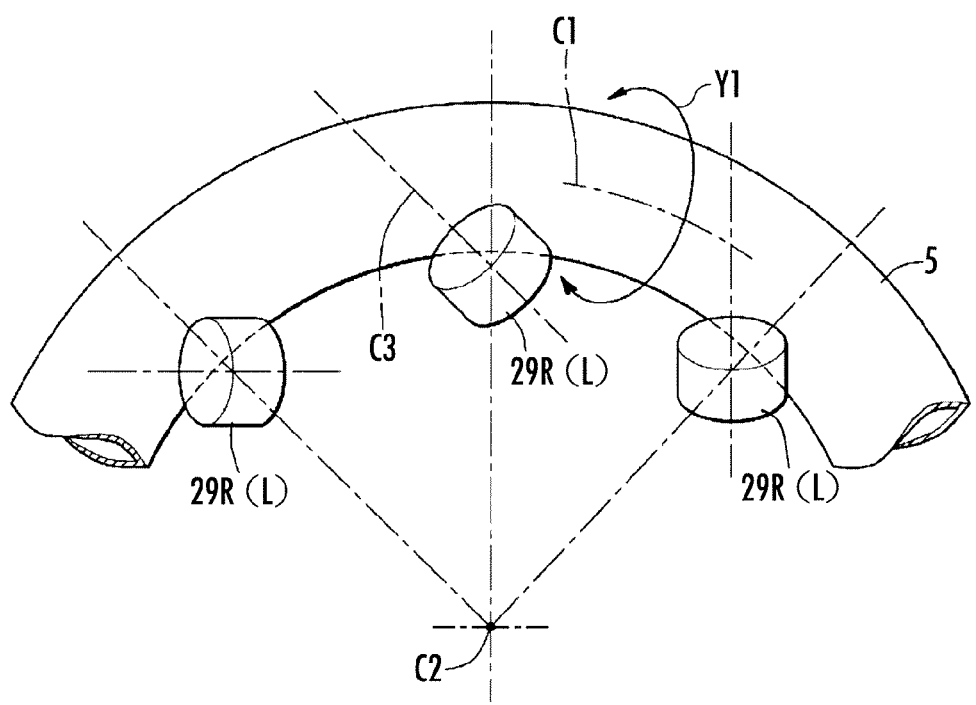
FIG. 6 is a diagram illustrating the placement relationship between the traveling motion unit (wheel unit) and free rollers of the omnidirectional vehicle according to the embodiment.

In this case, as illustrated in FIG. 1 and FIG. 6, the free rollers 29R and 29L are disposed in postures in which the axial centers C3 thereof are inclined against the axial center C2 of the wheel assembly 5 and also inclined against the diametrical direction of the wheel assembly 5 (the radial direction connecting the axial center C2 and the free rollers 29R and 29L when the wheel assembly 5 is observed in the direction of the axial center C2 thereof). Further, in the aforesaid postures, the outer peripheral surfaces of the free rollers 29R and 29L, respectively, are pressed into contact aslant with the inner peripheral surface of the wheel assembly 5.

More generally speaking, the right free rollers 29R are pressed into contact with the inner peripheral surface of the wheel assembly 5 in postures in which a frictional force component in the direction about the axial center C2 (a frictional force component in the tangential direction of the inner periphery of the wheel assembly 5) and a frictional force component in the direction about the center C1 of the cross-section of the wheel assembly 5 (a frictional force component in the tangential direction of the circular cross section) can be applied to the wheel assembly 5 at a surface in contact with the wheel assembly 5 when the rotating member 27R is rotatively driven about the axial center C2. The same applies to the left free rollers 29L.

In this case, as described above, the cover members 21R and 21L are biased by the springs, which are not shown, in the direction for narrowing the bottom end portions (the distal ends of the forked portions) of the cover members 21R and 21L. Thus, the urging force holds the wheel assembly 5 between the right free rollers 29R and the left free rollers 29L, and the free rollers 29R and 29L are maintained in the press contact with the wheel assembly 5 (more specifically, the press contact state that enables a frictional force to act between the free rollers 29R and 29L and the wheel assembly 5).

In the vehicle 1 having the structure described above, when the rotating members 27R and 27L are rotatively driven at the same velocity in the same direction by the electric motors 31R and 31L, respectively, the wheel assembly 5 will rotate about the axial center C2 in the same direction as those of the rotating members 27R and 27L. This causes the wheel assembly 5 to circumrotate on a floor surface in the fore-and-aft direction and the whole vehicle 1 will travel in the fore-and-aft direction. In this case, the wheel assembly 5 does not rotate about the center C1 of the cross-section thereof.

Further, if, for example, the rotating members 27R and 27L are rotatively driven in opposite directions from each other at velocities of the same magnitude, then the wheel assembly 5 will rotate about the center C1 of the cross section thereof. This causes the wheel assembly 5 to travel in the direction of the axial center C2 thereof (i.e., in the lateral direction), thus causing the whole vehicle 1 to travel in the lateral direction. In this case, the wheel assembly 5 does not rotate about the axial center C2 thereof.

Further, if the rotating members 27R and 27L are rotatively driven in the same direction or opposite directions at velocities that are different from each other (velocities including directions), then the wheel assembly 5 will rotate about the axial center C2 and also rotate about the center C1 of the cross-section thereof.

At this time, motions combining the aforesaid rotational motions (combined motions) cause the wheel assembly 5 to travel in directions inclined relative to the fore-and-aft direction and the lateral direction, thus causing the whole vehicle 1 to travel in the same direction as that of the wheel assembly 5. The traveling direction of the wheel assembly 5 in this case will change, depending upon the difference between the rotational velocities, including the rotational directions, of the rotating members 27R and 27L (the rotational velocity vectors, the polarities of which are defined according to rotational directions).

The traveling motions of the wheel assembly 5 effected as described above. Therefore, by controlling the rotational velocities (including the rotational directions) of the electric motors 31R and 31L, and consequently by controlling the rotational velocities of the rotating members 27R and 27L, it becomes possible to control the traveling velocity and the traveling direction of the vehicle 1.

Incidentally, the seat (the boarding portion) 3 and the base body 9 are tiltable about the lateral axial center C2, the axial center C2 of the wheel assembly 5 being the supporting point, and also tiltable together with the wheel assembly 5 about the longitudinal axis, the ground contact surface (the lower end surface) of the wheel assembly 5 being the supporting point.

The construction for controlling the operation of the vehicle 1 according to the present embodiment will now be described. In the following description, assuming an XYZ coordinate system, in which the longitudinal horizontal axis is indicated by an X-axis, the lateral horizontal axis is indicated by a Y-axis, and the vertical direction is indicated by a Z-axis, as illustrated in FIG. 1 and FIG. 2, the fore-and-aft direction and the lateral direction may be referred to as the X-axis direction and the Y-axis direction, respectively.

First, the control of the operation of the vehicle 1 will be outlined. According to the present embodiment, basically, if the occupant seated on the seat 3 tilts his/her upper body (more specifically, if the upper body is tilted such that the position of the overall center-of-gravity point combining the occupant and the vehicle 1 (the position projected onto a horizontal plane) is moved), then the base body 9 is tilted together with the seat 3 toward the side to which the upper body has been tilted. At this time, the traveling motion of the wheel assembly 5 is controlled such that the vehicle 1 travels toward the side to which the base body 9 has tilted. For example, if the occupant tilts his/her upper body forward, causing the base body 9 to tilt forward together with the seat 3, then the traveling motion of the wheel assembly 5 is controlled to cause the vehicle 1 to travel forward.

In other words, according to the present embodiment, the operation in which the occupant moves his/her upper body, causing the seat 3 and the base body 9 to tilt provides one basic steering operation for the vehicle 1 (a motion request of the vehicle 1), and the traveling motion of the wheel assembly 5 is controlled through the actuator 7 according to the steering operation.

Here, in the vehicle 1 according to the present embodiment, the ground contact surface of the wheel assembly 5 as the ground contact surface of the whole vehicle 1 will be a single local region which is smaller than a region resulting from projecting all the vehicle 1 and the occupant thereon onto a floor surface, and a floor reaction force will act only on the single local region. For this reason, in order to prevent the base body 9 from falling due to tilting, the wheel assembly 5 must be moved such that the overall center-of-gravity point of the occupant and the vehicle 1 is positioned substantially right above the ground contact surface of the wheel assembly 5.

Therefore, according to the present embodiment, the posture of the base body 9 in a state wherein the overall center-of-gravity point of the occupant and the vehicle 1 is positioned substantially right above the central point of the wheel assembly 5 (the central point on the axial center C2) (more precisely, in a state wherein the center-of-gravity point is positioned substantially right above the ground contact surface of the wheel assembly 5) is defined as a desired posture (excluding during circling movement explained later), and basically, the traveling motion of the wheel assembly 5 is controlled such that the actual posture of the base body 9 is converged to the desired posture.

Further, when starting the vehicle 1 and the like, if, for example, an occupant kicks a floor with his/her foot as necessary thereby to apply a propulsive force (a propulsive force produced by the force of friction between the foot of the occupant and the floor) for increasing the traveling velocity of the vehicle 1 as an additional external force in addition to the propulsive force supplied by the actuator 7 to the vehicle 1, then the traveling motion of the wheel assembly 5 is controlled such that the traveling velocity of the vehicle 1 (more precisely, the moving velocity of the overall center-of-gravity point of the occupant and the vehicle) increases accordingly. In a state wherein the addition of the aforesaid propulsive force is stopped, the traveling motion of the wheel assembly 5 is controlled (the control for braking the wheel assembly 5 is carried out) such that the traveling velocity of the vehicle 1 will be temporarily maintained at a constant velocity and then attenuate until the vehicle 1 comes to a halt.

Further, in a state wherein no occupant is aboard the vehicle 1, the posture of the base body 9 in a state which the center-of-gravity point of the vehicle 1 alone is positioned substantially right above the central point of the wheel assembly 5 (the central point on the axial center C2) (more precisely, a state wherein the center-of-gravity point is positioned substantially right above the ground contact surface of the wheel assembly 5) is defined as a desired posture, and the actual posture of the base body 9 is converged to the desired posture. Thus, the traveling motion of the wheel assembly 5 is controlled such that the vehicle 1 supports itself without causing the base body 9 to fall from tilting.

Supplementally, "the posture" means a spatial orientation. In the present embodiment, when the base body 9 tilts together with the seat 3, the postures of the base body 9 and the seat 3 change. Further, in the present embodiment, the base body 9 and the seat 3 integrally tilt, so that converging the posture of the base body 9 to the desired posture is equivalent to converging the posture of the seat 3 to a desired posture associated with the seat 3 (the posture of the seat 3 in a state wherein the posture of the base body 9 coincides with a desired posture of the base body 9).

Further, in the vehicle 1 of the present embodiment, in the state where the occupant is aboard the vehicle, the whole of the vehicle 1 and the occupant tilt integrally with the seat 3, so that the whole of the vehicle 1 and the occupant corresponds to the aforesaid tilting system section. And, in the state where no occupant is aboard the vehicle, the whole of the vehicle 1 with no occupant corresponds to the aforesaid tilting system section.

According to the present embodiment, in order to control the operation of the vehicle 1 as described above, a control unit 50 constituted of an electronic circuit unit which mainly includes a microcomputer and a drive circuit unit for the electric motors 31R and 31L, a tilt sensor 52 for measuring a tilt angle θb relative to the vertical direction (the gravitational direction) of a predetermined portion of the base body 9 and a changing velocity thereof (=dθb/dt), a yaw rate sensor 53 for measuring a yaw rate (angular velocity about the yaw axis) ωz of a predetermined portion of the base body 9, a load sensor 54 for detecting whether or not an occupant is aboard the vehicle 1, and rotary encoders 56R and 56L serving as angle sensors for detecting the rotational angles and the rotational angular velocities of the output shafts of the electric motors 31R and 31L, respectively, are mounted at appropriate places of the vehicle 1, as illustrated in FIG. 1 and FIG. 2.

In this case, the control unit 50, the tilt sensor 52 and the yaw rate sensor 53 are installed to the support frame 13, for example, by being accommodated in the support frame 13 of the base body 9. Further, the load sensor 54 is incorporated in the seat 3. Further, the rotary encoders 56R and 56L are provided integrally with the electric motors 31R and 31L. The rotary encoders 56R and 56L may alternatively be attached to the rotating members 27R and 27L, respectively.

More specifically, the aforesaid tilt sensor 52 is constructed of an acceleration sensor and a rate sensor (angular velocity sensor), such as a gyro sensor, and outputs detection signals of these sensors to the control unit 50. Then, the control unit 50 carries out predetermined measurement arithmetic processing (this may be publicly known arithmetic processing) on the basis of the outputs of the acceleration sensor and the rate sensor of the tilt sensor 52 thereby to calculate the measured value of the tilt angle θb of the portion, to which the tilt sensor 52 is installed (the support frame 13 in the present embodiment), relative to the vertical direction and the measured value of the tilt angular velocity θbdot, which is a change rate (differential value) thereof.

In this case, to be more specific, the tilt angle θb to be measured (hereinafter referred to a base body tilt angle θb in some cases) is constituted of a component in the direction about the Y-axis (a pitch direction) θb_x and a component in the direction about the X-axis (a roll direction) θb_y. Similarly, the tilt angular velocity θbdot to be measured (hereinafter referred to a base body tilt angular velocity θbdot in some cases) is constituted of a component in the direction about the Y-axis (the pitch direction) θbdot_x (=dθb_x/dt)

and a component in the direction about the X-axis (the roll direction) θbdot_y (=dθb_y/dt).

Supplementally, according to the present embodiment, the seat 3 tilts integrally with the support frame 13 of the base body 9, so that the base body tilt angle θb also has a meaning as the tilt angle of the payload supporting part 3.

In the description of the present embodiment, regarding variables, such as a motional state amount having components in directions of the X-axis and the Y-axis, such as the aforesaid base body tilt angle θb (or directions about each axes), or variables, such as coefficients related to the motional state amount, the reference characters of the variables will be accompanied by a suffix "_x" or "_y" to distinguishably denote the components.

In this case, for the variables related to translational motions, such as a translational velocity, a component in the X-axis direction thereof will be accompanied by the suffix "_x" and a component in the Y-axis direction thereof will be accompanied by the suffix "_y."

Meanwhile, regarding the variables related to rotational motions, such as angles, rotational velocities (angular velocities), and angular acceleration, for the purpose of convenience, a component in the direction about the Y-axis will be accompanied by the suffix "_x" and a component in the direction about the X-axis will be accompanied by the suffix "_y" in order to match the variables related to translational motions with suffixes.

Further, to denote a variable in the form of a pair of a component in the X-axis direction (or a component in the direction about the Y-axis) and a component in the Y-axis direction (or a component in the direction about the X-axis), the suffix "_xy" is added to the reference character of the variable. For example, to express the aforesaid base body tilt angle θb in the form of the pair of a component in the direction about the Y-axis θb_x and a component in the direction about the X-axis θb_y, the pair will be denoted by "the base body tilt angle θb_xy."

The yaw rate sensor 53 is configured from a gyro sensor and the like, and outputs detection signal corresponding to the yaw rate (the yaw angular velocity) about the axis in the up-and-down direction to the control unit 50. Thereafter, the control unit 50 obtains the value of the yaw rate indicating the output of the yaw rate sensor 53 as a measured value of the yaw rate ωz about the axis in the vertical direction. Because the yaw rate sensor 53 tilts with the base body 9, the measured value of the yaw rate ωz about the axis in the vertical direction may be obtained by correcting the measured value indicated by the output of the yaw rate sensor 53 according to the measured value of the base body tilt angles θb_xy on the basis of the output of the tilt sensor 52.

The load sensor 54 is incorporated in the seat 3 so as to be subjected to a load from the weight of an occupant when the occupant sits on the seat 3, and outputs a detection signal based on the load to the control unit 50. Then, the control unit 50 determines whether or not the occupant is aboard the vehicle 1 on the basis of the measured value of the load indicated by the output of the load sensor 54.

In place of the load sensor 54, a switch type sensor which, for example, turns on when an occupant sits on the seat 3 may be used.

The rotary encoder 56R generates a pulse signal each time the output shaft of the electric motor 31R rotates for a predetermined angle, and outputs the pulse signal to the control unit 50. Then, based on the pulse signal, the control unit 50 measures the rotational angle of the output shaft of the electric motor 53R and further measures the temporal change rate (differential value) of the measured value of the rotational angle as the rotational angular velocity of the electric motor 53R. The same applies to the rotary encoder 56L for the electric motor 31L.

The control unit 50 carries out predetermined arithmetic processing by using the aforesaid measured values thereby to determine velocity commands, which are the desired values of the rotational angular velocities of the electric motors 31R and 31L, respectively, and carries out feedback control on the rotational angular velocity of each of the electric motors 31R and 31L according to the determined velocity commands.

Incidentally, the rotational angular velocity of the output shaft of the electric motor 31R and the rotational angular velocity of the rotating member 27R have a proportional relationship based on the speed reduction ratio of a fixed value between the output shaft and the rotating member 27R. Hence, for the sake of convenience, in the description of the present embodiment, the rotational angular velocity of the electric motor 31R may be used to express the rotational angular velocity of the rotating member 27R. Similarly, the rotational angular velocity of the electric motor 31L may be used to express the rotational angular velocity of the rotating member 27L.

The following will describe in more detail the control processing carried out by the control unit 50.

Figure 7:
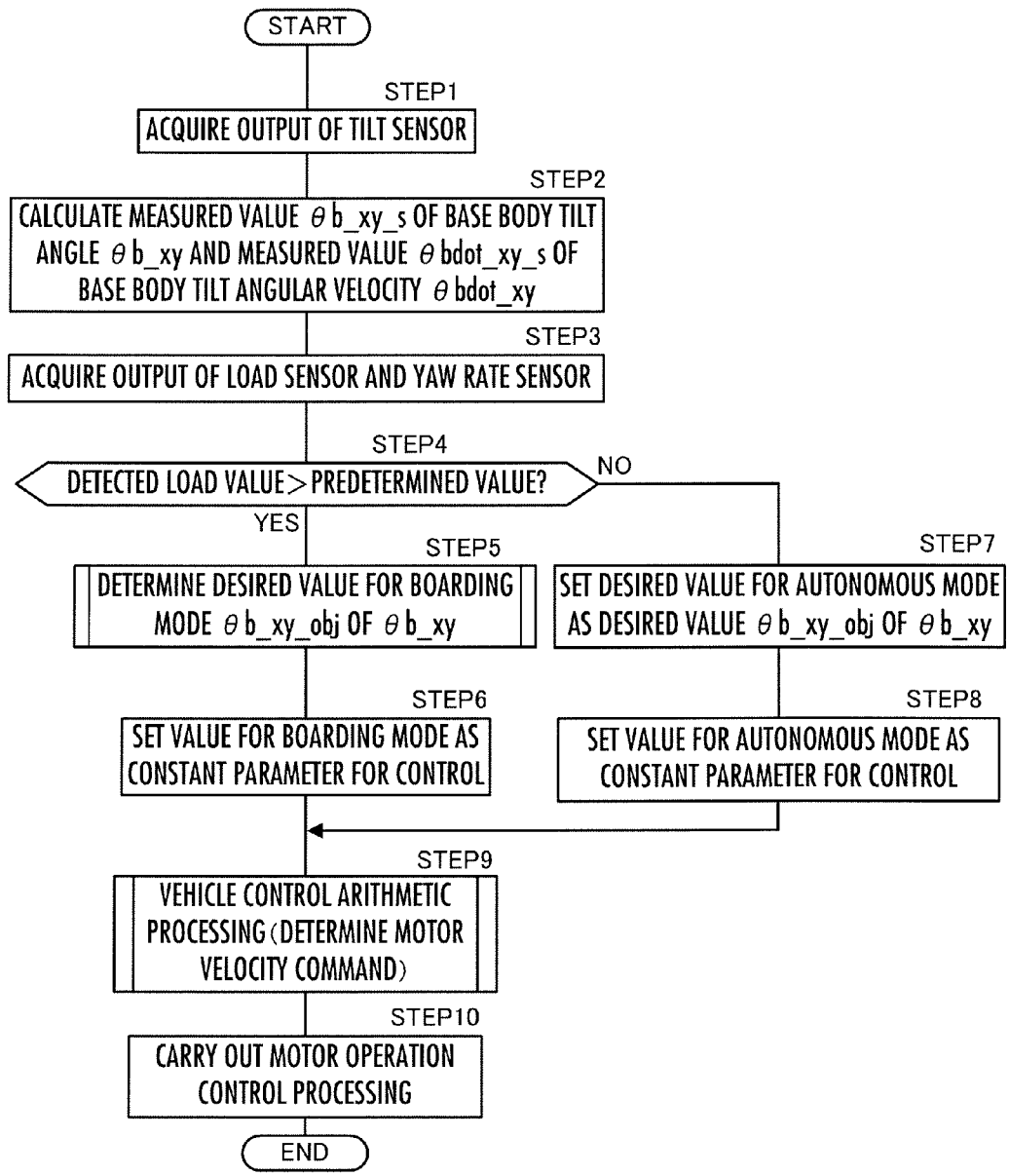
FIG. 7 is a flowchart illustrating the processing by a control unit of the omnidirectional vehicle according to the embodiment.

The control unit 50 executes the processing (main routine processing) illustrated by the flowchart of FIG. 7 at a predetermined control processing cycle.

First, in STEP1, the control unit 50 acquires an output of a tilt sensor 52.

Subsequently, the control unit 50 proceeds to STEP2 to calculate a measured value θb_xy_s of a base body tilt angle θb and a measured value θbdot_xy_s of a base body tilt angular velocity θbdot on the basis of the acquired output of the tilt sensor 52.

In the following description, to denote the observed value (the measured value or an estimated value) of an actual value of a variable (a state amount), such as the aforesaid measured value θb_xy_s, by a reference character, the reference character of the variable will have a suffix "_s".

Next, after acquiring outputs of a load sensor 54 and the yaw rate sensor 53 in STEP3, the control unit 50 carries out the determination processing in STEP4. In the determination processing, the control unit 50 determines whether or not the vehicle 1 has an occupant aboard (whether or not an occupant is sitting on the seat 3) by determining whether or not the load measured value indicated by the acquired output of the load sensor 54 is larger than a predetermined value which has been set beforehand.

Then, if the determination result in STEP4 is affirmative, then the control unit 50 carries out the processing for setting a desired value θb_xy_obj for boarding mode of the base body tilt angle θb and the processing for setting the values of constant parameters (e.g., the basic values of various gains) for controlling the operation of the vehicle 1 in STEP5 and STEP6, respectively.

Although details will be explained later, in STEP5, the control unit 50 variably determines the desired values θb_xy_obj for boarding mode according to the measured value ωz_s of the yaw rate ωz obtained in STEP3.

Here, the term "boarding mode" means the operation mode of the vehicle 1 in the case where the occupant is aboard the vehicle 1. If explanation is to be given roughly, the desired values θb_xy_obj for boarding mode determined in STEP5 are, in the state where no centrifugal force acts on the vehicle 1 or hardly acts on the vehicle 1, such as during straight movement of the vehicle 1, determined to a predetermined reference desired values θb_xy_obj_base. The reference desired values θb_xy_obj_base are preset such that the reference desired values θb_xy_obj_base coincide or substantially coincide with the measured values θb_xy_s of the base body tilt angle θb measured on the basis of an output of the tilt sensor 52 in a posture of the base body 9 in which the overall center-of-gravity point of the vehicle 1 and the occupant seated on the seat 3 (hereinafter referred to as the vehicle-occupant overall center-of-gravity point) is positioned substantially right above a ground contact surface of the wheel assembly 5. And, in the situation where the centrifugal force acts on the vehicle by the circling movement of the vehicle, the desired values θb_xy_obj for boarding mode, in a case where it is agreed with the base body tilt angle θb, are determined to angular values so that the vehicle-occupant overall center-of-gravity point approaches a center of circulation from the position approximately immediately above the ground contact surface of the wheel assembly 5 (the position corresponding to the reference desired values θb_xy_obj_base).

Further, in STEP6, the control unit 50 sets predetermined values for the boarding mode as the values of constant parameters for controlling the operation of the vehicle 1. The constant parameters include, for example, hx, hy, Ki_a_x, Ki_b_x, Ki_a_y, and Ki_b_y (i=1, 2, 3), which will be discussed later.

Meanwhile, if the determination result in STEP4 is negative, then the control unit 50 carries out the processing for setting a desired value θb_xy_obj of a base body tilt angle θb_xy and the processing for setting the values of constant parameters for controlling the operation of the vehicle 1 in STEP7 and STEP8, respectively.

In STEP7, the control unit 50 sets a predetermined desired value for an autonomous mode as the desired value θb_xy_obj of the base body tilt angle θb.

Here, the term "autonomous mode" means an operation mode of the vehicle 1 in the case where the occupant is not aboard the vehicle 1. The desired value θb_xy_obj for the autonomous mode is preset such that desired value θb_xy_obj coincides or substantially coincides with the measured value θb_xy_s of the base body tilt angle θb measured on the basis of an output of the tilt sensor 52 in a posture of the base body 9 in which the center-of-gravity point of the vehicle 1 alone (hereinafter referred to as the vehicle-alone center-of-gravity point) is positioned substantially right above the ground contact surface of the wheel assembly 5. The desired value θb_xy_obj for the autonomous mode is generally different from the reference desired values θb_xy_obj_base for boarding mode.

Further, in STEP8, the control unit 50 sets predetermined values for the autonomous mode as the values of constant parameters for controlling the operation of the vehicle 1. The values of the constant parameters for the autonomous mode are different from the values of the constant parameters for the boarding mode.

The aforesaid values of the constant parameters are set to be different between the boarding mode and the autonomous mode, because the response characteristics of the operations of the vehicle 1 relative to control inputs are different from each other due to the differences in the height of the aforesaid center-of-gravity point, the overall mass, and the like between the respective modes.

By the processing in STEP4 to STEP8 described above, the desired value θb_xy_obj of the base body tilt angle θb_xy and the values of the constant parameters are set for each of the operational modes, namely, the boarding mode and the autonomous mode.

The processing in STEP6 may be carried out only in the case where the determination result in STEP4 changes from negative to positive. Further, the processing in STEP7 and STEP8 may be carried out only in the case where the determination result in STEP4 changes from positive to negative.

Supplementally, in both the boarding mode and the autonomous mode, the desired value of a component θbdot_x in the direction about a Y-axis of the base body tilt angular velocity θbdot and the desired value of a component θbdot_y in the direction about an X-axis thereof are both 0. For this reason, it is unnecessary to carry out the processing for setting a desired value of the base body tilt angular velocity θbdot_xy.

After carrying out the processing in STEP5 and STEP6 or the processing in STEP7 and STEP8 as described above, the control unit 50 carries out vehicle control arithmetic processing in STEP9 thereby to determine the speed commands for electric motors 31R and 31L, respectively. The vehicle control arithmetic processing will be discussed later in detail.

Subsequently, the control unit 50 proceeds to STEP10 to carry out the processing for controlling the operations of the electric motors 31R and 31L according to the speed commands determined in STEP9. In this operation control processing, based on the difference between the speed command for the electric motor 31R determined in STEP9 and the measured value of the rotational speed of the electric motor 31R measured on the basis of an output of a rotary encoder 56R, the control unit 50 determines a desired value (desired torque) of an output torque of the electric motor 31R such that the difference is converged to 0. Then, the control unit 50 controls the current supplied to the electric motor 31R such that the electric motor 31R outputs an output torque of the desired torque. The same applies to the operation control of the left electric motor 31L.

The above has described the general control processing carried out by the control unit 50.

The vehicle control arithmetic processing in STEP9 mentioned above will now be described in detail.

In the following description, the vehicle-occupant overall center-of-gravity point in the boarding mode and the vehicle-alone center-of-gravity point in the autonomous mode will be generically referred to as the vehicle system center-of-gravity point. The vehicle system center-of-gravity point will mean the vehicle-occupant overall center-of-gravity point when the operational mode of the vehicle 1 is the boarding mode and will mean the vehicle-alone center-of-gravity point when the operational mode of the vehicle 1 is the autonomous mode.

Further, in the following description, regarding the values (updated values) determined at each control processing cycle by the control unit 50, a value determined at a current (latest) control processing cycle may be referred to as a current value, and a value determined at an immediately preceding control processing cycle may be referred to as a previous value. Further, a value will mean a current value unless otherwise specified as a current value or a previous value.

Further, regarding the velocity and acceleration in the X-axis direction, a forward-facing direction will be defined as a positive direction, and regarding the velocity and acceleration in the Y-axis direction, a left-facing direction will be defined as the positive direction.

Figure 8:
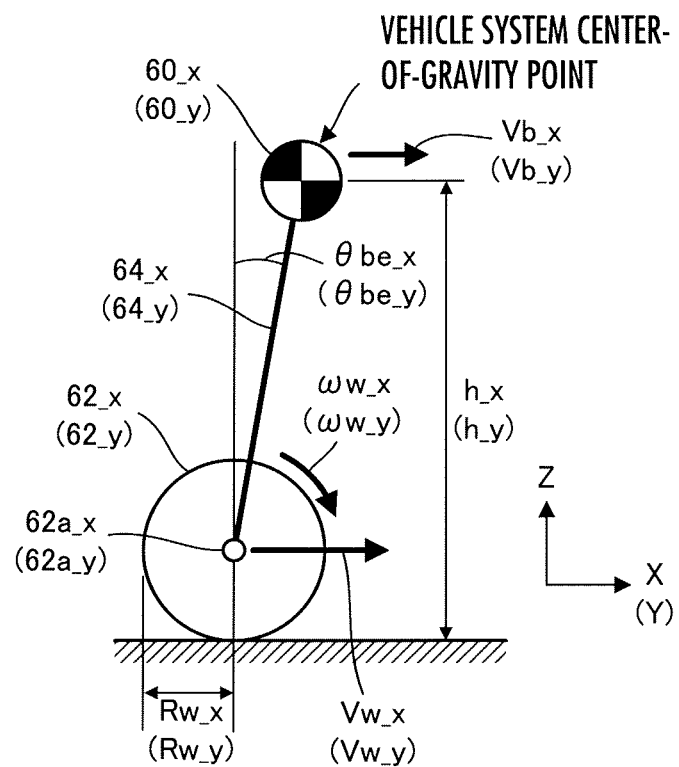
FIG. 8 is a diagram illustrating an inverted pendulum model expressing the dynamic behaviors of the omnidirectional vehicle according to the embodiment.

In the present embodiment, the vehicle control arithmetic processing in STEP9 is carried out, assuming that the dynamic behaviors of the vehicle system center-of-gravity point (more specifically, the behaviors observed by projecting the behaviors from the Y-axis direction onto a plane (XZ plane) which is orthogonal thereto, and the behaviors observed by projecting the behaviors from the X-axis direction onto a plane (YZ plane) which is orthogonal thereto) are approximately expressed by the behaviors of an inverted pendulum model (dynamic behaviors of the inverted pendulum), as shown in FIG. 8.

In FIG. 8, unparenthesized reference numerals denote the reference numerals associated with the inverted pendulum model observed from the Y-axis direction, while the parenthesized reference numerals denote the reference numerals associated with the inverted pendulum model observed from the X-axis direction.

In this case, the inverted pendulum model expressing a behavior observed from the Y-axis direction is provided with a mass point 60_x positioned at the vehicle system center-of-gravity point and a imaginary wheel 62_x, which has a rotational axis 62a_x parallel to the Y-axis direction and which freely circumrotate on a floor surface (hereinafter referred to as the imaginary wheel 62_x). Further, the mass point 60_x is supported by a rotational shaft 62a_x of the imaginary wheel 62_x through the intermediary of a linear rod 64_x such that the mass point 60_x is swingable about the rotational shaft 62a_x, using the rotational shaft 62a_x as the supporting point.

In this inverted pendulum model, a motion of the mass point 60_x corresponds to a motion of the vehicle system center-of-gravity point observed from the Y-axis direction. Further, it is assumed that the tilt angle θbe_x of the rod 64_x relative to a vertical direction coincides with a difference θbe_x_s between a base body tilt angle measured value θb_x_s in the direction about the Y-axis and a base body tilt angle desired value θb_x_obj (=θb_x_s−θb_x_obj). It is also assumed that a changing velocity of the tilt angle θbe_x of the rod 64_x (=dθbe_x/dt) coincides with a base body tilt angular velocity measured value θbdot_x_s in the direction about the Y-axis. Further, it is assumed that a moving velocity Vw_x of the imaginary wheel 62_x (the translational moving velocity in the X-axis direction) coincides with the moving velocity of the wheel assembly 5 of the vehicle 1 in the X-axis direction.

Similarly, the inverted pendulum model expressing a behavior observed from the X-axis direction (refer to the parenthesized reference numerals in FIG. 8) is provided with a mass point 60_y positioned at the vehicle system center-of-gravity point and a imaginary wheel 62_y, which has a rotational axis 62a_y parallel to the X-axis direction and which freely circumrotate on a floor surface (hereinafter referred to as the imaginary wheel 62_y). Further, the mass point 60_y is supported by a rotational shaft 62a_y of the imaginary wheel 62_y through the intermediary of a linear rod 64_y such that the mass point 60_y is swingable about the rotational shaft 62a_y, using the rotational shaft 62a_y as the supporting point.

In this inverted pendulum model, a motion of the mass point 60_y corresponds to a motion of the vehicle system center-of-gravity point observed from the X-axis direction. Further, it is assumed that the tilt angle θbe_y of the rod 64_y relative to the vertical direction coincides with a difference θbe_y_s between a base body tilt angle measured value θb_y_s in the direction about the X-axis and a base body tilt angle desired value θb_y_obj (=θb_y_s−θb_y_obj). It is also assumed that a changing velocity of the tilt angle θbe_y of the rod 64_y (=dθbe_y/dt) coincides with a base body tilt angular velocity measured value θbdot_y_s in the direction about the X-axis. Further, it is assumed that a moving velocity Vw_y of the imaginary wheel 62_y (the translational moving velocity in the Y-axis direction) coincides with the moving velocity of the wheel assembly 5 of the vehicle 1 in the Y-axis direction.

It is assumed that the imaginary wheels 62_x and 62_y have radii Rw_x and Rw_y of predetermined values, respectively.

It is assumed that relationships represented by expressions 01a and 01b given below hold between rotational angular velocities ωw_x and ωw_y of the imaginary wheels 62_x and 62_y, respectively, and rotational angular velocities ω_R and ω_L of the electric motors 31R and 31L, respectively (more accurately, the rotational angular velocities ω_R and ω_L of rotational members 27R and 27L, respectively).

$$\omega w\_x = (\omega\_R + \omega\_L)/2 \quad \text{Expression 01a}$$

$$\omega w\_y = C \cdot (\omega\_R - \omega\_L)/2 \quad \text{Expression 01b}$$

where "C" in expression 01b denotes a coefficient of a predetermined value that depends on a mechanical relationship or slippage between free rollers 29R and 29L and the wheel assembly 5. The positive directions of ωw_x, ω_R and ω_L are the directions in which the imaginary wheel 62_x rotates in the case where the imaginary wheel 62_x circumrotates forward. The positive direction of ωw_y is the direction in which the imaginary wheel 62_y rotates in the case where the imaginary wheel 62_y circumrotates leftwards.

Here, the dynamics of the inverted pendulum model shown in FIG. 8 is represented by expressions 03x and 03y given below. Expression 03x is an expression that represents the dynamics of the inverted pendulum model observed from the Y-axis direction, while expression 03y is an expression that represents the dynamics of the inverted pendulum model observed from the X-axis direction.

$$d^2\theta be\_x/dt^2 = \alpha\_x \cdot \theta be\_x + \beta\_x \cdot \omega dot\_x \quad \text{Expression 03x}$$

$$d^2\theta be\_y/dt^2 = \alpha\_y \cdot \theta be\_y + \beta\_y \cdot \omega dot\_y \quad \text{Expression 03y}$$

where ωwdot_x in expression 03x denotes the rotational angular acceleration (first-order differential value of the rotational angular velocity ωw_x) of the imaginary wheel 62_x, α_x denotes a coefficient which depends on a mass or a height h_x of the mass point 60_x, and β_x denotes a coefficient which depends on an inertia (inertial moment) or the radius Rw_x of the imaginary wheel 62_x. The same applies to ωwdot_y, α_y, and β_y in expression 03y.

As may be understood from these expressions 03x and 03y, the motions of the mass points 60_x and 60_y of the inverted pendulum model (i.e., the motions of the vehicle system center-of-gravity point) are specified, depending on the rotational angular acceleration ωwdot_x of the imaginary wheel 62_x and the rotational angular acceleration ωwdot_y of the imaginary wheel 62_y, respectively.

In the present embodiment, therefore, the rotational angular acceleration ωwdot_x of the imaginary wheel 62_x is used as the manipulated variable (control input) for controlling the motion of the vehicle system center-of-gravity point observed from the Y-axis direction, while the rotational angular acceleration ωwdot_y of the imaginary wheel 62_y is used as the manipulated variable (control input) for controlling the motion of the vehicle system center-of-gravity point observed from the X-axis direction.

To briefly describe the vehicle control arithmetic processing in STEP9, the control unit 50 determines imaginary wheel rotational angular acceleration commands ωwdot_x_cmd and ωwdot_y_cmd, which are the command values (desired values) of the rotational angular accelerations ωwdot_x and ωwdot_y as the manipulated variables such that the motion of the mass point 60_x observed in the X-axis direction and the motion of the mass point 60_y observed in the Y-axis direction become the motions corresponding to desired motions of the vehicle system center-of-gravity point. Further, the control unit 50 determines the values obtained by integrating the imaginary wheel rotational angular acceleration commands ωwdot_x_cmd and ωwdot_y_cmd, respectively, as the imaginary wheel rotational angular velocity commands ωw_x_cmd and ωw_y_cmd, which are the command values (desired values) of the rotational angular velocities ωw_x and ωw_y of the imaginary wheels 62_x and 62_y, respectively.

Further, the control unit 50 defines the moving velocity of the imaginary wheel 62_x corresponding to the imaginary wheel rotational angular velocity command ωw_x_cmd (=Rw_x·ωw_x_cmd) and the moving velocity of the imaginary wheel 62_y corresponding to the imaginary wheel rotational angular velocity command ωw_y_cmd (=Rw_y·ωw_y_cmd) as the desired moving velocity of the wheel assembly 5 of the vehicle 1 in the X-axis direction and the desired moving velocity thereof in the Y-axis direction, respectively, and the control unit 50 determines velocity commands ω_R_cmd and ω_L_cmd of the electric motors 31R and 31L, respectively, so as to achieve the desired moving velocities.

In the present embodiment, the imaginary wheel rotational angular acceleration commands ωwdot_x_cmd and ωwdot_y_cmd as the manipulated variables (control inputs) are determined by adding up three manipulated variable components, as indicated by expressions 07x and 07y, which will be discussed later.

Figure 9:
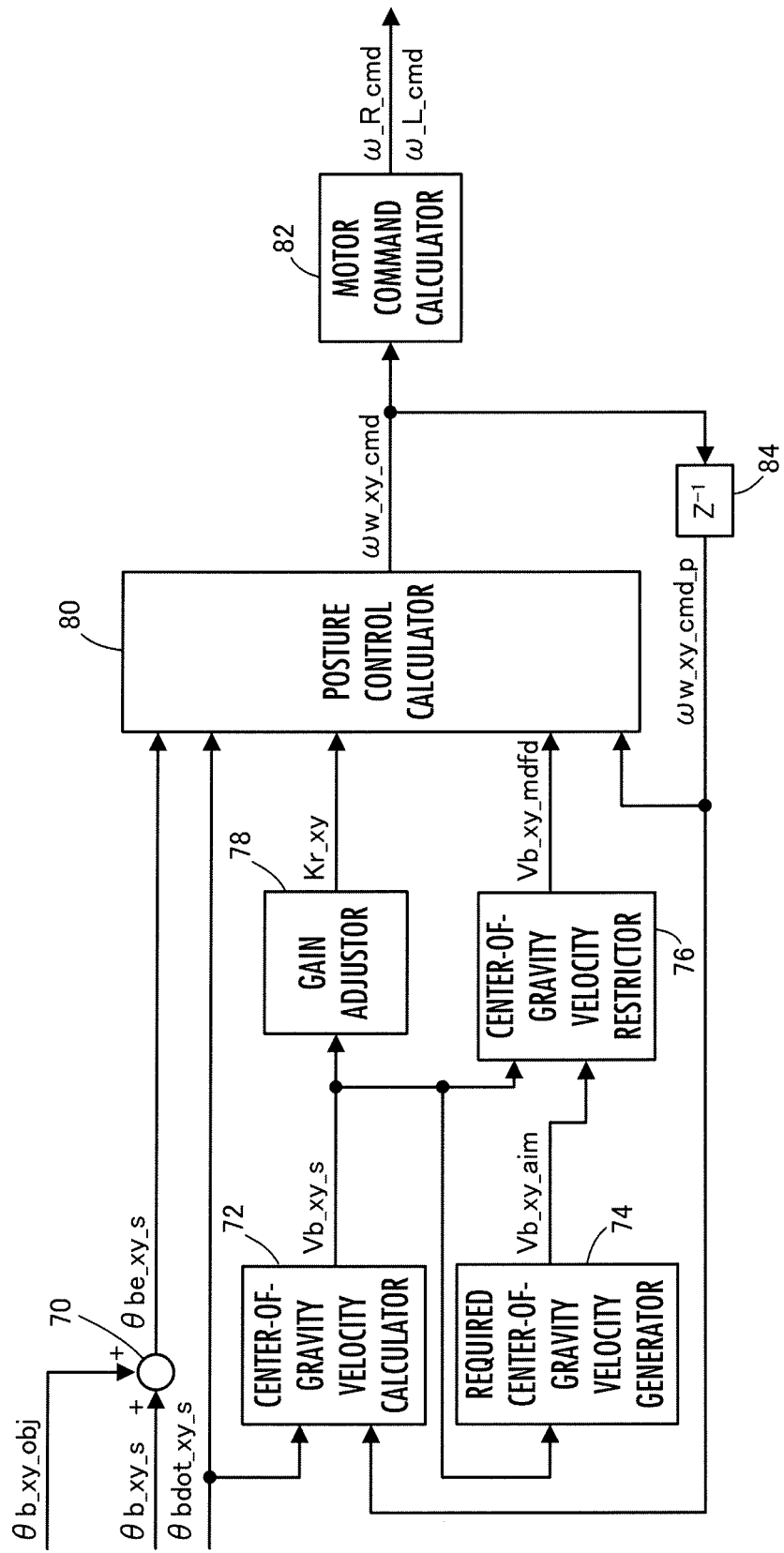
FIG. 9 is a block diagram illustrating a processing function related to the processing in STEP9 of FIG. 7.

The control unit 50 is provided with the functions illustrated in the block diagram of FIG. 9 as the functions for carrying out the vehicle control arithmetic processing in STEP9 as described above.

More specifically, the control unit 50 is provided with an error calculator 70 which calculates the base body tilt angle error measured value θbe_xy_s, which is the difference between the base body tilt angle measured value θb_xy_s and the base body tilt angle desired value θb_xy_obj, a center-of-gravity velocity calculator 72 which calculates an estimated center-of-gravity velocity value Vb_xy_s as an observed value of a center-of-gravity velocity Vb_xy, which is the moving velocity of the vehicle system center-of-gravity point, a required center-of-gravity velocity generator 74 which generates a required center-of-gravity velocity V_xy_aim as the required value of the center-of-gravity velocity Vb_xy presumably required by a steering operation of the vehicle 1 (an operation for adding a propulsion force to the vehicle 1) by an occupant or the like, a center-of-gravity velocity restrictor 76 which determines a desired center-of-gravity velocity for control Vb_xy_mdfd as the desired value of the center-of-gravity velocity Vb_xy by taking into account a restriction based on a permissible range of the rotational angular velocities of the electric motors 31R and 31L from the aforesaid estimated center-of-gravity velocity value Vb_xy_s and the required center-of-gravity velocity V_xy_aim, and a gain adjustor 78 which determines a gain adjustment parameter Kr_xy for adjusting the values of the gain coefficients of expressions 07x and 07y, which will be discussed later.

The control unit 50 is further provided with a posture control calculator 80 which calculates the imaginary wheel rotational angular velocity command ωw_xy_cmd, and a motor command calculator 82 which converts the imaginary wheel rotational angular velocity command ωw_xy_cmd into a pair of a velocity command ω_R_cmd (a command value of a rotational angular velocity) for the right electric motor 31R and a velocity command ω_L_cmd (a command value of a rotational angular velocity) for the left electric motor 31L.

Reference numeral 84 in FIG. 9 denotes a delay element which receives the imaginary wheel rotational angular velocity command ωw_xy_cmd calculated at each control processing cycle by the posture control calculator 80. The delay element 84 outputs a previous value ωw_xy_cmd_p of the imaginary wheel rotational angular velocity command ωw_xy_cmd at each control processing cycle.

In the vehicle control arithmetic processing in STEP9 described above, the processing by the aforesaid processing sections is carried out as described below.

The control unit 50 first carries out the processing by the error calculator 70 and the processing by the center-of-gravity velocity calculator 72.

The error calculator 70 receives the base body tilt angle measured values θb_xy_s (θb_x_s and θb_y_s) calculated in the aforesaid STEP2 and the desired values θb_xy_obj (θb_x_obj and θb_y_obj) set in the aforesaid STEP5 or STEP7. Then, the error calculator 70 subtracts θb_x_obj from θb_x_s to calculate the base body tilt angle error measured value θbe_x_s (=θb_x_s−θb_x_obj) in the direction about the Y-axis, and also subtracts θb_y_obj from θb_y_s to calculate the base body tilt angle error measured value θbe_y_s (=θb_y_s−θb_y_obj) in the direction about the X-axis.

The processing by the error calculator 70 may be carried out before the vehicle control arithmetic processing in STEP9. For example, the processing by the error calculator 70 may be carried out during the processing in the aforesaid STEP5 or STEP7.

The center-of-gravity velocity calculator 72 receives the current value of the base body tilt angular velocity measured values θbdot_xy_s (θbdot_x_s and θbdot_y_s) calculated in the aforesaid STEP2 and also receives the previous value ωw_xy_cmd_p of the imaginary wheel velocity command ωw_xy_cmd (ωw_x_cmd_p and ωw_y_cmd_p) from the delay element 84. Then, the center-of-gravity velocity calculator 72 calculates an estimated center-of-gravity velocity value Vb_xy_s (Vb_x_s and Vb_y_s) from the above input values according to a predetermined arithmetic expression based on the aforesaid inverted pendulum model.

More specifically, the center-of-gravity velocity calculator 72 calculates Vb_x_s and Vb_y_s according to the following expression 05x and expression 05y, respectively.

$$Vb\_x\_s = Rw\_x \cdot \omega w\_x\_cmd\_p + h\_x \cdot \theta bdot\_x\_s \quad\quad 05x$$

$$Vb\_y\_s = Rw\_y \cdot \omega w\_y\_cmd\_p + h\_y \cdot \theta bdot\_y\_s \quad\quad 05y$$

In these expressions 05x and 05y, Rw_x and Rw_y denote the radii of the imaginary wheels 62_x and 62_y, respectively, as described above, and the values thereof are predetermined values set beforehand. Further, reference characters h_x and h_y denote the heights of the mass points 60_x and 60_y, respectively, of the inverted pendulum model. In this case, according to the present embodiment, the height of the vehicle system center-of-gravity point is maintained to be substantially constant. Thus, predetermined values set beforehand are used as the values of h_x and h_y, respectively. Supplementally, the heights h_x and h_y are included in the constant parameters for setting the values in the aforesaid STEP6 or STEP8.

The first term of the right side of expression 05x given above denotes the moving velocity of the imaginary wheel 62_x in the X-axis direction, which corresponds to the previous value ωw_x_cmd_p of the velocity command of the imaginary wheel 62_x. This moving velocity corresponds to the current value of an actual moving velocity of the wheel assembly 5 in the X-axis direction. Further, the second term of the right side of expression 05x corresponds to the current value of the moving velocity of the vehicle system center-of-gravity point in the X-axis direction attributable to the base body 9 tilting at a tilt angular velocity of θbdot_x_s in the direction about the Y-axis (relative moving velocity in relation to the wheel assembly 5). The same applies to expression 05y.

Alternatively, the pair of the measured values (the current values) of the rotational angular velocities of the electric motors 31R and 31L, respectively, which are measured on the basis of the outputs of the rotary encoders 56R and 56L, may be converted into the pair of the rotational angular velocities of the imaginary wheels 62_x and 62_y, respectively, then the rotational angular velocities may be used in place of ωw_x_cmd_p and ωw_y_cmd_p of expressions 05x and 05y. However, in order to eliminate the influences of noises contained in the measured values of the rotational angular velocities, it is advantageous to use ωw_x_cmd_p and ωw_y_cmd_p, which are desired values.

Subsequently, the control unit 50 carries out the processing by the required center-of-gravity velocity generator 74 and the processing by the gain adjustor 78. In this case, the required center-of-gravity velocity generator 74 and the gain adjustor 78 respectively receive the estimated center-of-gravity velocity values Vb_xy_s (Vb_x_s and Vb_y_s) calculated by the center-of-gravity velocity calculator 72 as described above.

Then, the required center-of-gravity velocity generator 74 determines the required center-of-gravity velocities V_xy_aim (V_x_aim, V_y_aim) on the basis of the input estimated center-of-gravity velocity values Vb_xy_s (Vb_x_s and Vb_y_s) when the operation mode of the vehicle 1 is the boarding mode. This will be discussed in detail later. In the present embodiment, if the operation mode of the vehicle 1 is the autonomous mode, then the required center-of-gravity velocity generator 74 sets both required center-of-gravity velocities V_x_aim and V_y_aim to 0.

Further, the gain adjustor 78 determines the gain adjustment parameters Kr_xy (Kr_x and Kr_y) on the basis of the input estimated center-of-gravity velocity values Vb_xy_s (Vb_x_s and Vb_y_s).

The processing by the gain adjustor 78 will be described below with reference to FIG. 10 and FIG. 11.

Figure 10:
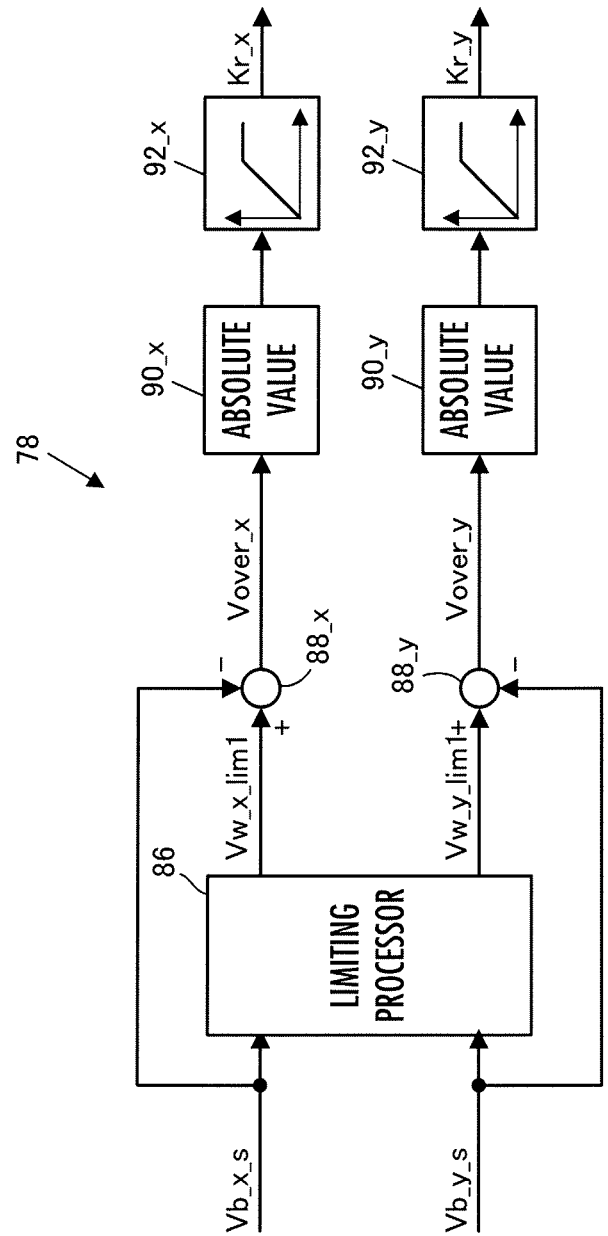
FIG. 10 is a block diagram illustrating a processing function of a gain adjusting element shown in FIG. 9.
Figure 11:
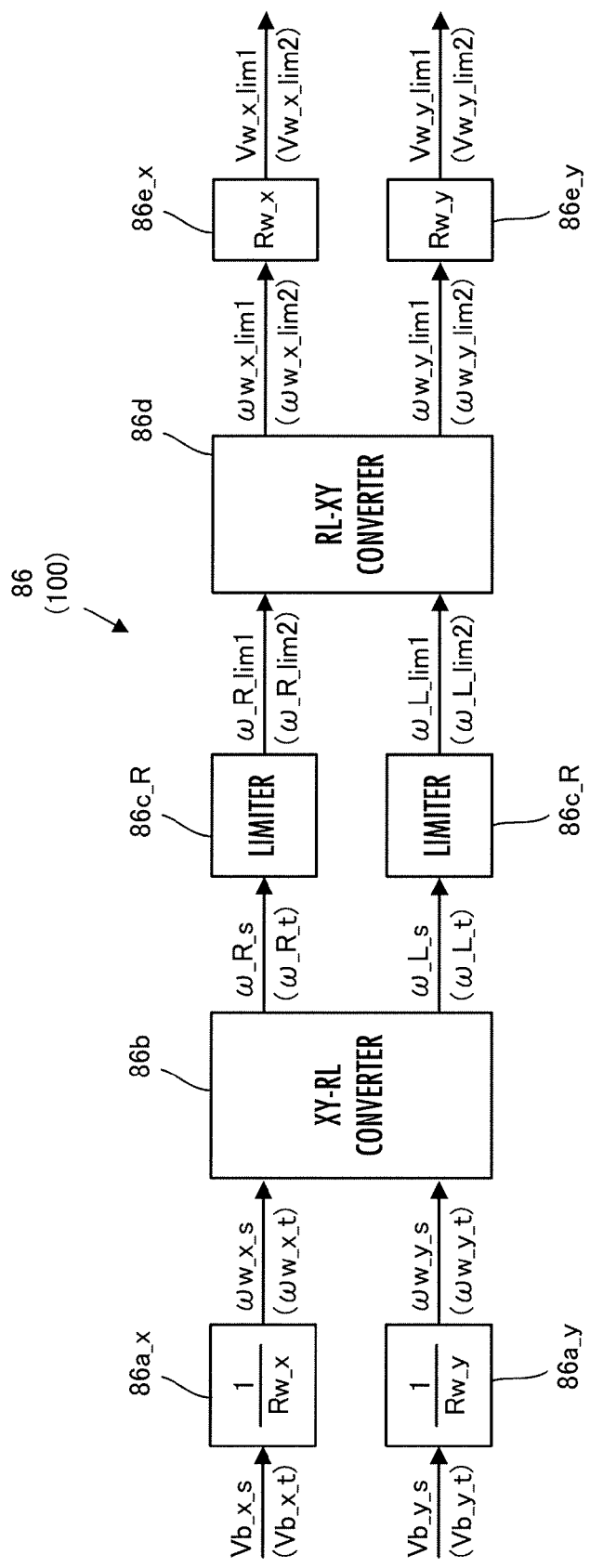
FIG. 11 is a block diagram illustrating a processing function of a limiting processor shown in FIG. 10 (or a limiting processor shown in FIG. 12)

As illustrated in FIG. 10, the gain adjustor 78 supplies the input estimated center-of-gravity velocity values Vb_x_s and Vb_y_s to a limiting processor 86. The limiting processor 86 adds, as appropriate, restrictions based on the permissible ranges of the rotational angular velocities of the electric motors 31R and 31L to the estimated center-of-gravity velocity values Vb_x_s and Vb_y_s, thereby generating output values Vw_x_lim1 and Vw_y_lim1. The output value Vw_x_lim1 means a value obtained after limiting the moving velocity Vw_x of the imaginary wheel 62_x in the X-axis direction and the output value Vw_y_lim1 means a value obtained after limiting the moving velocity Vw_y of the imaginary wheel 62_y in the Y-axis direction.

The processing by the limiting processor 86 will be described in further detail with reference to FIG. 11. The parenthesized reference characters in FIG. 11 denote the processing by a limiting processor 104 of the center-of-gravity velocity restrictor 76, which will be discussed later, and may be ignored in the description related to the processing by the limiting processor 86.

The limiting processor 86 first supplies the estimated center-of-gravity velocity values Vb_x_s and Vb_y_s to processors 86a_x and 86a_y, respectively. The processor 86a_x divides Vb_x_s by the radius Rw_x of the imaginary wheel 62_x to calculate the rotational angular velocity ωw_x_s of the imaginary wheel 62_x in the case where it is assumed that the moving velocity of the imaginary wheel 62_x in the X-axis direction coincides with Vb_x_s. Similarly, the processor 86a_y calculates the rotational angular velocity ωw_y_s of the imaginary wheel 62_y (=Vb_y_s/Rw_y) in the case where it is assumed that the moving velocity of the imaginary wheel 62_y in the Y-axis direction coincides with Vb_y_s.

Subsequently, the limiting processor 86 converts the pair of ωw_x_s and ωw_y_s into a pair of the rotational angular velocity ω_R_s of the electric motor 31R and the rotational angular velocity ω_L_s of the electric motor 31L by an XY-RL converter 86b.

According to the present embodiment, the conversion is implemented by solving a simultaneous equation obtained by replacing ωw_x, ωw_y, ω_R and ω_L of the aforesaid expressions 01a and 01b by ωw_x_s, ωw_y_s, ω_R_s and ω_L_s, respectively, taking the ω_R_s and ω_L_s as unknowns.

Subsequently, the limit processor 86 supplies the output values ω_R_s and ω_L_s of the XY-RL converter 86b to limiters 86c_R and 86c_L, respectively. At this time, the limiter 86c_R directly outputs the ω_R_s as an output value ω_R_lim1 if the ω_R_s falls within the permissible range for the right motor, which has an upper limit value (>0) and a lower limit value (<0) of predetermined values set beforehand. If the ω_R_s deviates from the permissible range for the right motor, then the limiter 86c_R outputs, as the output value ω_R_lim1, a boundary value of the upper limit value or the lower limit value of the permissible range for the right motor whichever is closer to the ω_R_s. Thus, the output value ω_R_lim1 of the limiter 86c_R is limited to a value within the permissible range for the right motor.

Similarly, the limiter 86c_L directly outputs the ω_L_s as an output value ω_L_lim1 if the ω_L_s falls within the permissible range for the left motor, which has an upper limit value (>0) and a lower limit value (<0) of predetermined values set beforehand. If the ω_L_s deviates from the permissible range for the left motor, then the limiter 86c_L outputs, as the output value ω_L_lim1, a boundary value of the upper limit value or the lower limit value of the permissible range for the left motor whichever is closer to the ω_L_s. Thus, the output value ω_L_lim1 of the limiter 86c_L is limited to a value within the permissible range for the left motor.

The permissible range for the right motor described above is a permissible range which has been set so as to prevent the rotational angular velocity (absolute value) of the right electric motor 31R from becoming excessively high thereby to prevent the maximum value of the torque that can be output by the electric motor 31R from decreasing. This applies also to the permissible range for the left motor.

Subsequently, the limit processor 86 converts the pair of the output values ω_R_lim1 and ω_L_lim1 of the limiters 86c_R and 86c_L, respectively, into a pair of the rotational angular velocities ωw_x_lim1 and ωw_y_lim1 of the imaginary wheels 62_x and 62_y, respectively, by an RL-XY converter 86d.

The conversion is the processing of the inverse conversion of the processing of the conversion by the aforesaid XY-RL converter 86b. This processing is implemented by solving a simultaneous equation obtained by replacing ωw_x, ωw_y, ω_R and ω_L of the aforesaid expressions 01a and 01b by ωw_x_lim1, ωw_y_lim1, ω_R_lim1 and ω_L_lim1, respectively, taking the ωw_x_lim1 and ωw_y_lim1 as unknowns.

Subsequently, the limit processor 86 supplies the output values ωw_x_lim1 and ωw_y_lim1 of the RL-XY converter 86d to processors 86e_x and 86e_y, respectively. The processor 86e_x multiplies ωw_x_lim1 by the radius Rw_x of the imaginary wheel 62_x to convert ωw_x_lim1 into the moving velocity Vw_x_lim1 of the imaginary wheel 62_x. In the same manner, the processor 86*e*_y converts ωw_y_lim1 into the moving velocity Vw_y_lim1 of the imaginary wheel 62_y (=ωw_y_lim1·Rw_y).

If it is assumed that the processing by the limiting processor 86 described above causes the moving velocity Vw_x of the imaginary wheel 62_x in the X-axis direction and the moving velocity Vw_y of the imaginary wheel 62_y in the Y-axis direction to agree with the estimated center-of-gravity velocity values Vb_x_s and Vb_y_s, respectively (in other words, if it is assumed that the moving velocity of the wheel assembly 5 in the X-axis direction and the moving velocity in the Y-axis direction are set to agree with Vb_x_s and Vb_y_s, respectively), then the pair of output values Vw_x_lim1 and Vw_y_lim1 coinciding with Vb_x_s and Vb_y_s, respectively, is output from the limiting processor 86 if the rotational angular velocities ω_R_s and ω_L_s of the electric motors 31R and 31L, respectively, which are required for achieving the moving velocities, both fall within permissible ranges.

Meanwhile, if both or one of the rotational angular velocities ω_R_s and ω_L_s of the electric motors 31R and 31L, respectively, deviates from the permissible range or ranges, then both or one of the rotational angular velocities is forcibly limited to be within the permissible range, and a pair of the moving velocities in the X-axis direction and the Y-axis direction Vw_x_lim1 and Vw_y_lim1 corresponding to a pair of the limited rotational angular velocities ω_R_lim1 and ω_L_lim1 of the electric motors 31R and 31L, respectively, is output from the limiting processor 86.

Hence, the limiting processor 86 generates a pair of output values Vw_x_lim1 and Vw_y_lim1 such that the output values Vw_x_lim1 and Vw_y_lim1 agree with Vb_x_s and Vb_y_s, respectively, as much as possible under an essential required condition that the rotational angular velocities of the electric motors 31R and 31L corresponding to the pair of the output values Vw_x_lim1 and Vw_y_lim1, respectively, do not deviate from the permissible ranges.

Referring back to the description of FIG. 10, the gain adjustor 78 then carries out the processing by calculators 88_x and 88_y. The calculator 88_x receives the Estimat3ed center-of-gravity velocity value in the X-axis direction Vb_x_s and the output value Vw_x_lim1 of the limiting processor 86. Then, the calculator 88_x calculates a value Vover_x obtained by subtracting Vb_x_s from Vw_x_lim1 and outputs the value Vover_x. Further, the calculator 88_y receives the estimated center-of-gravity velocity value in the Y-axis direction Vb_y_s and the output value Vw_y_lim1 of the limiting processor 86. Then, the calculator 88_y calculates a value Vover_y obtained by subtracting Vb_y_s from Vw_y_lim1 and outputs the value Vover_y.

In this case, if the output values Vw_x_lim1 and Vw_y_lim1 are not forcibly restricted by the limiting processor 86, then Vw_x_lim1=Vb_x_s and Vw_y_lim1=Vb_y_s. Therefore, the output values Vover_x and Vover_y of the calculators 88_x and 88_y, respectively, will be both 0.

Meanwhile, if the output values Vw_x_lim1 and Vw_y_lim1 of the limiting processor 86 are generated by forcibly restricting the input values Vb_x_s and Vb_y_s, then a corrected amount from Vb_x_s of Vw_x_lim1 (=Vw_x_lim1−Vb_x_s) and a corrected amount from Vb_y_s of Vw_y_lim1 (=Vw_y_lim1−Vb_y_s) will be output from the calculators 88_x and 88_y, respectively.

Subsequently, the gain adjustor 78 passes the output value Vover_x of the calculator 88_x through processors 90_x and 92_x in this order thereby to determine the gain adjustment parameter Kr_x. Further, the gain adjustor 78 passes the output value Vover_y of the calculator 88_y through processors 90_y and 92_y in this order thereby to determine the gain adjustment parameter Kr_y. The gain adjustment parameters Kr_x and Kr_y both take values within the range from 0 to 1.

The processor 90_x calculates and outputs the absolute value of the input Vover_x. Further, the processor 92_x generates Kr_x such that the output value Kr_x monotonously increases relative to an input value |Vover_x| and has a saturation characteristic. The saturation characteristic is a characteristic in which a change amount of an output value relative to an increase in an input value becomes 0 or approaches to 0 when the input value increases to a certain level.

In this case, according to the present embodiment, if the input value |Vover_x| is a preset, predetermined value or less, then the processor 92_x outputs, as Kr_x, a value obtained by multiplying the input value |Vover_x| by a proportionality coefficient of a predetermined value. Further, if the input value |Vover_x| is larger than the predetermined value, then the processor 92_x outputs 1 as Kr_x. Incidentally, the proportionality coefficient is set such that the product of |Vover_x| and the proportionality coefficient becomes 1 when |Vover_x| agrees with a predetermined value.

The processing by processors 90_y and 92_y is the same as that carried out by the processors 90_x and 92_x, respectively, described above.

If the output values Vw_x_lim1 and Vw_y_lim1 in the limiting processor 86 are not forcibly restricted by the processing carried out by the gain adjustor 78 described above, that is, if the rotational angular velocities of the electric motors 31R and 31L fall within the permissible ranges even when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, respectively, then the gain adjustment parameters Kr_x and Kr_y are both determined to be 0.

Meanwhile, if the output values Vw_x_lim1 and Vw_y_lim1 of the limiting processor 86 are generated by forcibly restricting the input values Vb_x_s and Vb_y_s, that is, if the rotational angular velocity of one of the electric motors 31R and 31L deviates from the permissible range (if the absolute value of one of the rotational angular velocities becomes excessively high) when the electric motors 31R and 31L are operated such that the moving velocities Vw_x and Vw_y of the wheel assembly 5 in the X-axis direction and the Y-axis direction, respectively, agree with the estimated center-of-gravity velocity values Vb_x_s and Vb_y_s, then the values of the gain adjustment parameters Kr_x and Kr_y are determined on the basis of the absolute values of the aforesaid corrected amounts Vover_x and Vover_y, respectively. In this case, Kr_x is determined to be a larger value as the absolute value of the corrected amount Vover_x increases, the upper limit value thereof being 1. The same applies to Kr_y.

Returning to the description of FIG. 9, after carrying out the processing by the center-of-gravity velocity calculator 72 and the required center-of-gravity velocity generator 74 as described above, the control unit 50 then carries out the processing by the center-of-gravity velocity restrictor 76.

The center-of-gravity velocity restrictor 76 receives the estimated center-of-gravity velocities Vb_xy_s (Vb_x_s and Vb_y_s) calculated by the center-of-gravity velocity calculator 72 and the required center-of-gravity velocities Vb_xy_aim (Vb_x_aim and Vb_y_aim) determined by the required center-of-gravity velocity generator 74. Then, the center-of-gravity velocity restrictor 76 carries out the processing illustrated by the block diagram of FIG. 12 by using the above input values so as to determine desired center-of-gravity velocities for control Vb_xy_mdfd (Vb_x_mdfd and Vb_y_mdfd).

To be more specific, the center-of-gravity velocity restrictor 76 first carries out the processing by stead-state error calculators 94_x and 94_y.

In this case, the stead-state error calculator 94_x receives the estimated center-of-gravity velocity value in the X-axis direction Vb_x_s and also receives the previous value Vb_x_mdfd_p of the desired center-of-gravity velocity for control in the X-axis direction Vb_x_mdfd through the intermediary of a delay element 96_x. Then, in the stead-state error calculator 94_x, first, the input Vb_x_s is supplied to a proportional-differential compensation component (PD compensation component) 94a_x. The proportional-differential compensation component 94a_x is a compensation component whose transfer function is denoted by $1+Kd \cdot S$, and adds the input Vb_x_s and the value obtained by multiplying the differential value thereof (temporal change rate) by a coefficient Kd of a predetermined value, and outputs the value resulting from the addition.

Subsequently, the stead-state error calculator 94_x calculates, by a calculator 94b_x, the value obtained by subtracting the input Vb_x_mdfd_p from the output value of the proportional-differential compensation component 94a_x, then supplies the output value of the calculator 94b_x to a low-pass filter 94c_x having a phase compensation function. The low-pass filter 94c_x is a filter whose transfer function is denoted by $(1+T2 \cdot S)/(1+T1 \cdot S)$. Then, the stead-state error calculator 94_x outputs the output value Vb_x_prd of the low-pass filter 94c_x.

Further, the stead-state error calculator 94_y receives the estimated center-of-gravity velocity value in the Y-axis direction Vb_y_s and also receives the previous value Vb_y_mdfd_p of the desired center-of-gravity velocity for control in the Y-axis direction Vb_y_mdfd through the intermediary of a delay element 96_y.

Then, as with the stead-state error calculator 94_x described above, the stead-state error calculator 94_y carries out the processing by a proportional-differential compensation component 94a_y, a calculator 94b_y, and a low-pass filter 94c_y in order and outputs an output value Vb_y_prd of the low-pass filter 94c_y.

Here, the output value Vb_x_prd of the stead-state error calculator 94_x has a meaning as a stead-state error of a future estimated center-of-gravity velocity value in the X-axis direction presumed from a current motion state of the vehicle system center-of-gravity point observed from the Y-axis direction (in other words, the motion state of the mass point 60_x of the inverted pendulum model observed from the Y-axis direction) relative to the desired center-of-gravity velocity for control Vb_x_mdfd of an expected convergence value. Similarly, the output value Vb_y_prd of the stead-state error calculator 94_y has a meaning as a stead-state error of a future estimated center-of-gravity velocity value in the Y-axis direction presumed from a current motion state of the vehicle system center-of-gravity point observed from the X-axis direction (in other words, the motion state of the mass point 60_y of the inverted pendulum model observed from the X-axis direction) relative to the desired center-of-gravity velocity for control Vb_y_mdfd of an expected convergence value. Hereinafter, the output values Vb_x_prd and Vb_y_prd of the stead-state error calculators 94_x and 94_y, respectively, will be referred to as the expected center-of-gravity velocity stead-state error values.

After carrying out the processing by the stead-state error calculators 94_x and 94_y as described above, the center-of-gravity velocity restrictor 76 carries out the processing for adding the required center-of-gravity velocity Vb_x_aim to the output value Vb_x_prd of the stead-state error calculator 94_x and the processing for adding the required center-of-gravity velocity Vb_y_aim to the output value Vb_y_prd of the stead-state error calculator 94_y by calculators 98_x and 98_y, respectively.

Therefore, an output value Vb_x_t of the calculator 98_x will indicate the velocity obtained by adding the required center-of-gravity velocity Vb_x_aim in the X-axis direction to the expected center-of-gravity velocity stead-state error value in the X-axis direction Vb_x_prd. Similarly, an output value Vb_y_t of the calculator 98_y will indicate the velocity obtained by adding the required center-of-gravity velocity Vb_y_aim in the Y-axis direction to the expected center-of-gravity velocity stead-state error value Vb_y_prd in the Y-axis direction.

If the required center-of-gravity velocity in the X-axis direction Vb_x_aim is 0, as in the case where, for example, the operation mode of the vehicle 1 is the autonomous mode, then the expected center-of-gravity velocity stead-state error value in the X-axis direction Vb_x_prd is directly provided as the output value Vb_x_t of the calculator 98_x. Similarly, if the required center-of-gravity velocity in the Y-axis direction Vb_y_aim is 0, then the expected center-of-gravity velocity stead-state error value in the Y-axis direction Vb_y_prd is directly provided as the output value Vb_y_t of the calculator 98_y.

Subsequently, the center-of-gravity velocity restrictor 76 supplies the output values Vb_x_t and Vb_y_t of the calculators 98_x and 98_y, respectively, to a limiting processor 100. The processing by the limiting processor 100 is the same as the processing by the limiting processor 86 of the gain adjustor 78 described above. In this case, as indicated by the parenthesized reference characters in FIG. 11, only the input values and the output values of the individual processing sections of the limiting processor 100 are different from those of the limiting processor 86.

To be more specific, in the limiting processor 100, rotational angular velocities ωw_x_t and ωw_y_t of the imaginary wheels 62_x and 62_y in the case where it is assumed that the moving velocities Vw_x and Vw_y of the imaginary wheels 62_x and 62_y, respectively, coincide with Vb_x_t and Vb_y_t, respectively, are calculated by the processors 86a_x and 86a_y, respectively. Then, the pair of the rotational angular velocities ωw_x_t and ωw_y_t is converted into the pair of the rotational angular velocities ω_R_t and ω_L_t of the electric motors 31R and 31L by the XY-RL converter 86b.

Further, these rotational angular velocities ω_R_t and ω_L_t are limited to values within the permissible range for the right motor and the permissible range for the left motor, respectively, by limiters 86c_R and 86c_L. Then, the values ω_R_lim2 and ω_L_lim2, which have been subjected to the limitation processing, are converted by the RL-XY converter 86d into the rotational angular velocities ωw_x_lim2 and ωw_y_lim2 of the imaginary wheels 62_x and 62_y.

Subsequently, the moving velocities Vw_x_lim2 and Vw_y_lim2 of the imaginary wheels 62_x and 62_y corresponding to the rotational angular velocities ωw_x_lim2 and ωw_y_lim2 are calculated by the processors 86e_x and 86e_y, respectively, and these moving velocities Vw_x_lim2 and Vw_y_lim2 are output from the limiting processor 100.

By carrying out the processing by the limiting processor 100 described above, the limiting processor 100 generates a pair of output values Vw_x_lim2 and Vw_y_lim2 such that the output values Vw_x_lim2 and Vw_y_lim2 agree with Vb_x_t and Vb_y_t, respectively, as much as possible under an essential required condition that the rotational angular velocities of the electric motors 31R and 31L corresponding to the pair of the output values Vw_x_lim2 and Vw_y_lim2, respectively, do not deviate from the permissible ranges, as with the limiting processor 86.

Incidentally, the permissible ranges for the right motor and left motor in the limiting processor 100 do not have to be the same as the permissible ranges in the limiting processor 86, and may be set to be permissible ranges that are different from each other.

Figure 12:
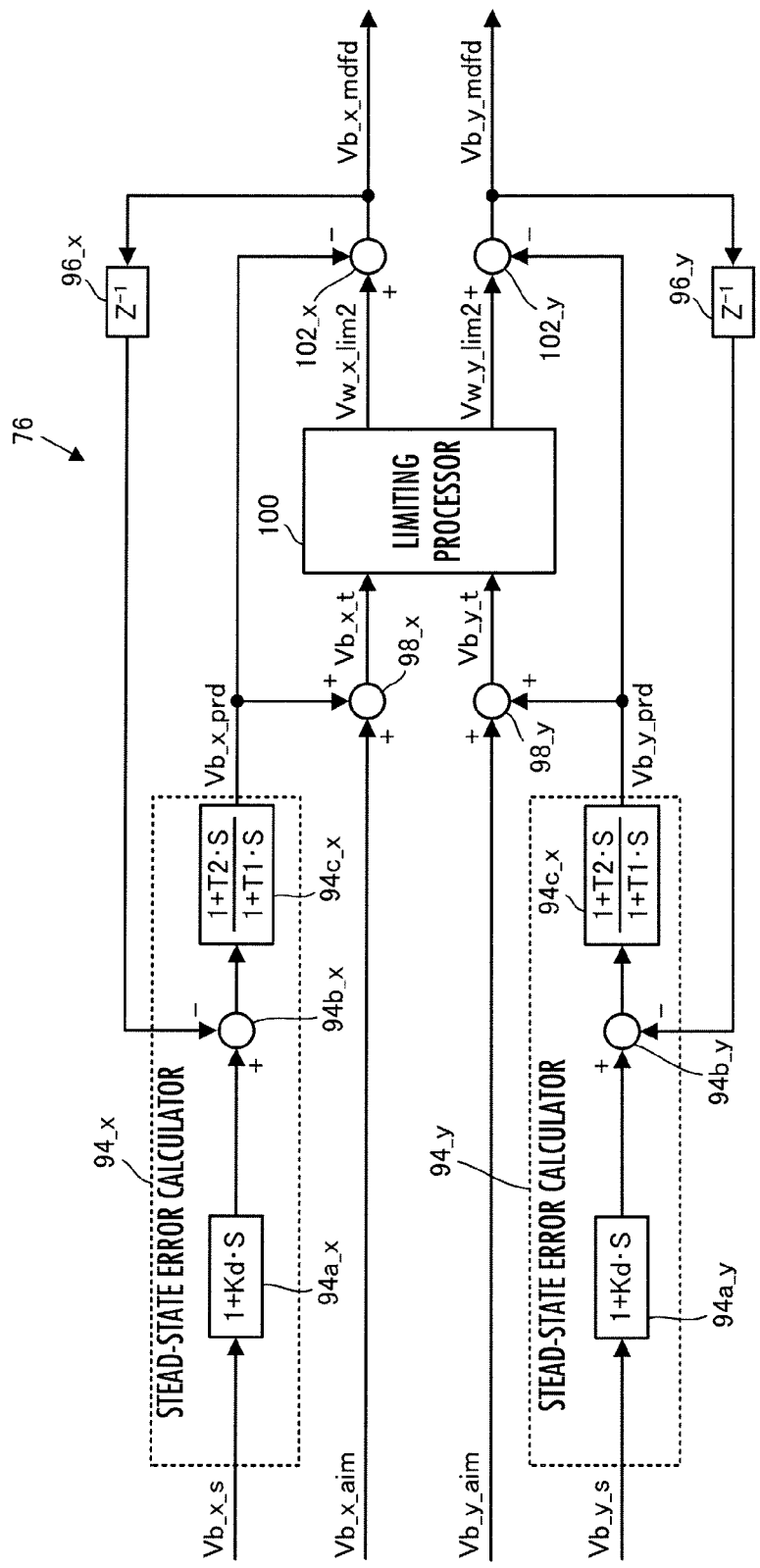
FIG. 12 is a block diagram illustrating a processing function of a center-of-gravity velocity restrictor 76 shown in FIG. 9.

Referring back to the description of FIG. 12, the center-of-gravity velocity restrictor 76 then carries out the processing by calculators 102_x and 102_y to calculate the desired center-of-gravity velocities for control Vb_x_mdfd and Vb_y_mdfd, respectively. In this case, the calculator 102_x calculates a value, which is obtained by subtracting the expected center-of-gravity velocity stead-state error value in the X-axis direction Vb_x_prd from the output value Vw_x_lim2 of the limiting processor 100, as the desired center-of-gravity velocity for control in the X-axis direction Vb_x_mdfd. Similarly, the calculator 102_y calculates a value, which is obtained by subtracting the expected center-of-gravity velocity stead-state error value in the Y-axis direction Vb_y_prd from the output value Vw_y_lim2 of the limiting processor 100, as the desired center-of-gravity velocity for control in the Y-axis direction Vb_y_mdfd.

Regarding the desired center-of-gravity velocities for control Vb_x_mdfd and Vb_y_mdfd determined as described above, in the case where the output values Vw_x_lim2 and Vw_y_lim2 are not forcibly restricted by the limiting processor 100, that is, in the case where the rotational angular velocities of the electric motors 31R and 31L fall within the permissible ranges even when the electric motors 31R and 31L are operated such that the moving velocities of the wheel assembly 5 in the X-axis direction and the Y-axis direction, respectively, agree with the output value Vb_x_t of the calculator 98_x and Vb_y_t of the calculator 98_y, respectively, the required center-of-gravity velocities Vb_x_aim and Vb_y_aim will be directly determined as the desired center-of-gravity velocities for control Vb_x_mdfd and Vb_y_mdfd, respectively.

In this case, if the required center-of-gravity velocity in the X-axis direction Vb_x_aim is 0, then the desired center-of-gravity velocity for control in the X-axis direction Vb_x_mdfd will be also 0, and if the required center-of-gravity velocity in the Y-axis direction Vb_y_aim is 0, then the desired center-of-gravity velocity for control in the Y-axis direction Vb_y_mdfd will be also 0.

Meanwhile, if the output values Vw_x_lim2 and Vw_y_lim2 of the limiting processor 100 are generated by forcibly restricting the input values Vb_x_t and Vb_y_t, that is, if the rotational angular velocity of one of the electric motors 31R and 31L deviates from the permissible range (if the absolute value of one of the rotational angular velocities becomes excessively high) when the electric motors 31R and 31L are operated such that the moving velocities of the wheel assembly 5 in the X-axis direction and the Y-axis direction, respectively, agree with the output value Vb_x_t of the calculator 98_x and the output value Vb_y_t of the calculator 98_y, then for the X-axis direction, a value obtained by correcting the required center-of-gravity velocity Vb_x_aim by a correction amount from the input value Vb_x_t of the output value Vw_x_lim2 of the limiting processor 100 (=Vw_x_lim2−Vb_x_t) (a value obtained by adding the correction amount to Vb_x_aim) is determined as the desired center-of-gravity velocity for control in the X-axis direction Vb_x_mdfd.

Further, regarding the Y-axis direction, a value obtained by correcting the required center-of-gravity velocity Vb_y_aim by a correction amount from the input value Vb_y_t of the output value Vw_y_lim2 of the limiting processor 100 (=Vw_y_lim2−Vb_y_t) (a value obtained by adding the correction amount to Vb_y_aim) is determined as the desired center-of-gravity velocity for control in the Y-axis direction Vb_y_mdfd.

In this case, if the required center-of-gravity velocity Vb_x_aim on, for example, the velocity in the X-axis direction is not 0, then the desired center-of-gravity velocity for control Vb_x_mdfd approaches to 0 more than the required center-of-gravity velocity Vb_x_aim or becomes a velocity in the opposite direction from the required center-of-gravity velocity Vb_x_aim. Further, if the required center-of-gravity velocity Vb_x_aim is 0, then the desired center-of-gravity velocity for control Vb_x_mdfd becomes a velocity in the opposite direction from the expected center-of-gravity velocity stead-state error value in the X-axis direction Vb_x_prd output by the stead-state error calculator 94_x. The same applies to the velocity in the Y-axis direction.

The above has described the processing by the center-of-gravity velocity restrictor 76.

Returning to the description of FIG. 9, after carrying out the processing by the center-of-gravity velocity calculator 72, the center-of-gravity velocity restrictor 76, the gain adjustor 78, and the error calculator 70 as described above, the control unit 50 carries out the processing by the posture control calculator 80.

Figure 13:
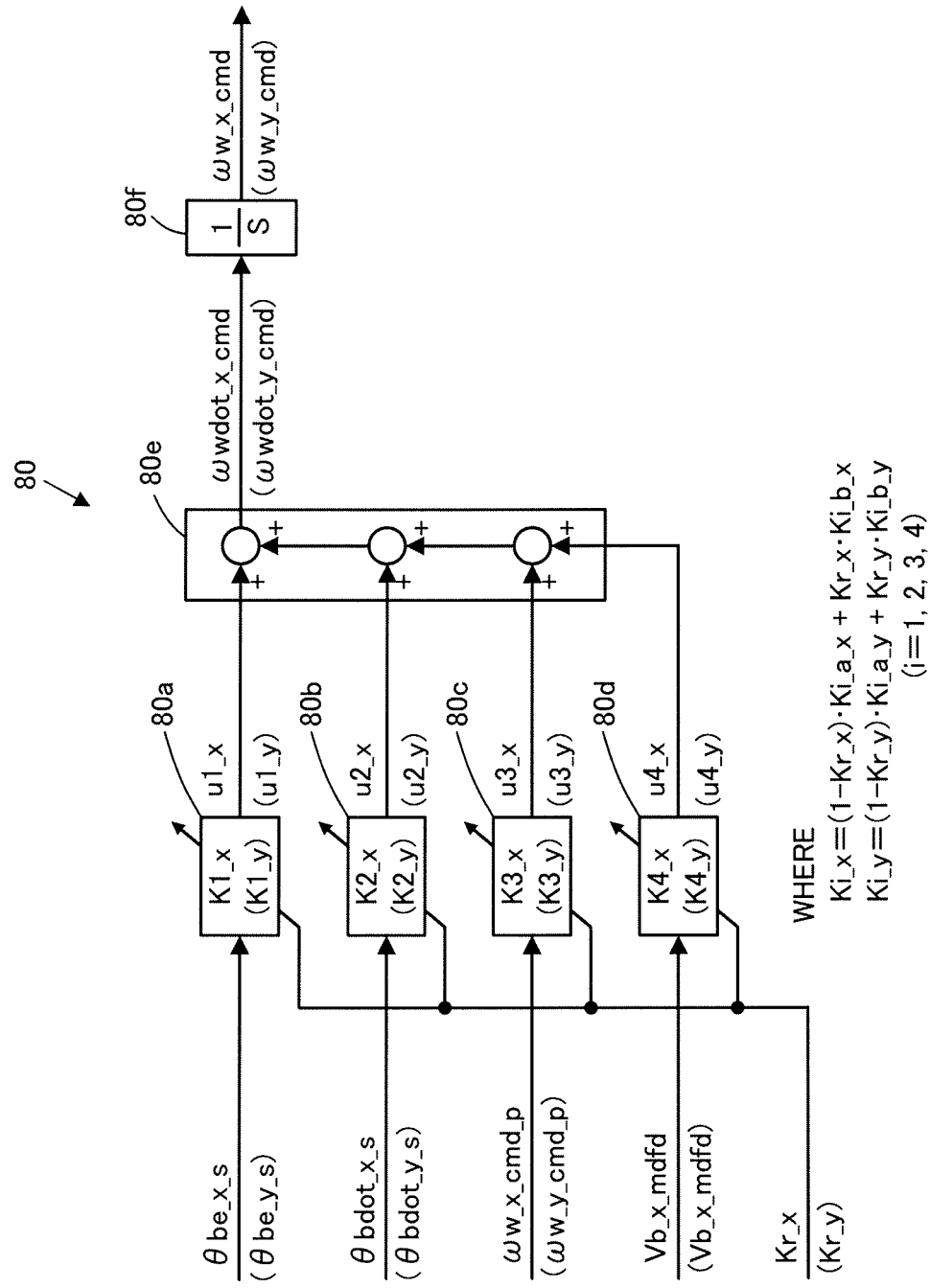
FIG. 13 is a block diagram illustrating a processing function of a posture control calculator 80 shown in FIG. 9.

The processing by the posture control calculator 80 will be described below by referring to FIG. 13. Incidentally, the unparenthesized reference characters in FIG. 13 are the reference characters related to the processing for determining the aforesaid imaginary wheel rotational angular velocity command ωw_x_cmd, which is the desired value of the rotational angular velocity of the imaginary wheel 62_x circumrotating in the X-axis direction. The parenthesized reference characters are the reference characters related to the processing for determining the aforesaid imaginary wheel rotational angular velocity command ωw_y_cmd, which is the desired value of the rotational angular velocity of the imaginary wheel 62_y circumrotating in the Y-axis direction.

The posture control calculator 80 receives the base body tilt angle error measured value θbe_xy_s calculated by the error calculator 70, the base body tilt angular velocity measured values θbdot_xy_s calculated in the aforesaid STEP2, the estimated center-of-gravity velocity values Vb_xy_s calculated by the center-of-gravity velocity calculator 72, the desired center-of-gravity velocities for control Vb_xy_mdfd calculated by the center-of-gravity velocity restrictor 76, and the gain adjustment parameters Kr_xy calculated by the gain adjustor 78.

Then, the posture control calculator 80 first calculates the imaginary wheel rotational angular acceleration commands ωwdot_xy_cmd according to the following expressions 07x and 07y by using the above received values.

$$\omega wdot\_x\_cmd = K1\_x \cdot \theta be\_x\_s + K2\_x \cdot \theta bdot\_x\_s + K3\_x \cdot (Vb\_x\_s - Vb\_x\_mdfd)$$ Expression 07x $$\omega wdot\_y\_cmd = K1\_y \cdot \theta be\_y\_s + K2\_y \cdot \theta bdot\_y\_s + K3\_y \cdot (Vb\_y\_s - Vb\_y\_mdfd)$$ Expression 07y Hence, according to the present embodiment, each imaginary wheel rotational angular acceleration command ωwdot_x_cmd denoting the manipulated variable (control input) for controlling the motion of the mass point 60_x of the inverted pendulum model observed from the Y-axis direction (i.e., the motion of the vehicle system center-of-gravity point observed from the Y-axis direction), and the imaginary wheel rotational angular acceleration command ωwdot_y_cmd denoting the manipulated variable (control input) for controlling the motion of the mass point 60_y of the inverted pendulum model observed from the X-axis direction (i.e., the motion of the vehicle system center-of-gravity point observed from the X-axis direction) are determined by adding up three manipulated variable components (the three terms of the right side of each of expressions 07x and 07y).

In this case, the gain coefficients K1_x, K2_x, and K3_x related to the manipulated variable components in expression 07x are variably set on the basis of the gain adjustment parameter Kr_x, while the gain coefficients K1_y, K2_y, and K3_y related to the manipulated variable components in expression 07y are variably set on the basis of the gain adjustment parameter Kr_y. Hereinafter, the gain coefficients K1_x, K2_x, and K3_x in expression 07x may be referred to as the first gain coefficient K1_x, the second gain coefficient K2_x, and the third gain coefficient K3_x, respectively. The same applies to the gain coefficients K1_y, K2_y, and K3_y in expression 07y.

An i-th gain coefficient Ki_x (i=1, 2, or 3) in expression 07x and an i-th gain coefficient Ki_y (i=1, 2, or 3) in expression 07y are determined on the basis of the gain adjustment parameters Kr_x and Kr_y according to expressions 09x and 09y given below, as indicated by the note in FIG. 13.

$$Ki\_x=(1-Kr\_x)\cdot Ki\_a\_x+Kr\_x\cdot Ki\_b\_x \quad \text{Expression 09x}$$

$$Ki\_y=(1-Kr\_y)\cdot Ki\_a\_y+Kr\_y\cdot Ki\_b\_y \quad \text{Expression 09y}$$

(i=1, 2, 3)

Here, Ki_a_x and Ki_b_x in expression 09x denote constant values set beforehand as the gain coefficient values on a minimum end (an end close to 0) of the i-th gain coefficient Ki_x and as the gain coefficient value on a maximum end (an end away from 0), respectively. The same applies to Ki_a_y and Ki_b_y in expression 09y.

Thus, each i-th gain coefficient Ki_x (i=1, 2 or 3) used in the calculation of expression 07x is determined as a weighted mean value of the constant values Ki_a_x and Ki_b_x corresponding thereto. Further, in this case, the weight applied to each of Ki_a_x and Ki_b_x is changed according to the gain adjustment parameter Kr_x. Therefore, if Kr_x=0, then Ki_x=Ki_a_x, and if Kr_x=1, then Ki_x=Ki_b_x. As Kr_x approaches 1 from 0, the i-th gain coefficient Ki_x approaches Ki_b_x from Ki_a_x.

Similarly, each i-th gain coefficient Ki_y (i=1, 2 or 3) used in the calculation of expression 07y is determined as a weighted mean value of the constant values Ki_a_y and Ki_b_y corresponding thereto. Further, in this case, the weight applied to each of Ki_a_y and Ki_b_y is changed according to the gain adjustment parameter Kr_y. Therefore, as with the case of Ki_x, as the value of Kr_y changes from 0 to 1, the value of the i-th gain coefficient Ki_y changes between Ki_a_y and Ki_b_y.

Supplementally, the aforesaid constant values Ki_a_x, Ki_b_x and Ki_a_y, Ki_b_y (i=1, 2 or 3) are included in the constant parameters, the values of which are set in the aforesaid STEP6 or STEP8.

The posture control calculator 80 uses the first to the third gain coefficients K1_x, K2_x, and K3_x determined as described above to perform the calculation of the above expression 07x, thereby calculating the imaginary wheel rotational angular acceleration command ωwdot_x_cmd related to the imaginary wheel 62_x circumrotating in the X-axis direction.

More detailedly, referring to FIG. 13, the posture control calculator 80 calculates a manipulated variable component u1_x obtained by multiplying the base body tilt angle error measured value θbe_x_s by the first gain coefficient K1_x and a manipulated variable component u2_x obtained by multiplying the base body tilt angular velocity measured value θbdot_x_s by the second gain coefficient K2_x by processors 80a and 80b, respectively. Further, the posture control calculator 80 calculates the difference between the estimated center-of-gravity velocity value Vb_x_s and the desired center-of-gravity velocity for control Vb_x_mdfd (=Vb_x_s−Vb_x_mdfd) by a calculator 80d, and calculates, by a processor 80c, a manipulated variable component u3_x obtained by multiplying the calculated difference by the third gain coefficient K3_x. Then, the posture control calculator 80 adds up these manipulated variable components u1_x, u2_x, and u3_x by a calculator 80e so as to calculate the imaginary wheel rotational angular acceleration command ωwdot_x_cmd.

Similarly, the posture control calculator 80 carries out the calculation of the above expression 07y by using the first to the third gain coefficients K1_y, K2_y, and K3_y determined as described above, thereby calculating the imaginary wheel rotational angular acceleration command ωwdot_y_cmd related to the imaginary wheel 62_y circumrotating in the Y-axis direction.

In this case, the posture control calculator 80 calculates a manipulated variable component u1_y obtained by multiplying the base body tilt angle error measured value θbe_y_s by the first gain coefficient K1_y and a manipulated variable component u2_y obtained by multiplying the base body tilt angular velocity measured value θbdot_y_s by the second gain coefficient K2_y by the processors 80a and 80b, respectively. Further, the posture control calculator 80 calculates the difference between the estimated center-of-gravity velocity value Vb_y_s and the desired center-of-gravity velocity for control Vb_y_mdfd (=Vb_y_s−Vb_y_mdfd) by the calculator 80d, and calculates, by the processor 80c, a manipulated variable component u3_y obtained by multiplying the calculated difference by the third gain coefficient K3_y. Then, the posture control calculator 80 adds up these manipulated variable components u1_y, u2_y, and u3_y by the calculator 80e so as to calculate the imaginary wheel rotational angular acceleration command ωwdot_x_cmd.

Here, the first term (=the first manipulated variable component u1_x) and the second term (=the second manipulated variable component u2_x) of the right side of expression 07x mean the feedback manipulated variable components for converging the base body tilt angle error measured value θbe_x_s in the direction about the X-axis to 0 (converging the base body tilt angle measured value θb_x_s to the desired value θb_x_obj) by the PD law (proportional-differential law) serving as the feedback control law.

Further, the third term (=the third manipulated variable component u3_x) of the right side of expression 07x means a feedback manipulated variable component for converging the difference between the estimated center-of-gravity velocity value Vb_x_s and the desired center-of-gravity velocity for control Vb_x_mdfd to 0 (converging Vb_x_s to Vb_x_mdfd) by a proportional law serving as the feedback control law.

The same applies to the first to the third terms (the first to the third manipulated variable components u1_y, u2_y, and u3_y) of the right side of expression 07y.

After calculating the imaginary wheel rotational angular acceleration commands ωwdot_x_cmd and ωwdot_y_cmd as described above, the posture control calculator 80 integrates each of the ωwdot_x_cmd and ωwdot_y_cmd by an integrator 80f thereby to determine the aforesaid imaginary wheel rotational velocity commands ωw_x_cmd and ωw_y_cmd.

The above has described the details of the processing by the posture control calculator 80.

Supplementally, the imaginary wheel rotational angular acceleration command ωwdot_x_cmd may alternatively be calculated by an expression wherein the third term of the right side of expression 07x is separated into the manipulated variable component based on Vb_x_s (=K3_x·Vb_x_s) and the manipulated variable component based on Vb_x_mdfd (=−K3_x·Vb_x_mdfd). Similarly, the imaginary wheel rotational angular acceleration command ωwdot_y_cmd may alternatively be calculated by an expression wherein the third term of the right side of expression 07y is separated into the manipulated variable component based on Vb_y_s (=K3_y·Vb_y_s) and the manipulated variable component based on Vb_y_mdfd (=−K3_y·Vb_y_mdfd).

Further, in the present embodiment, the rotational angular acceleration commands ωw_x_cmd and ωw_y_cmd of the imaginary wheels 62_x and 62_y have been used as the manipulated variables (control inputs) for controlling the behaviors of the vehicle system center-of-gravity point. However, for example, the drive torques of the imaginary wheels 62_x and 62_y or the translational forces obtained by dividing the driving torques by the radii Rw_x and Rw_y of each imaginary wheels 62_x and 62_y (i.e., the frictional forces between the imaginary wheels 62_x, 62_y and a floor surface) may be used as the manipulated variables.

Returning to the description of FIG. 9, the control unit 50 then supplies the imaginary wheel rotational velocity commands ωw_x_cmd and ωw_y_cmd determined as described above by the posture control calculator 80 to the motor command calculator 82, and carries out the processing by the motor command calculator 82 so as to determine a velocity command ω_R_cmd of the electric motor 31R and a velocity command ω_L_cmd of the electric motor 31L. The processing by the motor command calculator 82 is the same as the processing by the XY-RL converter 86b of the aforesaid limiting processor 86 (refer to FIG. 11).

To be more specific, the motor command calculator 82 determines the velocity commands ω_R_cmd and ω_L_cmd of the electric motors 31R and 31L by a simultaneous equation obtained by replacing ωw_x, ωw_y, ω_R and ω_L of the aforesaid expressions 01a and 01b by ωw_x_cmd, ωw_y_cmd, ω_R_cmd and ω_L_cmd, respectively, taking the ω_R_cmd and ω_L_cmd as unknowns.

Thus, the vehicle control arithmetic processing in the aforesaid STEP9 is completed.

Next, the details of the processing for determining the desired base body tilt angle values θb_xy_obj for boarding mode in aforesaid STEP 5 of FIG. 7 is explained.

In the vehicle 1 of the present embodiment, by the occupant arbitrarily twisting its upper body together with the seat 3 about a body trunk axis of the upper body arbitrarily while vehicle 1 is traveling in the boarding mode, it becomes possible to change the traveling direction of the vehicle 1, and consequently to perform circling movement of the vehicle 1.

And, in the present embodiment, during such circling movement, the desired base body tilt angle value θb_xy_obj is determined to an angle displaced from the reference desired values θb_xy_obj_base, and the base body 9 is tilted so that the position of the vehicle-occupant overall center-of-gravity point moves closer to the center of circulation than the position corresponding to θb_xy_obj_base (the position approximately right above the ground contact surface of the wheel assembly 5).

Figure 14:
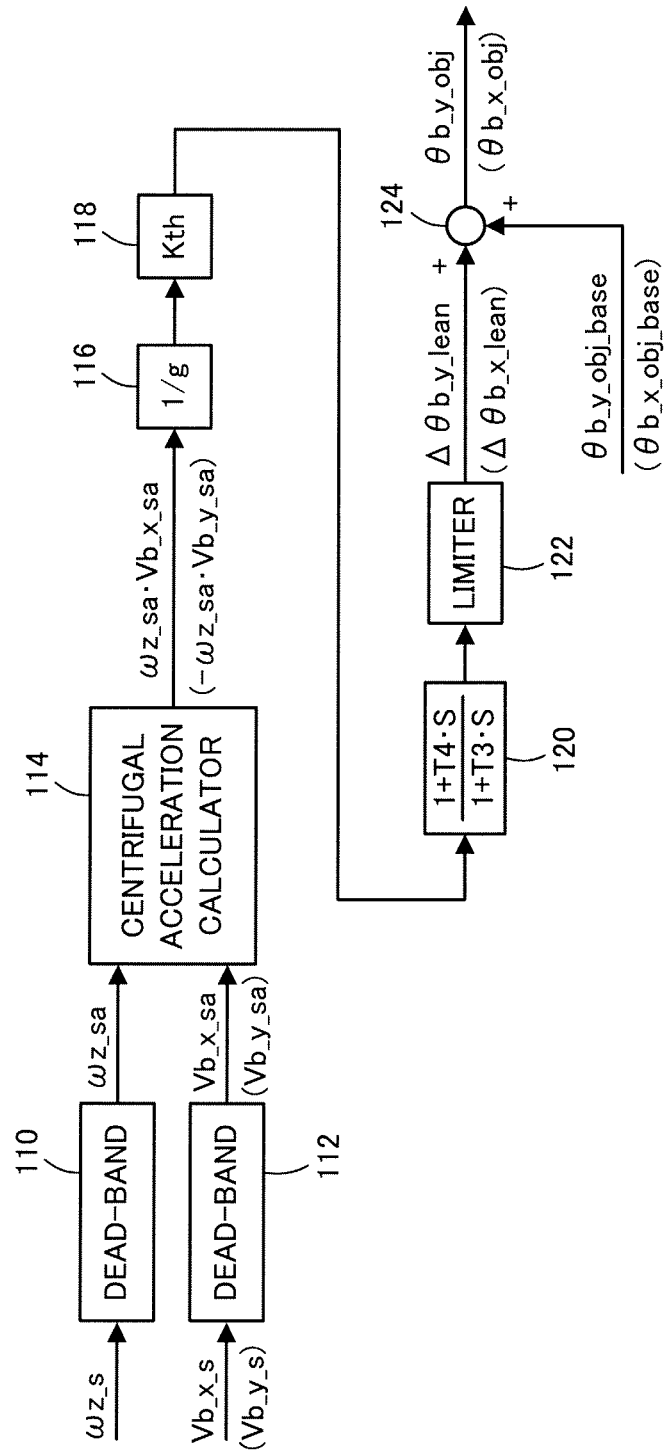
FIG. 14 is a block diagram illustrating a processing function related to processing of STEP5 in FIG. 7.

FIG. 14 is a block diagram indicating the process for determining the desired base body tilt angle value θb_xy_obj in STEP5 by the control unit 50, and the process is carried out as explained below. In FIG. 14, unparenthesized reference numerals (variable name) denote the reference numerals associated with the process of determining the desired base body tilt angle value θb_y_obj about the X-axis, while the parenthesized reference numerals denote the reference numerals associated with the process of determining the desired base body tilt angle value θb_x_obj about the Y-axis. Further, in the explanation below, the polarity of a yaw rate ωz measured on the basis of the output of the yaw rate sensor 53 is set so that, when observing the vehicle 1 from above, the polarity of the yaw rate ωz in the counterclockwise direction is positive polarity and the polarity of the yaw rate ωz in the clockwise direction is negative polarity.

Hereinafter, the process for determining the desired base body tilt angle value θb_y_obj about the X-axis will be representatively explained. The control unit 50 inputs the yaw rate measured value ωz_s (current value) on the basis of the output of the yaw rate sensor 53 and the estimated center-of-gravity velocity value Vb_x_s in the X-axis direction (current value) to dead-band processors 110, 112, respectively. The estimated center-of-gravity velocity value Vb_x_s is the value calculated by the same process as the process of the center-of-gravity velocity calculator 72.

The dead-band processor 110 carries out a process of forcibly regarding the value of ωz_s to 0, in the case where the input ωz_s exists in the predetermined dead-band in the vicinity of 0 (a range where −ωz1≤ωz_s≤ʃz1, ωz1 is a predetermined positive value). Specifically, in the case where the input ωz_s exists in the dead-band, the dead-band processor 110 outputs 0. Further, in the case where the input ωz_s exists outside the dead-band, the dead-band processor 110 outputs a value obtained by subtracting the value out of the upper limit value and the lower limit value of the dead-band that is closer to ωz_s from ωz_s (in the case where ωz_s>0, then ωz_s− ωz1, and in the case where ωz_s<0, then ωz_s−(−ωz1)).

Similarly, the dead-band processor 112 carries out a process of forcibly regarding the value of vb_x_s to 0, in the case where the input Vb_x_s exists in the predetermined dead-band in the vicinity of 0 (a range where −Vb1≤Vb_x_s≤Vb1, Vb1 is a predetermined positive value). Specifically, in the case where the input Vb_x_s exists in the dead-band, the dead-band processor 112 outputs 0. Further, in the case where the input Vb_x_s exists outside the dead-band, the dead-band processor 112 outputs a value obtained by subtracting the value out of the upper limit value and the lower limit value of the dead-band that is closer to Vb_x_s from Vb_x_s (in the case where Vb_x_s>0, then Vb_x_s−Vb1, and in the case where Vb_x_s<0, then
Vb_x_s−(−Vb1)).

Subsequently, the control unit 50 carries out the process of a centrifugal acceleration calculator 114. The centrifugal acceleration calculator 114 uses the outputs ωz_sa, Vb_x_sa of the dead-band processors 110, 112, respectively, and carries out the process of calculating a centrifugal acceleration (a centrifugal acceleration in the Y-axis direction) which is an acceleration generated to the vehicle-occupant overall center-of-gravity point, by a component in the Y-axis direction out of a centrifugal force acting on the vehicle 1. In this case, a product of ωz_sa and Vb_x_sa (=ωz_sa·Vb_x_sa) is calculated as the centrifugal acceleration in the Y-axis direction.

Subsequently, the control unit 50 divides the centrifugal acceleration (=ωz_sa·Vb_x_sa) calculated at the centrifugal acceleration calculator 114 by a gravitational acceleration constant g at a processor 116. By doing so, a correction value of the base body tilt angle θb_y about the X-axis (a correction amount from the reference desired values θb_y_obj_base), which is capable of decreasing as much as possible the magnitude of the moment obtained by synthesizing the component in the direction about the X-axis out of the moment generated about the tilt fulcrum of the base body 9 by the gravity acting on the vehicle-occupant overall center-of-gravity point and the component in the direction about the X-axis out of the moment generated about the tilt fulcrum of the base body 9 by the centrifugal force acting on the vehicle-occupant overall center-of-gravity point, is calculated.

Then, the control unit 50 calculates a value obtained by multiplying the output value of the processor 116 by a coefficient Kth of a predetermined value, as a basic correction required value of the base body tilt angle θb_y about the X-axis by a processor 118. The basic correction required value has a meaning of a basic required value of an error between the desired base body tilt angle value θb_y_obj about the X-axis that is to be determined and the reference desired values θb_y_obj_base (=θb_y_obj−θb_y_obj_base).

Subsequently, the control unit 50 passes the basic correction required value of the base body tilt angle θb_y about the X-axis (the output value of the processor 118) obtained as explained above through a filter 120 with a first-order lag characteristics. Further, by limiting the output value of the filter 120 by a limiter 122 to a value within a range between a predetermined upper limit value (>0) and a lower limit value (<0), the desired correction value Δθb_y_lean of the base body tilt angle θb_y about the X-axis is determined.

The filter 120 is for preventing the desired correction value Δθb_y_lean of the base body tilt angle θb_y from changing rapidly, and in the present embodiment, is a filter with a first-order lag characteristics having a phase compensation function, a transfer function thereof being represented by (1+T4·S)/(1+T3·S) (T3, T4 are time constants of predetermined values). Further, the limiter 122 is for preventing the magnitude of the desired correction value Δθb_y_lean from becoming excessive, and in the case where the output value of the filter 120 is a value within the range between the upper limit value and the lower limit value, outputs the output value of the filter 120 as it is as the desired correction value Δθb_y_lean. And, in the case where the output value of the filter 120 is outside the range between the upper limit value and the lower limit value, the limiter 122 outputs the value out of the upper limit value and the lower limit value that is closer to the output value of the filter 120 as the desired correction value Δθb_y_lean.

Supplementarily, the time constants T3, T4 of the filter 120 may be arbitrarily changed according to situations. For example, in the case where the output value of the centrifugal acceleration calculator 114 changes from a value not 0 to 0, the time constant may be changed so as to speed up the response speed of the filter 120, and make the desired correction value Δθb_y_lean converge to 0 rapidly.

Subsequently, the control unit 50 determines the desired base body tilt angle value θb_y_obj about the X-axis by adding the desired correction value Δθb_y_lean determined as described above with the reference desired values θb_y_obj_base at a calculator 124.

The above is the details of the process for determining the desired base body tilt angle value θb_y_obj about the X-axis.

The desired base body tilt angle value θb_x_obj about the Y-axis is determined similarly to above. In this case, the dead-band processor 112 is input with the estimated center-of-gravity velocity value Vb_y_s in the Y-axis direction. Then, centrifugal acceleration calculator 114 calculates a value reversing the sign of the product of the output value ωz_sa of the dead-band processor 110 input with the yaw rate measured value ωz_s and the output value Vb_y_sa of the dead-band processor 112 (=−ωz_sa·Vb_y_sa) as the centrifugal acceleration in the X-axis direction. Then, a value obtained by multiplying the value of the centrifugal acceleration in the X-axis direction with 1/g and the coefficient Kth by the process of the processors 116, 118, is calculated as the basic correction required value of the base body tilt angle θb_x about the Y-axis.

Subsequently, by passing the basic correction required value of the base body tilt angle θb_x about the Y-axis through the filter 120 with a first-order lag characteristics and the limiter 122, the desired correction value Δθb_x_lean of the base body tilt angle θb_x about the Y-axis is determined. Further, by adding the desired correction value Δθb_x_lean to the reference desired values θb_x_obj_base at the calculator 124, the desired base body tilt angle value θb_x_obj about the Y-axis is determined.

With the process of STEP5 explained above, the basic correction required values of the base body tilt angles θb_xy about the X-axis and about the Y-axis are both determined to be 0, in the condition where at least either one of the magnitude of the yaw rate measured value ωz_s and the magnitude of the velocity vector of the vehicle-occupant overall center-of-gravity point represented by the estimated center-of-gravity velocity value Vb_xy_s becomes 0 or minute (in the condition where one or both of the output values of the dead-band processors 110, 112 becomes 0), stated otherwise, in the traveling condition where the vehicle 1 is traveling straight or where the magnitude of the centrifugal force acting on the vehicle 1 becomes minute. As a result, in such condition, the desired base body tilt angle values θb_x_obj, θb_y_obj (the desired values for the boarding mode) is determined to the reference desired values θb_xy_obj_base.

On the other hand, in the condition where the centrifugal force of a certain magnitude acts on the vehicle 1 by the circling movement of the vehicle 1 (in the condition where both output values of the dead-band processors 110, 112 becomes values not 0), the desired base body tilt angle values θb_xy_obj are determined to angles obtained by tilting the base body tilt angle θb about the axis in the direction of the velocity vector represented by the estimated center-of-gravity velocity values Vb_xy_s from the reference desired values θb_xy_obj_base. Stated otherwise, in such condition, the desired base body tilt angle values θb_xy_obj are determined so as to displace the vehicle-occupant overall center-of-gravity point from the position immediately above the tilt fulcrum of the base body 9 and the seat 3 in a direction opposite to the direction of the centrifugal force acting on the vehicle-occupant overall center-of-gravity point (this direction depend on the direction of the yaw rate ωz and the direction of the velocity vector of the vehicle-occupant overall center-of-gravity point, and is orthogonal to the velocity vector).

Further, in this condition, the desired base body tilt angle values θb_xy_obj are determined so that the moment generated about the tilt fulcrum of the base body 9 and the seat 3 by the gravity acting on the vehicle-occupant overall center-of-gravity point, and the moment generated about the tilt fulcrum of the base body 9 and the seat 3 by the centrifugal force acting on the vehicle-occupant overall center-of-gravity point are balanced out (so that the magnitude of the synthesized moment of these moments become small).

In this case, assuming a case where the error between the desired base body tilt angle values θb_xy_obj and the reference desired values θb_xy_obj_base is expressed by converting an angle error about the axis in the same direction as the velocity vector of the vehicle-occupant overall center-of-gravity point (this corresponds to the error component about the specific direction axis of the present invention), the magnitude of the angle error increases as the magnitude of the actual yaw rate ωz increases, and also increases as the magnitude of the actual velocity vector of the vehicle-occupant overall center-of-gravity point increases. Further, the polarity of the angle error, that is, the direction of tilting of the desired base body tilt angle value θb_xy_obj from the reference desired values θb_xy_obj_base (direction about the axis in the same direction as the velocity vector of the vehicle-occupant overall center-of-gravity point) is defined by the direction of the yaw rate ωz the actual magnitude of which is indicated by the yaw rate measured value ωz_s, and the direction of the velocity vector of the vehicle-occupant overall center-of-gravity point represented by the estimated center-of-gravity velocity value Vb_xy_s.

By the control arithmetic processing carried out by the control unit 50 as described above, the imaginary wheel rotational angular acceleration commands ωwdot_xy_cmd denoting the manipulated variables (control inputs) are determined such that, basically, the posture of the base body 9 is maintained at a posture in which the aforesaid base body tilt angle error measured value θbe_x_s and θbe_y_s are both 0 (hereinafter, this posture will be referred to as the basic posture), in the operation modes of both the boarding mode and the autonomous mode. More detailedly, the imaginary wheel rotational angular acceleration command ωwdot_xy_cmd is determined such that the estimated center-of-gravity velocity values Vb_xy_s as the estimated values of the moving velocities of the vehicle system center-of-gravity point is converged to the desired center-of-gravity velocities for control Vb_xy_mdfd while maintaining the posture of the base body 9 at the aforesaid basic posture.

The aforesaid basic posture is the posture of the base body 9 in which the position of the vehicle system center-of-gravity point (the vehicle-occupant overall center-of-gravity point or the vehicle-alone center-of-gravity point) is positioned approximately right above the ground contact surface of the wheel assembly 5 (the tilt fulcrum of the base body 9 and the seat 3), in the condition other than the circling movement of the vehicle 1 in the boarding mode (specifically, in the situation where one or both of the output values of the dead-band processors 110, 112 becomes 0), or in the autonomous mode. Further, during circling movement of the vehicle 1 in the boarding mode (specifically, in the situation where both output values of the dead-band processors 110, 112 become values not 0), the basic posture is the posture of the base body 9 which makes the position of the vehicle-occupant overall center-of-gravity point to be displaced toward the center of circulation from the position almost immediately above the tilt fulcrum of the base body 9 and the seat 3.

Further, the desired center-of-gravity velocities for control Vb_xy_mdfd are normally 0 (more specifically, unless an occupant or the like imparts an additional propulsion force of the vehicle 1 in the boarding mode). In this case, the imaginary wheel rotational angular acceleration command ωwdot_xy_cmd will be determined such that the vehicle system center-of-gravity point is substantially stationary while maintaining the posture of the base body 9 at the aforesaid basic posture.

Then, the rotational angular velocities of the electric motors 31R and 31L, respectively, obtained by converting the imaginary wheel rotational angular velocity commands ωw_xy_cmd, which is obtained by integrating each component of ωwdot_xy_cmd, are determined as the velocity commands ω_R_cmd and ω_L_cmd of the electric motors 31R and 31L. Further, the rotational velocities of the electric motors 31R and 31L are controlled according to the velocity commands ω_R_cmd and ω_L_cmd. Thus, the moving velocities of the wheel assembly 5 in the X-axis direction and the Y-axis direction, respectively, are controlled so as to agree with the moving velocity of the imaginary wheel 62_x corresponding to ωw_x_cmd and the moving velocity of the imaginary wheel 62_y corresponding to ωw_y_cmd, respectively.

With this arrangement, if, for example, the actual base body tilt angle θb_x deviates from the desired value θb_x_obj in the direction about the Y-axis by leaning forward, then the wheel assembly 5 moves forward to eliminate the deviation (to converge θbe_x_s to 0). Similarly, if the actual θb_x deviates from the desired value θb_x_obj by leaning backward, then the wheel assembly 5 moves backward to eliminate the deviation (to converge θbe_x_s to 0).

Further, for example, if the actual base body tilt angle θb_y deviates from the desired value θb_y_obj in the direction about the X-axis by leaning rightward, then the wheel assembly 5 moves rightward to eliminate the deviation (to converge θbe_y_s to 0). Similarly, if the actual θb_y deviates from the desired value θb_y_obj by leaning leftward, then the wheel assembly 5 moves leftward to eliminate the deviation (to converge θbe_y_s to 0).

Further, if both the actual base body tilt angles θb_x and θb_y deviate from the desired values θb_x_obj and θb_y_obj, respectively, then the moving operation of the wheel assembly 5 in the fore-and-aft direction to eliminate the deviation of θb_x and the moving operation of the wheel assembly 5 in the lateral direction to eliminate the deviation of θb_y are combined, so that the wheel assembly 5 will move in a direction combining the X-axis direction and the Y-axis direction (a direction at an angle to both the X-axis direction and the Y-axis direction).

Thus, if the base body 9 tilts from the basic posture, then the wheel assembly 5 moves toward the tilting side. Hence, if, for example, the occupant intentionally inclines his/her upper body in the aforesaid boarding mode, then the wheel assembly 5 will move to the tilting side.

In the case where the desired center-of-gravity velocities for control Vb_x_mdfd and Vb_y_mdfd are 0, when the posture of the base body 9 converges to the basic posture, the movement of the wheel assembly 5 substantially comes to a halt. Further, if, for example, the tilt angle θb_x of the base body 9 in the direction about the Y-axis is maintained at a certain angle tilted from the basic posture, then the moving velocity of the wheel assembly 5 in the X-axis direction converges to a certain moving velocity corresponding to the angle (a moving velocity having a certain stead-state deviation from the desired center-of-gravity velocity for control Vb_x_mdfd). The same applies to the case where the tilt angle θb_y of the base body 9 in the direction about the X-axis is maintained at a certain angle tilted from the basic posture.

Further, in a situation wherein, for example, the desired center-of-gravity velocities Vb_x_aim and Vb_y_aim generated by the aforesaid required center-of-gravity velocity generator 74 are both 0, if the amount of the tilt of the base body 9 from the aforesaid basic posture (the base body tilt angle error measured values θbe_x_s and θbe_y_s) becomes relatively large, and the moving velocity or velocities of the wheel assembly 5 in one or both of the X-axis direction and the Y-axis direction for eliminating the tilt amount or for maintaining the tilt amount (these moving velocities corresponding to the aforesaid expected center-of-gravity velocity steady-state error values Vb_x_prd and Vb_y_prd, respectively, shown in FIG. 12) are an excessively large moving velocity or velocities that would cause the rotational angular velocity or velocities of one or both of the electric motors 31R and 31L to deviate from the permissible range or ranges thereof, then a velocity in the opposite direction from the moving velocity of the wheel assembly 5 (more detailedly, Vw_x_lim2−Vb_x−

_prd and Vw_y_lim2−Vb_y_prd) will be determined as the desired center-of-gravity velocities for control Vb_x_mdfd and Vb_y_mdfd. Then, the manipulated variable components u3_x and u3_y among the manipulated variable components constituting a control input are determined such that the estimated center-of-gravity velocity values Vb_x_s and Vb_y_s will be converged to the desired center-of-gravity velocities for control Vb_x_mdfd and Vb_y_mdfd, respectively. This prevents the amount of a tilt of the base body 9 from the aforesaid basic posture from becoming excessively large, thus preventing the rotational angular velocity or velocities of one or both of the electric motors 31R and 31L from becoming excessively high.

Further, in the aforesaid gain adjustor 78, in the situation wherein one or both of the estimated center-of-gravity velocity values Vb_x_s and Vb_y_s become large, and the moving velocity or velocities of the wheel assembly 5 in one or both of the X-axis direction and the Y-axis direction required to eliminate the tilt of the base body 9 from the aforesaid basic posture or to maintain the tilt amount may become an excessively large moving velocity that would cause the rotational angular velocity or velocities of one or both of the electric motors 31R and 31L to deviate from the permissible range or ranges thereof, as the deviation becomes more notable (more specifically, as the absolute values of Vover_x and Vover_y shown in FIG. 10 increase), one or both of the aforesaid gain adjustment parameters Kr_x and Kr_y are brought closer to 1 from 0.

In this case, each i-th gain coefficient Ki_x (i=1, 2 or 3) calculated according to the aforesaid expression 09x approaches to the constant value Ki_b_x on the maximum end from the constant value Ki_a_x on the minimum end, as Kr_x approaches to 1. The same applies to each i-th gain coefficient Ki_y (i=1, 2 or 3) calculated according to the aforesaid expression 09y.

As the absolute values of the aforesaid gain coefficients increase, the sensitivities of the manipulated variables (the imaginary wheel rotational angular acceleration commands ωwdot_x_cmd and ωwdot_y_cmd) in response to a change in the tilt of the base body 9 increase. Hence, the moment the amount of a tilt of the base body 9 from the basic posture indicates an increase, the moving velocity of the wheel assembly 5 will be controlled to immediately eliminate the tilt amount. This intensely restrains the base body 9 from considerably tilting from the basic posture, thus making it possible to prevent the moving velocity or velocities of the wheel assembly 5 in one or both of the X-axis direction and the Y-axis direction from becoming an excessively high moving velocity that causes the rotational angular velocity or velocities of one or both of the electric motors 31R and 31L to deviate from the permissible range or ranges thereof.

Further, in the boarding mode, if the required center-of-gravity velocity generator 74 generates the required center-of-gravity velocities Vb_x_aim and Vb_y_aim (required center-of-gravity velocities in which one or both of Vb_x_aim and Vb_y_aim are not 0) according to a request made by a steering operation performed by the occupant or the like, then the required center-of-gravity velocities Vb_x_aim and Vb_y_aim are determined as the aforesaid desired center-of-gravity velocities for control Vb_x_mdfd and Vb_y_mdfd, respectively, unless the rotational angular velocity or velocities of one or both of the electric motors 31R and 31L become a high rotational angular velocity or velocities that deviate from the permissible range or ranges thereof (more detailedly, as long as Vw_x_lim2 and Vw_y_lim2 shown in FIG. 12 agree with Vb_x_t and Vb_y_t, respectively). Thus, the moving velocity of the wheel assembly 5 is controlled such that the required center-of-gravity velocities Vb_x_aim and Vb_y_aim are implemented (such that the actual center-of-gravity velocities approach to the required center-of-gravity velocities Vb_x_aim and Vb_y_aim).

The processing by the aforesaid required center-of-gravity velocity generator 74, the description of which has been deferred, will now be described in detail.

In the present embodiment, if the operation mode of the vehicle 1 is the autonomous mode, then the required center-of-gravity velocity generator 74 sets the required center-of-gravity velocities Vb_x_aim and Vb_y_aim to 0, as described above.

Meanwhile, in the case where the operation mode of the vehicle 1 is the boarding mode, on the basis of the steering operation of the vehicle 1 by an occupant or the like (the operation for adding a propulsive force to the vehicle 1), the required center-of-gravity velocity generator 74 variably determines the required center-of-gravity velocity Vb_x_aim in the X-axis direction, while maintaining the required center-of-gravity velocity Vb_y_aim in the Y-axis direction to 0.

Here, for example, in the case where the occupant of the vehicle 1 intends to positively increase the traveling velocity of the vehicle 1 (the moving velocity of the vehicle system center-of-gravity point) at the time of starting the vehicle 1 or the like, the occupant kicks a floor with his/her foot thereby to add a propulsive force for increasing the traveling velocity of the vehicle 1 (a propulsive force by the force of friction between the foot of the occupant and the floor) to the vehicle 1. Alternatively, for example, an outside assistant or the like may add the propulsive force for increasing the traveling velocity to the vehicle 1 in response to a request from the occupant of the vehicle 1. In this case, the traveling velocity of the vehicle 1 intended to be increased by the occupant is generally the traveling velocity in the fore-and-aft direction of the occupant. Therefore, the propulsive force added to the vehicle 1 for increasing speed is, generally, a propulsive force in the X-axis direction or direction close thereto.

In the present embodiment, the required center-of-gravity velocity generator 74 determines the existence or nonexistence of a generation of an acceleration request as the request for increasing the traveling velocity of the vehicle 1 (more specifically, the traveling velocity of the vehicle system center-of-gravity point) in the X-axis direction, on the basis of the temporal change rate of the magnitude (absolute value) of the estimated center-of-gravity velocity value Vb_x_s in the X-axis direction calculated by the center-of-gravity velocity calculator 72, and then, according to the determination result, the required center-of-gravity velocity generator 74 sequentially determines the required center-of-gravity velocity Vb_x_aim in the X-axis direction. Then, when the aforesaid acceleration request in the X-axis direction is dissolved, the required center-of-gravity velocity Vb_x_aim is determined such that the velocity is maintained at a constant level for a predetermined period, and thereafter continuously attenuated. As for the required center-of-gravity velocity Vb_y_aim in the Y-axis direction, the required center-of-gravity velocity generator 74 retains the same constantly to 0, regardless of the existence of nonexistence of generation of the acceleration request.

More specifically, the required center-of-gravity velocity generator 74 determines the required center-of-gravity velocity Vb_x_aim in the X-axis direction, by sequentially executing the process shown in the flow chart of FIG. 14 in the predetermined control processing cycle.

The required center-of-gravity velocity generator 74 first carries out the processing in STEP21. In the processing, the required center-of-gravity velocity generator 74 calculates the temporal change rate (differential value) $DVb\_x\_s$ of the absolute value $|Vb\_x\_s|$ of the estimated center-of-gravity velocity value $Vb\_x\_s$ input thereto. Hereinafter, $DVb\_x\_s$ will be referred to as the center-of-gravity velocity absolute value change rate $DVb\_x\_s$.

Subsequently, the required center-of-gravity velocity generator 74 proceeds to STEP22 to determine which mode the current arithmetic processing mode for calculating the required center-of-gravity velocity $Vb\_x\_aim$ is.

Here, according to the present embodiment, the required center-of-gravity velocity generator 74 first determines the basic value of the required center-of-gravity velocity $Vb\_x\_aim$ (hereinafter, referred to as the basic required center-of-gravity velocity value $Vb\_x\_aim1$), and then determines the required center-of-gravity velocity $Vb\_x\_aim$ to cause the required center-of-gravity velocity $Vb\_x\_aim$ to follow (steadily agree with) the basic required center-of-gravity velocity value $Vb\_x\_aim1$ with a response time constant of a first order lag. In this case, the manner of determining the basic required center-of-gravity velocity value $Vb\_x\_aim1$ is specified by the arithmetic processing mode.

According to the present embodiment, the arithmetic processing mode comes in three types, namely, a braking mode, a velocity following mode, and a velocity holding mode.

The braking mode is a mode in which the basic required center-of-gravity velocity value $Vb\_x\_aim1$ is determined such that the traveling velocity of the vehicle 1 is attenuated or to retain the same to 0. Further, the velocity following mode is a mode in which the basic required center-of-gravity velocity value $Vb\_x\_aim1$ is determined such that the basic required center-of-gravity velocity value $Vb\_x\_aim1$ follows (coincides or substantially coincides with) the estimated center-of-gravity velocity value $Vb\_x\_s$ as the actual traveling velocity in the X-axis direction of the vehicle system center-of-gravity point. Further, the velocity holding mode is a mode in which the basic required center-of-gravity velocity value $Vb\_x\_aim1$ is determined such that the basic required center-of-gravity velocity value $Vb\_y\_aim1$ is maintained at a constant level.

In the processing in each arithmetic processing mode, in addition to the processing of determining the basic required center-of-gravity velocity value $Vb\_x\_aim1$, a processing for determining a filter time constant $Ta\_x$, which defines a response speed of following of the required center-of-gravity velocity $Vb\_x\_aim$ with respect to the basic required center-of-gravity velocity value $Vb\_x\_aim1$. Incidentally, the arithmetic processing mode in a state wherein the control unit 50 is initialized at the time of, for example, starting the control unit 50 (the initial arithmetic processing mode) is the braking mode.

In the aforesaid STEP22, the required center-of-gravity velocity generator 74 carries out next the arithmetic processing in STEP23, the arithmetic processing in STEP24, or the arithmetic processing in STEP25, depending upon whether the current arithmetic processing mode is the braking mode, the velocity following mode, or the velocity holding mode, thereby determining the basic required center-of-gravity velocity value $Vb\_y\_aim1$ and the filter time constant $Ta\_x$.

The arithmetic processing corresponding to each of the aforesaid modes is carried out as described below.

Figure 16:
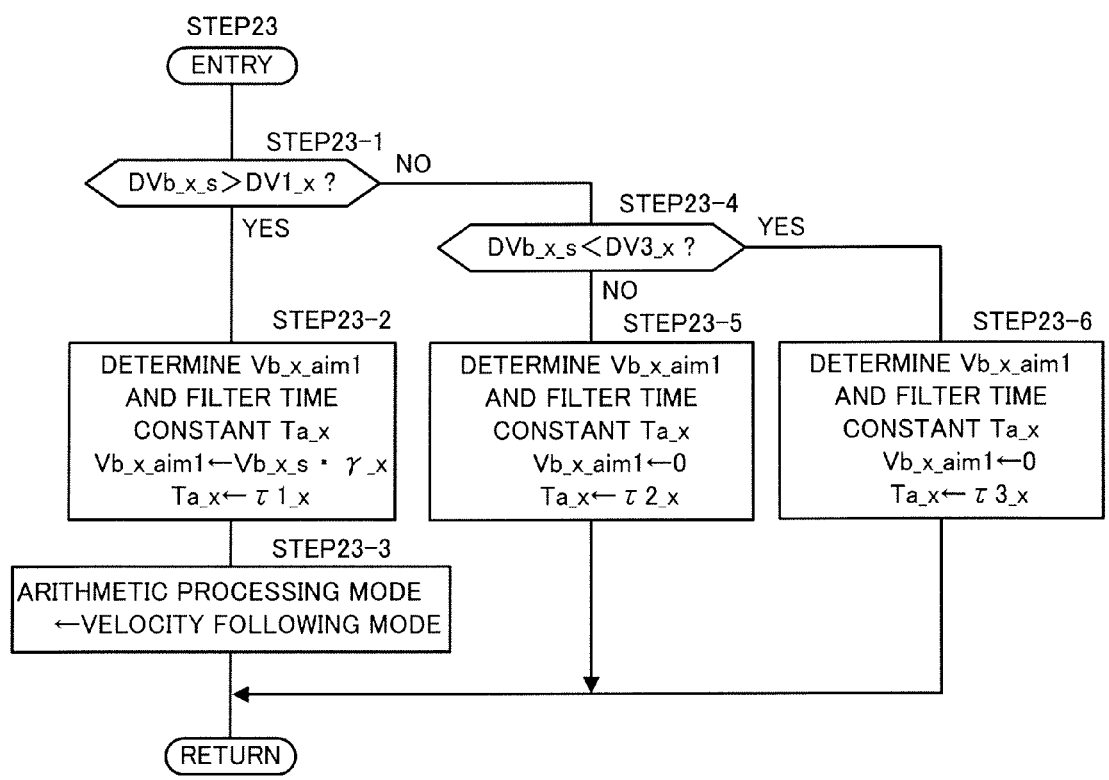
FIG. 16 is a flowchart illustrating the subroutine processing in STEP23 of FIG. 15.

The arithmetic processing of the braking mode in STEP23 is carried out as illustrated by the flowchart of FIG. 16. To be more specific, the required center-of-gravity velocity generator 74 first determines in STEP 23-1 whether or not the center-of-gravity velocity absolute value change rate $DVb\_x\_s$, which had been calculated in STEP21, is larger than a first threshold value $DV1\_x$ (>0), which is a positive value determined in advance. The determination processing is the processing for determining whether there is an acceleration request for increasing the traveling velocity of the vehicle 1 substantially in the fore-and-aft direction.

In this case, if $DVb\_x\_s > DV1\_x$ holds, then it means a situation wherein the absolute value $|Vb\_x|$ of the actual center-of-gravity velocity $Vb\_x$ in the X-axis direction is increasing at a temporal change rate that is larger than the first threshold value $DV1\_x$. Hence, the situation in which the determination result in STEP23-1 is affirmative is a situation in which a steering operation for increasing the magnitude of the center-of-gravity velocity $Vb\_x$ approximately in the fore-and-aft direction by an occupant or an outside assistant or the like (a steering operation for adding a propulsive force approximately in the fore-and-aft direction to the vehicle 1) is being carried out.

In the case where the determination result in STEP 23-1 becomes negative, that is, in the case where there is no acceleration request of the vehicle 1 (acceleration request in the fore-and-aft direction of the vehicle 1), then the required center-of-gravity velocity generator 74 determines in STEP 23-4 whether or not the center-of-gravity velocity absolute value change rate $DVb\_x\_s$ is smaller than a third threshold value $DV3\_x$ (<0), which is a negative value determined in advance. The determination processing is the processing for determining whether there is a deceleration request by the occupant of the vehicle 1 to positively decrease the magnitude of the center-of-gravity velocity $Vb\_x$. Hence, the situation in which the determination result in STEP23-4 is affirmative is a situation in which the occupant of the vehicle 1 intentionally contacts his/her feet to the ground, and generates a frictional force between his/her feet and the floor in the braking direction of the vehicle 1.

And, in the case where the determination result in STEP 23-4 is negative (in the case where no deceleration request has been generated), the required center-of-gravity velocity generator 74 determines in STEP23-5 the basic required center-of-gravity velocity value $Vb\_x\_aim1$ and the filter time constant $Ta\_x$, and terminates the processing in FIG. 16.

In STEP 23-5, 0 is set as the basic required center-of-gravity velocity value $Vb\_x\_aim$. Further, a second response time constant $\tau2\_x$ of a predetermined value set beforehand is set as the filter time constant $Ta\_x$.

Further, in the case where the determination result in STEP 23-4 is affirmative (in the case where deceleration result is generated), the required center-of-gravity velocity generator 74 determines in STEP 23-6 the basic required center-of-gravity velocity value $Vb\_x\_aim1$ and the filter time constant $Ta\_x$, and terminates the processing in FIG. 16.

In STEP 23-6, as is the same as in STEP 23-5, 0 is set as the basic required center-of-gravity velocity value $Vb\_x\_aim$. On the other hand, the third response time constant $\tau3\_x$ of a predetermined value set beforehand is set as the filter time constant $Ta\_x$. A third response time constant $\tau3\_x$ is a time constant of a shorter time than the second response time constant $\tau2\_x$.

In the case where the determination result in STEP 23-1 is affirmative, the required center-of-gravity velocity generator 74 determines in STEP 23-2 the basic required center-of-gravity velocity value $Vb\_x\_aim1$ and the filter time constant $Ta\_x$. Further, the required center-of-gravity velocity generator 74 changes in STEP 23-3 the arithmetic processing mode (the arithmetic processing mode in the next control processing cycle) from the braking mode to the velocity following mode, and terminates the processing in FIG. 16.

In the aforesaid STEP23-2, a value obtained by multiplying the estimated center-of-gravity velocity value $Vb\_x\_s$ in the X-axis direction input from the center-of-gravity velocity calculator 72 by a ratio $\gamma\_x$ of a predetermined value set beforehand is determined as the basic required center-of-gravity velocity value Vb_x_aim1. The aforesaid ratio $\gamma\_x$ is set to a positive value slightly smaller than 1 (e.g., 0.8) in the present embodiment. The processing in STEP 23-2 is for matching the manner of determining Vb_x_aim1 and Ta_x to the velocity following mode which starts from the next control processing cycle.

The value of the aforesaid ratio $\gamma\_x$ being slightly smaller than 1 is not essential. The value of the ratio $\gamma\_x$ may be set to, for example, 1 or a value slightly larger than 1. In the present embodiment, the value of the ratio $\gamma\_x$ is set to a value slightly less than 1 in order to prevent the occupant from feeling (in a sensory manner) the traveling velocity of the vehicle 1 as faster than the actual traveling velocity.

Further, the first response time constant $\tau1\_x$ of a predetermined value set beforehand is set as the filter time constant Ta_x. The first response time constant $\tau1\_x$ is set to a value of a comparatively shorter time than the second response time constant $\tau2\_x$. The first response time constant $\tau1\_x$ may be a same value with the third response time constant $\tau3\_x$.

In the case where the determination result in STEP21-1 is negative, the arithmetic processing mode remains unchanged, so that the arithmetic processing mode will be maintained to the braking mode in the next control processing cycle.

The above has described the arithmetic processing in the braking mode in STEP23.

Figure 17:
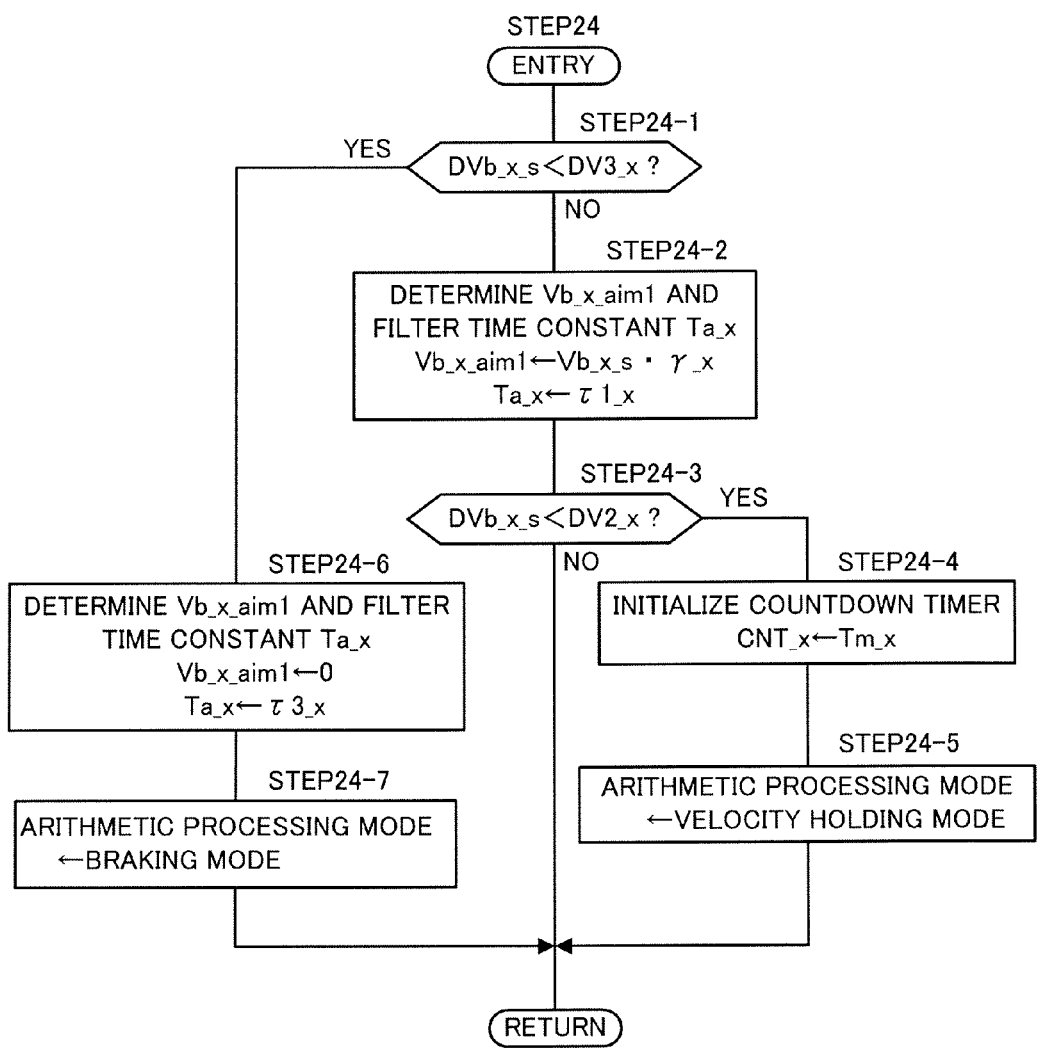
FIG. 17 is a flowchart illustrating the subroutine processing in STEP24 of FIG. 15.

Next, the arithmetic processing in the velocity following mode in STEP24 is carried out as illustrated by the flowchart of FIG. 17. To be more specific, the required center-of-gravity velocity generator 74 first carries out in STEP24-1 the same determination processing as that in the aforesaid STEP23-4, that is, the processing for determining whether or not the request for decelerating the vehicle 1 has been generated.

If the determination result is affirmative, then the required center-of-gravity velocity generator 74 carries out, in STEP24-6, the same processing as that in the aforesaid STEP23-6 thereby to set 0 as the basic required center-of-gravity velocity value Vb_x_aim1 and to set the third response time constant $\tau3\_x$ as the filter time constant Ta_x. Further, the required center-of-gravity velocity generator 74 changes the arithmetic processing mode in the next control processing cycle to the braking mode in STEP24-7, and terminates the processing in FIG. 17.

Meanwhile, if the determination result in the aforesaid STEP24-1 is negative, that is, if no request for decelerating the vehicle 1 has been generated, then the required center-of-gravity velocity generator 74 carries out in the next processing in STEP24-2, the same processing as that in the aforesaid STEP23-2 to determine the basic required center-of-gravity velocity value Vb_x_aim1 and the filter time constant Ta_x. That is, the required center-of-gravity velocity generator 74 determines the value obtained by multiplying the estimated center-of-gravity velocity value Vb_x_s input thereto by the ratio $\gamma\_x$ as the basic required center-of-gravity velocity value Vb_x_aim1. Further, the center-of-gravity velocity generator 74 sets the first response time constant $\tau1\_x$ as the filter time constant Ta_x.

Subsequently, the required center-of-gravity velocity generator 74 determines in STEP24-3 whether or not the estimated center-of-gravity velocity absolute value change rate DVb_x_s (the value calculated in STEP21) is smaller than a second threshold value DV2_x set beforehand. In the present embodiment, the second threshold value DV2_x is set to a predetermined negative value that is larger than the aforesaid third threshold value DV3_x (closer to 0 than DV3_x). The second threshold value DV2_x may be set to 0 or a positive value that is slightly larger than 0 (but less than the aforesaid first threshold value DV1_x).

The determination result in STEP24-3 is for determining the timing at which the velocity following mode should be switched to the velocity holding mode. If the determination result in STEP24-3 is negative, then the required center-of-gravity velocity generator 74 immediately terminates the processing in FIG. 17. In this case, the arithmetic processing mode is not changed, so that the arithmetic processing mode will be maintained to the velocity following mode also at the next control processing cycle.

Further, if the determination result in STEP24-3 is affirmative, then the required center-of-gravity velocity generator 74 assumes that the request for accelerating the vehicle 1 (acceleration request in fore-and-aft direction) has been completed, and initializes a countdown timer in STEP24-4. Further, the required center-of-gravity velocity generator 74 changes the arithmetic processing mode from the velocity following mode to the velocity holding mode in STEP24-5 and terminates the processing in FIG. 17.

The aforesaid countdown timer is a timer that counts the elapsed time from a start of the velocity holding mode which begins from the next control processing cycle. Further, in STEP24-4, preset initial value Tm_x is set for the time count value CNT_x of the timer. The initial value Tm_x means a set value of the time intended for the velocity holding mode to continue.

The above is the arithmetic processing of the velocity following mode in STEP24.

Subsequently, the arithmetic processing of the velocity holding mode in STEP25 is carried out as illustrated by the flowchart in FIG. 18. To be more specific, the required center-of-gravity velocity generator 74 first carries out in STEP25-1 the same determination processing as that in the aforesaid STEP23-4, that is, the processing for determining whether or not the request for decelerating the vehicle 1 has been generated.

If the determination result is affirmative, then the required center-of-gravity velocity generator 74 carries out in STEP25-2 the same processing as that in the aforesaid STEP23-6 thereby to set 0 as the basic required center-of-gravity velocity value Vb_x_aim1 and to set the third response time constant $\tau3\_x$ as the filter time constant Ta_x. Further, the required center-of-gravity velocity generator 74 changes the arithmetic processing mode in the next control processing cycle from the velocity holding mode to the braking mode in STEP25-3 and terminates the processing in FIG. 18.

Meanwhile, if the determination result in the aforesaid STEP25-1 is negative (if no request for decelerating the vehicle 1 has been generated), then the required center-of-gravity velocity generator 74 carries out in STEP25-4 the same determination processing as that in the aforesaid STEP23-1, that is, the processing for determining whether or not there is the request for accelerating the vehicle 1 approximately in the fore-and-aft direction.

If the determination result in STEP25-4 is affirmative (if the request for accelerating the vehicle 1 approximately in the fore-and-aft direction has been generated again), then the required center-of-gravity velocity generator 74 carries out in STEP25-5 the same processing as that in the aforesaid STEP23-2 thereby to determine the basic required center-of-gravity velocity value Vb_x_aim1 and the filter time constant Ta_x. That is, the required center-of-gravity velocity generator 74 determines the value obtained by multiplying the estimated center-of-gravity velocity value Vb_x_s input thereto by the ratio γ_x as the basic required center-of-gravity velocity value Vb_x_aim1. Further, the required center-of-gravity velocity generator 74 sets the first response time constant τ1_x as the filter time constant Ta_x.

Further, the required center-of-gravity velocity generator 74 changes the arithmetic processing mode in the next control processing cycle from the velocity holding mode to the velocity following mode in STEP25-6 and terminates the processing in FIG. 18.

If the determination result in the aforesaid STEP25-4 is negative (if the state wherein there is no request for acceleration approximately in the fore-and-aft direction is continuing), then the required center-of-gravity velocity generator 74 decrements the time count value CNT_x on the countdown timer in STEP25-7. More specifically, the time count value CNT_x is updated by subtracting a predetermined value ΔT (the time of the control processing cycle) from the current value of the time count value CNT_x.

Subsequently, the required center-of-gravity velocity generator 74 determines in STEP25-8 whether or not the time count value CNT_x on the countdown timer is larger than 0, that is, whether the time count of the countdown timer has finished.

If the determination result in this STEP25-8 is affirmative, it means that the time indicated by the aforesaid initial value Tm_x on the countdown timer has not yet elapsed since the velocity holding mode started. In this case, the required center-of-gravity velocity generator 74 determines the basic required center-of-gravity velocity value Vb_x_aim1 and the filter time constant Ta_x in STEP25-9, assuming that the arithmetic processing mode is to be maintained to the velocity holding mode, and terminates the processing in FIG. 18.

In this case, in STEP25-9, the current value of Vb_x_aim1 is determined to be the same value as the previous value. Further, a predetermined value having shorter time than the second response time constant τ2_x, for example the first response time constant τ1_x, is set as Ta_x.

If the determination result in STEP25-8 is affirmative, then the arithmetic processing mode is not changed, so that the arithmetic processing mode will be maintained to the velocity holding mode also at the next control processing cycle.

If the determination result in the aforesaid STEP25-8 is negative, that is, if the predetermined time indicated by the initial value Tm_x on the countdown timer has elapsed since the velocity holding mode started, then the required center-of-gravity velocity generator 74 carries out in STEP25-10 the same processing as that in the aforesaid STEP23-5 thereby to set 0 as the basic required center-of-gravity velocity value Vb_x_aim1 and to set the second response time constant τ2_x as the filter time constant Ta_x. Further, the required center-of-gravity velocity generator 74 changes the arithmetic processing mode in the next control processing cycle from the velocity holding mode to the braking mode in STEP25-11, and terminates the processing in FIG. 18.

The above has described the arithmetic processing in the velocity holding mode in STEP25.

Figure 15:
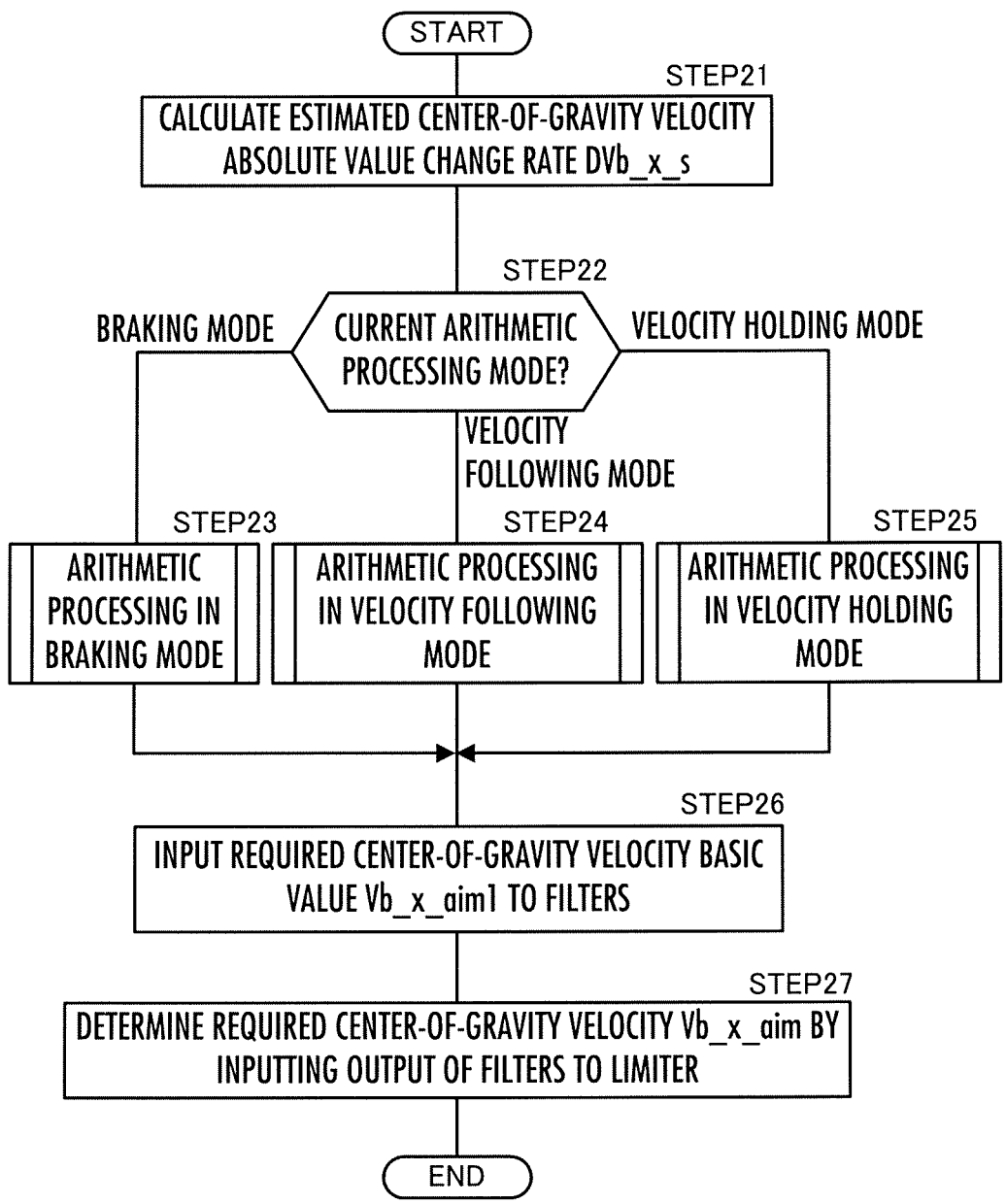
FIG. 15 is flowchart illustrating the processing by a required center-of-gravity velocity generator 74 shown in FIG. 9.

Returning to the description of FIG. 15, the required center-of-gravity velocity generator 74 carries out the arithmetic processing in one of STEP23 to STEP25 as described above, and then carries out the processing for inputting the basic required center-of-gravity velocity value Vb_x_aim1 determined by the arithmetic processing to filters (filtering processing) in STEP26.

The filter is a first-order lag filter (low-pass filter) having the filter time constant Ta_x determined in any of the arithmetic processing in STEP 23 through 25 as the response time constant, and, for example, is a filter in which the transfer function thereof is denoted by $1/(1+Ta\_x \cdot S)$. Therefore, the output value of the filter obtained in STEP 26 follows the basic required center-of-gravity velocity value Vb_x_aim1 by the time constant of Ta_x. In this case, the following response speed varies according to the value of the filter time constant Ta_x that is determined variably in STEP 23 through 25. More specifically, in the case where the first response time constant τ1_x or the third response time constant τ3_x is set as the filter time constant Ta_x, the following response speed becomes a faster speed. In the case where the second response time constant τ2_x is set as the filter time constant Ta_x, the following response speed becomes a slower speed.

Subsequently, the required center-of-gravity velocity generator 74 proceeds to STEP 27 and finally determines the required center-of-gravity velocity Vb_x_aim in the X-axis direction, by passing the output value of the filter through a limiter. In this case, the limiter is used to prevent the absolute value of the required center-of-gravity velocity Vb_x_aim from becoming excessive, and outputs the output value of the filter directly as the required center-of-gravity velocity Vb_x_aim if the output value of the filter falls within the range of a predetermined upper limit value (>0) and a lower limit value (<0) set beforehand. Further, in the case where the absolute value of the output value of the filter exceeds the range between the aforementioned upper limit value and the lower limit value, the limiter outputs the limit value of the upper limit value or the lower limit value, whichever is closer to the output value of the filter, as the required center-of-gravity velocity Vb_x_aim.

Here, the absolute value of the above-mentioned upper limit value and the lower limit value may not be identical, and the absolute values thereof may be different from one another.

The above is the details of the generation processing of the required center-of-gravity velocity Vb_x_aim in the X-axis direction.

Supplementarily, for example, it may be configured so that the second response time constant τ2_x is set to a same value to the first response time constant τ1_x or the third response time constant τ3_x, or to a similar value of a comparatively short time, and at the same time, gradually change the basic required center-of-gravity velocity value Vb_x_aim1 itself to 0 at a predetermined change speed (a predetermined temporal change rate) immediately after the arithmetic processing mode is changed from the velocity holding mode to the braking mode.

By the processing of the required center-of-gravity velocity generator 74 explained above, the required center-of-gravity velocity Vb_x_aim in the X-axis direction is determined by a manner explained below.

For example, a case will be assumed where, in order to increase the traveling velocity of the vehicle 1 in the fore-and-aft direction (the X-axis direction) of the occupant, an occupant kicks a floor with his/her foot or an assistant or the like pushes the vehicle 1 so as to add a propulsive force to the vehicle 1 approximately in the fore-and-aft direction (more specifically, a propulsive force that causes the determination result in the aforesaid STEP23-1 to be affirmative).

It is assumed that the arithmetic processing mode before the propulsive force is added is the aforesaid braking mode. Here, for the sake of understanding, it is assumed that the output value of the filter obtained in STEP 26 of FIG. 15 is a value that falls within a range not subjected to the forcible restriction placed by the limiter in STEP27. That is, the required center-of-gravity velocity Vb_x_aim sequentially determined in STEP 27 coincides with the value that is obtained by passing the basic required center-of-gravity velocity value Vb_x_aim1 through the filter. Similarly, it is assumed that the actual center-of-gravity velocity values Vb_x and Vb_y fall within a range not subjected to the forcible restriction on the output values V_x_lim2 and V_y_lim2 in the limiting processor 104. That is, the desired center-of-gravity velocity for control Vb_x_mdfd, Vb_y_mdfd respectively coincides with the required center-of-gravity velocity Vb_x_aim, Vb_y_aim. Such state is a normal (general) operating state of the vehicle 1. In the present embodiment, Vb_y_aim=0, so that Vb_y_mdfd=0 in such general state.

In this case, if the addition of the propulsive force to the vehicle 1 causes the determination result in the STEP23-1 to become affirmative, then the arithmetic processing mode is changed from the braking mode to the velocity following mode by the processing in STEP23-3 of FIG. 16.

In this velocity following mode, in the situation where no deceleration request is generated (in the situation where the determination result in STEP 24-1 becomes negative) in a period until the acceleration request is dissolved (a period until the determination result in STEP 24-3 becomes affirmative), a value obtained by multiplying the current value (the present value) of the estimated center-of-gravity velocity value Vb_x_s in the X-axis direction by a ratio γ_x of a predetermined value, i.e., a velocity value whose magnitude is slightly smaller than Vb_x_s is sequentially determined as the basic required center-of-gravity velocity value Vb_x_aim1.

Because of this, the required center-of-gravity velocity Vb_x_aim sequentially determined by the required center-of-gravity velocity generator 74 is determined to follow a velocity value (=γ_x·Vb_x_s) that approximately coincides with the actual center-of-gravity velocity Vb_x that is increasing by the propulsive force applied to the vehicle 1.

At this time, the first response time constant τ1_x of a comparatively short time is set as the filter time constant Ta_x. Therefore, the following of the required center-of-gravity velocity Vb_x_aim with respect to Vb_x_aim1 is executed with rapid responsiveness.

Then, the required center-of-gravity velocity Vb_x_aim determined as is explained above is determined as the aforesaid desired center-of-gravity velocity for control Vb_x_mdfd in the X-axis direction. Therefore, Vb_x_mdfd becomes a value that coincides or approximately coincides with γ_x·Vb_x_s. Further, the required center-of-gravity velocity Vb_y_aim in the Y-axis direction is maintained at 0, the desired center-of-gravity velocity for control Vb_y_mdfd in the Y-axis direction becomes 0. Further, the third manipulated variable components u3_x and u3_y included in the imaginary wheel rotational angular acceleration commands ωwdot_x_cmd and ωwdot_y_cmd, respectively, are determined to cause the estimated center-of-gravity velocity values Vb_x_s and Vb_y_s to converge to the desired center-of-gravity velocities for control Vb_x_mdfd and Vb_y_mdfd, respectively.

As a result, the moving velocity of the wheel assembly 5 is controlled such that the actual moving velocity of the vehicle system center-of-gravity point is promptly increased (increased approximately in the fore-and-aft direction) by the propulsive force added to the vehicle 1 by the occupant according to a request based on the propulsive force. Thus, the vehicle 1 will be smoothly accelerated by the added propulsive force in the fore-and-aft direction of the occupant.

Here, the desired center-of-gravity velocity for control Vb_y_mdfd in the Y-axis direction becomes 0, so that even when the propulsive force applied to the vehicle 1 includes a component in the Y-axis direction, the increase in the actual traveling velocity of the vehicle system center-of-gravity point in the Y-axis direction becomes restricted. Therefore, even when the direction of the propulsive force applied to the vehicle 1 has some misalignment with respect to the X-axis direction, it becomes possible to appropriately accelerate the traveling velocity of the vehicle system center-of-gravity point in the fore-and-aft direction of the occupant.

In the velocity following mode, if applying a braking force to the vehicle 1 causes the determination result in STEP24-1 of FIG. 17 to become affirmative (if a deceleration request is generated), then the arithmetic processing mode is changed to the aforesaid braking mode. Hence, the traveling velocity of the vehicle 1 will be attenuated. In this case, while the deceleration request is occurring, the third response time constant τ3_x of a comparatively short time is set as the filter time constant Ta_x, so that the required center-of-gravity velocity Vb_x_aim in the X-axis direction rapidly attenuate to 0. Therefore, the traveling velocity of the vehicle 1 attenuates comparatively rapidly.

Subsequently, in the velocity following mode, when the addition of the propulsive force to the vehicle 1 is finished and the acceleration request is dissolved (if the determination result in STEP24-3 of FIG. 17 switches to be affirmative), the arithmetic processing mode is changed from the velocity following mode to the velocity holding mode by the processing in STEP24-5 of FIG. 17.

In this velocity holding mode, until the time count on the countdown timer finishes in a situation wherein neither the acceleration request nor the deceleration request is generated (in a situation wherein the determination results in both STEP25-1 and STEP25-4 of FIG. 18 are negative), the basic required center-of-gravity velocity value Vb_x_aim1 is set to the same value as the previous value.

Accordingly, in the period of predetermined time from a start of the velocity holding mode to an end of the time count of the countdown timer (the time of the initial value Tm_x of the countdown timer), the basic required center-of-gravity velocity Vb_x_aim1 is maintained constantly at the same value as the value determined immediately before the velocity holding mode starts.

Therefore, the required center-of-gravity velocity Vb_x_aim determined sequentially by the required center-of-gravity velocity generator 74 is determined to be maintained at a constant value (more specifically, to follow Vb_x_aim1 of a constant value).

In this case, the first response time constant τ1_x of a comparatively short time is set as the filter time constant Ta_x. As such, following of the required center-of-gravity velocity Vb_x_aim with respect to Vb_x_aim1 is conducted with rapid responsiveness. Therefore, basically, Vb_x_aim in the velocity holding mode coincides with Vb_x_aim1.

Then, the required center-of-gravity velocity Vb_x_aim determined as explained above is determined as the desired center-of-gravity velocity for control Vb_x_mdfd in the X-axis direction. Further, the required center-of-gravity velocity Vb_y_aim in the Y-axis direction is retained at 0, the desired center-of-gravity velocity for control Vb_y_mdfd in the Y-axis direction becomes 0. Further, the third manipulated variable components u3_x and u3_y included in the imaginary wheel rotational angular acceleration commands ωwdot_x_cmd and ωwdot_y_cmd, respectively, are determined to cause the estimated center-of-gravity velocity values Vb_x_s and Vb_y_s to converge to the desired center-of-gravity velocities for control Vb_x_mdfd and Vb_y_mdfd, respectively.

As a result, the traveling velocity of the wheel assembly 5 will be controlled such that actual traveling velocity Vb_x of the vehicle system center-of-gravity point in the X-axis direction is maintained constant at the velocity after acceleration without the need for frequent adjustment of the posture of the upper body of the occupant in the period until the time count by the countdown timer finishes after increasing the velocity of the vehicle 1 (the period of time indicated by the aforesaid initial value Tm_x). Hence, the actual traveling condition of the vehicle 1 in the aforesaid situation will be a condition in which the vehicle 1 smoothly travels at a substantially constant velocity in the X-axis direction (in the fore-and-aft direction of the occupant) even when the occupant does not perform a steering operation in which the occupant positively moves his/her upper body.

Here, in the velocity holding mode, in the case where the determination result in STEP 25-4 in FIG. 18 becomes affirmative (if the acceleration request is generated), by again applying a propulsive force in the substantially fore-and-aft direction to the vehicle 1, then the arithmetic processing mode returns to the velocity following mode. Therefore, the vehicle 1 again accelerates in the substantially fore-and-aft direction.

Further, in the velocity holding mode, if a braking force is added to the vehicle 1, causing the determination result in STEP25-1 of FIG. 18 to be affirmative (if the deceleration request is generated), then the arithmetic processing mode changes to the braking mode. This causes the traveling velocity of the vehicle 1 to attenuate. In this case, as with the case where the deceleration request is generated in the velocity following mode, the traveling velocity of the vehicle system center-of-gravity point in the X-axis direction attenuates rapidly during the occurrence of the deceleration request.

Subsequently, if the time count by the countdown timer ends while maintaining the situation wherein neither the acceleration request nor the deceleration request is generated (the situation wherein the determination results in STEP25-1 and STEP25-4 in FIG. 18 are both negative) in the velocity holding mode, then the arithmetic processing mode is changed from the velocity holding mode to the braking mode by the processing in STEP25-11 of FIG. 18.

In the braking mode, 0 is constantly set as the basic required center-of-gravity velocity value Vb_x_aim in the situation wherein neither the acceleration request nor the deceleration request is generated (the situation wherein the determination results in STEP23-1 and STEP23-4 of FIG. 16 are both negative). Therefore, the required center-of-gravity velocity Vb_x_aim sequentially determined by the required center-of-gravity velocity generator 74 is determined to attenuate to 0, and to be finally maintained at 0. In this case, the second response time constant $\tau 2\_x$ of a relatively long time is set as the aforesaid filter time constant Ta_x. Therefore, the required center-of-gravity velocity Vb_x_aim continuously attenuates to 0 at a comparatively grdual attenuating speed Subsequently, the required center-of-gravity velocity Vb_x_aim determined as explained above is determined as the aforesaid desired center-of-gravity velocity for control Vb_x_mdfd in the X-axis direction. Further, the required center-of-gravity velocity Vb_y_aim in the Y-axis direction is maintained at 0, so that the desired center-of-gravity velocity for control Vb_y_mdfd in the Y-axis direction becomes 0. Further, the third manipulated variable components u3_x and u3_y included in the imaginary wheel rotational angular acceleration commands ωwdot_x_cmd and ωwdot_y_cmd, respectively, are determined to cause the estimated center-of-gravity velocity values Vb_x_s and Vb_y_s to be converged to the desired center-of-gravity velocities for control Vb_x_mdfd and Vb_y_mdfd, respectively.

As a result, in the case where the arithmetic processing mode preceding the braking mode is the velocity holding mode, the traveling velocity of the wheel assembly 5 will be controlled such that the magnitude of the actual traveling velocity of the vehicle system center-of-gravity point in the X-axis direction continuously attenuates from the magnitude in the velocity holding mode even if the occupant does not perform a positive steering operation by moving his/her upper body.

As is explained above, in the case where a propulsive force in the substantially X-axis direction is applied to the vehicle 1 by the occupant and the like, first, the traveling velocity of the vehicle 1 in the X-axis direction increases. Subsequently, only for a predetermined time represented by the initial value Tm_x of the countdown timer, the traveling velocity of the vehicle 1 in the X-axis direction is maintained approximately constantly. Thereafter, the traveling velocity of the vehicle 1 in the X-axis direction attenuates gradually.

Therefore, after the propulsive force in the substantially X-axis direction is applied to the vehicle 1 by the occupant and the like, the vehicle 1 of the present invention automatically executes a sequence of the traveling operation of the vehicle 1, from smooth traveling of the vehicle 1 in a constant speed in the X-axis direction (the fore-and-aft direction of the occupant), to the deceleration continuing therefrom, without the need of the cumbersome maneuvering operation by the occupant and the like. As such, steering of the vehicle 1 may be performed easily, and the vehicle 1 may be made to excel in handling quality.

In the vehicle 1 of the present embodiment, as is explained above, by the occupant arbitrarily twisting its upper body together with the seat 3 about a body trunk axis of the upper body, it becomes possible to change the traveling direction of the vehicle 1, and consequently to perform circling movement of the vehicle 1. And, during such circling movement, as is explained above, the desired base body tilt angle values θb_xy_obj is determined to an angle tilted from the reference desired values θb_xy_obj_base about the axis in the direction of the actual velocity vector of the vehicle-occupant overall center-of-gravity point (an angle which makes the vehicle-occupant overall center-of-gravity point displace in the opposite direction from the direction of the centrifugal force from the position immediately above the tilt fulcrum of the base body 9 and the seat 3). Therefore, even if the occupant does not intentionally tilts his/her upper body, the posture of the occupant is automatically tilted together with the seat 3 to a posture suitable for the circling movement (the posture tilting to the center of circulation side). In addition, in the vehicle 1 of the present embodiment the wheel assembly 5 tilts together with the seat 3 and the base body 9 during circling movement, so that the wheel assembly 5 itself becomes easier to circle. As a result, it becomes possible to smoothly perform the circling movement of the vehicle 1 without the need for the occupant adjusting the movement of his/her upper body frequently.

Here, the correspondence relationship between the vehicle 1 of the present embodiment and the present invention will be supplementally described.

In the present embodiment, the fore-and-aft direction (the X-axis direction) and the lateral direction (the Y-axis direction) of the occupant aboard the vehicle 1 correspond to the first direction and the second direction, respectively, in the present invention.

Further, the yaw rate sensor 53 realizes the yaw rate measuring element of the present invention.

Moreover, the tilt angles θb_x, θb_y of the base body 9 correspond to the tilt angle of the payload supporting part in the present invention, and the desired base body tilt angle values θb_xy_obj correspond to the desired tilt angle in the present invention. Further, the reference desired values θb_xy_obj_base corresponds to the reference angle of the present invention. Here, the tilt angle measuring element of the present invention is embodied by the tilt sensor 52 and the processing of STEP 2 in FIG. 7. Further, the desired tilt angle determining element of the present invention is realized by the process of STEP5 in FIG. 7 (process of the block diagram of FIG. 14).

Further, in the present embodiment, the vehicle system center-of-gravity point (more specifically, the vehicle-occupant overall center-of-gravity point) corresponds to the predetermined representative point of the vehicle of the present invention, and the center-of-gravity velocities Vb_x, Vb_y correspond to the traveling velocity of the representative point of the present invention. Further, the representative point velocity measuring element is realized by the center-of-gravity velocity calculator 72.

Further, the traveling motion unit controlling element is realized by the center-of-gravity velocity restrictor 76, the posture control calculator 80, and the motor command calculator 82.

Some modifications related to the embodiments described above will now be described.

In the aforesaid embodiment, during the circling movement of the vehicle 1, the desired base body tilt angle value θb_xy_obj is determined to be the angle tilted about the axis in the same direction as the velocity vector of the vehicle-occupant overall center-of-gravity point from the reference desired values θb_xy_obj_base. However, for example, in the case where the direction of the velocity vector of the vehicle-occupant overall center-of-gravity point is comparatively close to the X-axis direction (in the fore-and-aft direction of the occupant) (specifically, in the case where the angle on the acute angle side between the direction of the velocity vector and the X-axis direction (the angle about the yaw axis) is smaller than a predetermined value), the desired base body tilt angle value θb_xy_obj may be determined to be an angle tilted about the X-axis from the reference desired values θb_xy_obj_base (θb_x_obj about the Y-axis coincides with the reference desired value θb_x_obj_base).

Further, in the aforesaid embodiment, during the circling moovement of the vehicle 1, the desired base body tilt angle values θb_xy_obj are determinee to be proportional to the product of the yaw rate measured value ωz_s and the estimated center-of-gravity velocity values Vb_{xy}_s (more accurately, the products of the output values of the dead-end processors 110, 112). However, the magnitude of kθb_xy_obj may be changed for example according to the yaw rate measured value ωz_s only.

Further, in the aforesaid embodiment, in STEP 23-1 and 25-4, the existence or nonexistence of the generation of the acceleration request is determined on the basis of the temporal change rate of the absolute value of the estimated center-of-gravity velocity value Vb_x_s in the X-axis direction. However, the existence or nonexistence of the generation of the acceleration request may be determined on the basis of the temporal change rate of the absolute value of the velocity vector of the vehicle system center-of-gravity point having the estimated center-of-gravity velocity values Vb_x_s, Vb_y_s as two components thereof. For example, the required center-of-gravity velocity Vb_xy_aim may be determined by the processing using, in place of the aforesaid center-of-gravity velocity absolute value change rate DVb_x_s, a temporal change rate of the absolute value of the velocity vector of the vehicle system center-of-gravity point (the vehicle-occupant overall center-of-gravity point) (processing in aforesaid FIG. 15 through FIG. 18).

Further, in the present embodiment, the center-of-gravity velocity Vb_x in the X-axis direction is to be maintained constant during the velocity hold mode. However, for example the absolute value of the velocity vector of the vehicle system center-of-gravity point (the vehicle-occupant overall center-of-gravity point) may be maintained constant. An embodiment in this case (hereinafter referred to as a second embodiment), may be accomplished for example as is explained below.

That is, in the second embodiment, the required center-of-gravity velocity generator 74 uses the estimated center-of-gravity velocity values Vb_x_s, Vb_y_s input thereto, in STEP 21 of FIG. 15, to obtain the temporal change rate DVb2_x_s $(=\mathrm{sqrt}(Vb\_x\_s^2+Vb\_y\_s^2))$ of the absolute value of the velocity vector of the vehicle system center-of-gravity point (the vehicle-occupant overall center-of-gravity point), instead of the estimated center-of-gravity velocity absolute value change rate DVb_x_s. Here, sqrt( ) denotes a square root function. Subsequently, the required center-of-gravity velocity generator 74 uses the temporal change rate DVb2_x_s of the absolute value of the velocity vector of the vehicle system center-of-gravity point (the vehicle-occupant overall center-of-gravity point) calculated as described above, in each of the determining processing in FIG. 16 through FIG. 18 (processing in STEP 23-1, 23-4, 24-1, 24-2, 25-1, and 25-4).

Further, in addition to determining the basic required center-of-gravity velocity value Vb_x_aim1 in the X-axis direction and the filter time constant Ta_x, respectively, in aforesaid STEP 23-2, 23-5, 23-6, 24-2, 24-6, 25-2, 25-5, 25-9, and 25-10 as is explained above, the required center-of-gravity velocity generator 74 determines the basic required center-of-gravity velocity value Vb_y_aim1 in the Y-axis direction in the same manner as in the basic required center-of-gravity velocity value Vb_x_aim1 in the X-axis direction. More specifically, in STEP 23-5, 23-6, 24-6, 25-2, and 25-10, 0 is set as Vb_y_aim1, and in STEP 25-9 the previous value of Vb_y_aim1 is set as the current value thereof. Further, in STEP 23-2, 24-2, and 25-5, a value obtained by multiplying the estimated center-of-gravity velocity value Vb_y_s in the Y-axis direction by a ratio γ_y of a predetermined value is set as Vb_y_aim1. The ratio γ_y may be the same as the ratio γ_x with respect to the X-axis direction (for example, 0.8), but may also be set to a different value.

Then, in STEP 26 in FIG. 15, the required center-of-gravity velocity generator 74 passes the basic required center-of-gravity velocity value Vb_x_aim1 in the X-axis direction through a filter (a low-pass filter with a first-order lag characteristics), and also passes the basic required center-of-gravity velocity value Vb_y_aim1 in the Y-axis direction through a filter (a low-pass filter with a first-order lag characteristics). In this case, the response time constant of the filter to which Vb_y_aim1 is input may be the same as the response time constant (τ1_x or τ2_x or τ3_x) of the filter to which Vb_x_aim1 is passed through.

However, for example, in the processing of STEP 26 in a control process cycle setting 0 as Vb_y_aim1 in STEP 23-5 or 25-10, the response time constant of the filter to which the basic required center-of-gravity velocity value Vb_y_aim1 in the Y-axis direction is passed through may be set to a value of a shorter time than the response time constant of the filter to which the basic required center-of-gravity velocity value Vb_x_aim1 in the X-axis direction is passed through. By doing so, in the braking mode after retaining the required center-of-gravity velocities Vb_x_aim, Vb_y_aim stable for a predetermined time in the velocity holding mode, the direction of the velocity vector comprising Vb_x_aim, Vb_y_aim may be brought closer to the X-axis direction (the fore-and-aft direction of the occupant) (finally to agree with the X-axis direction).

Further, in STEP 27 in FIG. 15, the required center-of-gravity velocity generator 74 performs a limiting processing to the output of the filter in relation to the X-axis direction to determine the required center-of-gravity velocity Vb_x_aim in the X-axis direction, and also performs a limiting processing to the output of the filter in relation to the Y-axis direction as is in the X-axis direction to determine the required center-of-gravity velocity Vb_y_aim in the Y-axis direction.

In the second embodiment, the matters other than those explained above may be the same as those in the embodiment explained earlier. In the second embodiment, after the propulsive force is applied to the vehicle 1 by the occupant and the like, the smooth traveling in which the center-of-gravity velocities Vb_x, Vb_y in both of the X-axis direction and Y-axis direction are retained stable, and the deceleration thereafter, may be performed automatically, without the need for a cumbersome steering operation by the occupant and the like.

Here, in the case where the propulsive force to be applied to the vehicle 1 is the Y-axis direction or a direction close thereto, Vb_x_aim in the X-axis direction may be retained to 0, and the Vb_y_aim in the Y-axis direction alone may be determined variably in accordance with the arithmetic processing mode as in the second embodiment.

Further, in the above-mentioned embodiments, the required center-of-gravity velocity Vb_x_aim is increased in speed in accordance with the addition of the propulsive force to the vehicle 1, and after retaining the required center-of-gravity velocity Vb_x_aim constant by the processing of the velocity holding mode, the required center-of-gravity velocity Vb_x_aim is attenuated by the processing of the braking mode. In stead, for example, the required center-of-gravity velocity Vb_x_aim may be increased in speed so as to accelerate the vehicle 1 with an operation of a switch and the like by the occupant, and thereafter, the required center-of-gravity velocity Vb_x_aim may be retained constant and then attenuated in accordance to a release of the operation of the switch and the like. Also, an environmental condition and the like may be added as a condition for increasing the required center-of-gravity velocity Vb_x_aim or retaining the same constant. These holds true also for the required center-of-gravity velocity Vb_y_aim in the Y-axis direction.

In each of the aforesaid embodiments, the required center-of-gravity velocities Vb_x_aim, Vb_y_aim have always been set to 0 in the aforesaid autonomous mode. Alternatively, however, in the case where a worker or the like moves the vehicle 1 with no occupant aboard thereon by pushing it as necessary, the required center-of-gravity velocities Vb_x_aim, Vb_y_aim may be changed by carrying out the same processing as that in the case of the boarding mode.

Here, in the boarding mode and the autonomous mode, the overall weight of the vehicle system differs, so that the behavior characteristics of the vehicle 1 such as the ease of acceleration of the vehicle 1 when propulsive force is applied to the vehicle 1 differs. Therefore, in the case of determining the required center-of-gravity velocity Vb_x_aim (or Vb_y_aim) in accordance with the propulsive force applied to the vehicle 1, in both of the boarding mode and the autonomous mode, the values of the parameters such as the aforesaid first threshold value DV1_x, the second response time constant τ2_x, the vehicle holding time Tm_x, the ratio γ_x and the like may be set to a different value in the boarding mode and the autonomous mode.

Further, in each of the aforesaid embodiments, the vehicle 1 having the structure illustrated in FIG. 1 and FIG. 2 has been exemplified. However, the inverted pendulum type vehicle 1 in the present invention is not limited to the vehicle 1 exemplified in the embodiments.

To be more specific, the wheel assembly 5 serving as the traveling motion unit of the vehicle 1 in the embodiments has the one-piece construction. Alternatively, however, the wheel assembly 5 may have a construction shown in, for example, FIG. 10 of the aforesaid patent document 3. More specifically, the wheel assembly may be constructed to have a rigid annular shaft member and a plurality of rollers rotatively and externally inserted into the rigid annular shaft member such that the axial centers thereof are oriented in the tangential direction of the shaft member, the plurality of these rollers being arranged in the circumferential direction along the shaft member.

Further, the traveling motion unit may have a crawler-shaped structure, as shown in, for example, FIG. 3 of patent document 2.

Figure 5:
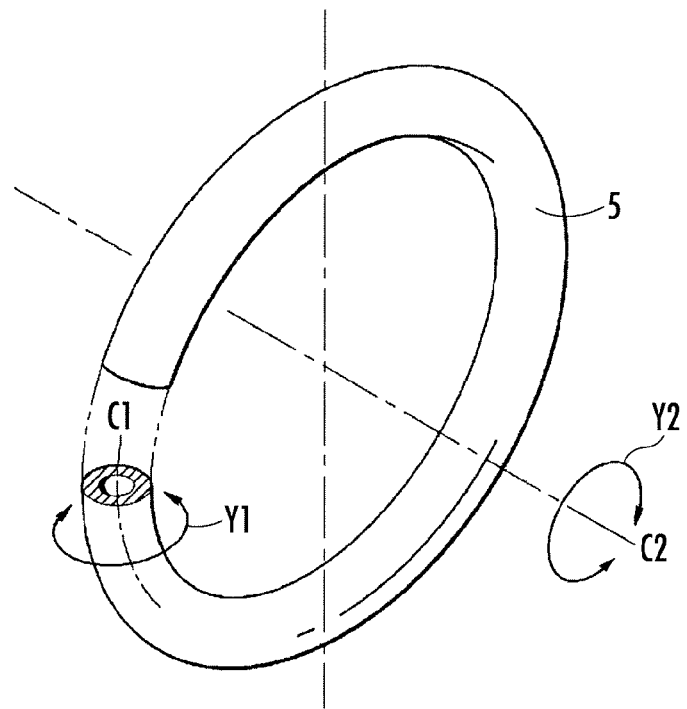
FIG. 5 is a perspective view of a traveling motion unit (wheel unit) of the omnidirectional vehicle according to the embodiment.

Alternatively, as shown in, for example, FIG. 5 of the aforesaid patent document 2, FIG. 7 of patent document 3, or FIG. 1 of patent document 1, the traveling motion unit may be constructed of a spherical member, and the vehicle may be constructed such that the spherical member is rotatively driven in a direction about the X-axis and a direction about the Y-axis by an actuator (e.g., an actuator having the aforesaid wheel assembly 5).

Further, in the embodiments, the vehicle 1 provided with the seat 3 as the boarding section for an occupant has been exemplified. Alternatively, however, the inverted pendulum type vehicle in accordance with the present invention may be a vehicle having a construction wherein a step on which an occupant rests his/her both feet and a section to be gripped by the occupant standing on the step are mounted on a base body, as illustrated in, for example, FIG. 8 in patent document 3.

Thus, the present invention can be applied to inverted pendulum type vehicles of various constructions, as illustrated in the aforesaid patent documents 1 to 3 and the like.

Further, the inverted pendulum type vehicle in accordance with the present invention may be provided with a plurality of traveling motion units (e.g., two in the lateral direction, or two in the fore-and-aft direction, or three or more).

Further, in the inverted pendulum type vehicle in accordance with the present invention, it is not necessary for the base body to tilt together with the boarding unit of the occupant. For example, in the case where the vehicle includes a plurality of the traveling motion units, the base body to which the traveling motion units are assembled may be made so that the base body does not tilt with respect to the floor surface, and the boarding unit may be assembled to the base body so as to be freely tiltable.

Description of Reference Numerals

1 . . . inverted pendulum type vehicle; 3 . . . seat (payload supporting part); 5 . . . wheel assembly (traveling motion unit); 7 . . . actuator; 9 . . . base body; 52 . . . tilt sensor (tilt angle measuring element); 53 . . . yaw rate sensor (yaw rate measuring element); 72 . . . center-of-gravity calculator (representative point velocity measuring element); 76 . . . center-of-gravity velocity restrictor (traveling motion unit control element); 80 . . . posture control calculator (traveling motion unit control element); 82 . . . motor command calculator (traveling motion unit control element); STEP2 . . . tilt angle measuring element; and STEP5 . . . desired tilt angle determining element

The invention claimed is:

1. A control device of an inverted pendulum type vehicle having a traveling motion unit capable of moving on a floor surface in all directions including a first direction and a second direction which are orthogonal to each other, an actuator which drives the traveling motion unit, a base body on which the traveling motion unit and the actuator are mounted, and a payload supporting part of an occupant which is attached to the base body so as to be tiltable with respect to vertical direction about two axes, about the axis in the first direction and about the axis in the second direction, comprising:

a yaw rate measuring element which generates an output according to an actual yaw rate of a predetermined portion of the vehicle;

a desired tilt angle determining element which determines a desired tilt angle of the payload supporting part at least in the second direction which is the lateral direction and at least according to a measured value of the yaw rate indicating by the output of the yaw rate calculating element; and a traveling motion unit controlling element which controls a traveling motion of the traveling motion unit so as to bring at least a tilt error which is an error between an actual tilt angle of the payload supporting part and a desired tilt angle determined by the desired tilt angle determining element close to 0.

2. The control device of the inverted pendulum type vehicle according to claim 1, wherein a reference angle to be set as the desired tilt angle in a case where the measured value of the yaw rate is 0 is determined beforehand, and the desired tilt angle determining element determines the desired tilt angle so as to increase, out of an error between the desired tilt angle and the reference angle, at least the magnitude of an error component about an axis in a predetermined direction which is a component about an axis in a same direction as an actual traveling direction of a predetermined representative point of the vehicle, as the magnitude of the measured value of the yaw rate increases.

3. The control device of the inverted pendulum type vehicle according to claim 2, further comprising a representative point velocity measuring element which generates an output according to an actual traveling velocity of the representative point, and the desired tilt angle determining element determines the desired tilt angle so as to increase the magnitude of the error component about the axis in the predetermined direction, as the magnitude of the measured value of the yaw rate increases, and as the magnitude of a measured value of the traveling velocity of the representative point indicated by an output of the representative point velocity measuring element increases.

4. The control device of the inverted pendulum type vehicle according to claim 3, wherein the desired tilt angle determining element determines the desired tilt angle so that a polarity of the error component about the axis in the predetermined direction to be a polarity defined according to a set of an orientation of the yaw rate represented by the measured value of the yaw rate, and an orientation of the traveling velocity represented by the measured value of the traveling velocity of the representative point.

5. The control device of the inverted pendulum type vehicle according to claim 3, the desired tilt angle determining element determines the reference angle as the desired tilt angle, in a case where either one of a condition that the magnitude of the measured value of the yaw rate is smaller than a predetermined first threshold value, and a condition that the magnitude of the measured value of the traveling velocity of the representative point is smaller than a predetermined second threshold value, is satisfied.

6. The control device of the inverted pendulum type vehicle according to claim 2, wherein the desired tilt angle determining element determines the reference angle as the desired tilt angle, in a case where the magnitude of the measured value of the yaw rate is smaller than a predetermined first threshold value.

* * * * *